US012694343B2

(12) United States Patent
Bhat et al.

(10) Patent No.: US 12,694,343 B2
(45) Date of Patent: Jul. 28, 2026

(54) MULTI-VARIABLE OPTIMIZATION FOR ROUTING REQUESTS TO LANGUAGE MODELS

(71) Applicant: Citibank, N.A., New York, NY (US)

(72) Inventors: Ganesh Prasad Bhat, New Jersey, NJ (US); Zheyu Wang, Shanghai (CN); Haolin Jin, Shanghai (CN); Sourabh Deb, Tampa, FL (US); Jason Ryan Engelbrecht, London (GB); Payal Jain, London (GB); Tariq Husayn Maonah, London (GB); Mariusz Saternus, Cracow (PL); Daniel Lewandowski, Cracow (PL); Biraj Krushna Rath, London (GB); Stuart Murray, London (GB); Philip Davies, London (GB); James Myers, Clearwater, FL (US)

(73) Assignee: CITIBANK, N.A.

( * ) Notice: Subject to any disclaimer, the term of this patent is extended or adjusted under 35 U.S.C. 154(b) by 0 days.

(21) Appl. No.: 19/301,756

(22) Filed: Aug. 15, 2025

(65) Prior Publication Data

US 2025/0371433 A1 Dec. 4, 2025

Related U.S. Application Data

(63) Continuation-in-part of application No. 18/812,913, filed on Aug. 22, 2024, which is a (Continued)

(51) Int. Cl.
*G06N 20/00* (2019.01)

(52) U.S. Cl.
CPC ................................... *G06N 20/00* (2019.01)

(58) Field of Classification Search
CPC ..................................................... G06N 20/00
See application file for complete search history.

(56) References Cited

U.S. PATENT DOCUMENTS

| | | | |
|---|---|---|---|
| 5,423,041 A | 6/1995 | Burke et al. | |
| 5,586,218 A | 12/1996 | Allen | |

(Continued)

FOREIGN PATENT DOCUMENTS

| | | |
|---|---|---|
| CN | 106502890 A | 3/2017 |
| WO | 2021160499 A1 | 8/2021 |

(Continued)

OTHER PUBLICATIONS

Liu, Y. et al., "OptLLM: optimal assignment of queries to large language models," downloaded from <arxiv.org/abs/2405.15130> (May 24, 2024) 11 pp. (Year: 2024).*

(Continued)

*Primary Examiner* — Brian M Smith
(74) *Attorney, Agent, or Firm* — Perkins Coie LLP

(57) ABSTRACT

Systems, methods, and devices that relate to routing requests to large language models (LLMs) are disclosed. In one example aspect, the system receives session-specific data elements in response to a request to generate an output using LLMs. The system determines a hierarchy of operational constraints including privacy protocols and performance requirements. Weights for a multi-variable optimization are dynamically updated using the session-specific data elements. The system executes the multi-variable optimization across candidate LLMs that satisfy privacy constraints and optimize performance constraints. Based on the optimization, at least one candidate LLM is selected and the request is routed to it. In response to performance feedback, the system automatically selects a different LLM to improve one constraint, resulting in degradation of another constraint.

20 Claims, 24 Drawing Sheets

Related U.S. Application Data continuation-in-part of application No. 18/661,532, filed on May 10, 2024, now Pat. No. 12,111,747, which is a continuation-in-part of application No. 18/661,519, filed on May 10, 2024, now Pat. No. 12,106,205, and a continuation-in-part of application No. 18/633,293, filed on Apr. 11, 2024, now Pat. No. 12,147,513.

(56) References Cited

U.S. PATENT DOCUMENTS

| | | | |
|---|---|---|---|
| 5,671,361 A | 9/1997 | Brown et al. | |
| 6,169,981 B1 | 1/2001 | Werbos | |
| 6,208,720 B1 | 3/2001 | Curtis et al. | |
| 6,473,748 B1 | 10/2002 | Archer | |
| 6,546,545 B1 | 4/2003 | Honarvar et al. | |
| 6,587,846 B1 | 7/2003 | Lamuth | |
| 7,313,552 B2 | 12/2007 | Lorenz et al. | |
| 7,669,133 B2 | 2/2010 | Chikirivao et al. | |
| 7,822,621 B1 | 10/2010 | Chappel | |
| 7,984,513 B1 | 7/2011 | Kyne et al. | |
| 8,380,817 B2 | 2/2013 | Okada | |
| 8,387,020 B1 | 2/2013 | Maclachlan et al. | |
| 8,572,552 B2 | 10/2013 | Kennaley | |
| 8,656,343 B2 | 2/2014 | Fox et al. | |
| 8,930,298 B2 | 1/2015 | Demuth et al. | |
| 9,020,872 B2 | 4/2015 | Junker | |
| 9,215,212 B2 | 12/2015 | Reddy et al. | |
| 9,251,466 B2 | 2/2016 | Rajesh | |
| 9,842,045 B2 | 12/2017 | Heorhiadi et al. | |
| 9,858,828 B1 | 1/2018 | Fuka | |
| 10,157,355 B2 | 12/2018 | Johnson et al. | |
| 10,276,170 B2 | 4/2019 | Gruber et al. | |
| 10,438,212 B1 | 10/2019 | Jilani et al. | |
| 10,554,738 B1 | 2/2020 | Ren | |
| 10,607,141 B2 | 3/2020 | Jerram et al. | |
| 10,620,988 B2 | 4/2020 | Lauderdale et al. | |
| 10,755,103 B2 | 8/2020 | Chang et al. | |
| 10,764,150 B1 | 9/2020 | Hermoni et al. | |
| 10,943,067 B1 | 3/2021 | Brown et al. | |
| 10,949,337 B1 | 3/2021 | Yalla et al. | |
| 10,951,485 B1 | 3/2021 | Hermoni et al. | |
| 11,042,647 B1 | 6/2021 | Joyce et al. | |
| 11,074,107 B1 | 7/2021 | Nandakumar | |
| 11,106,801 B1 | 8/2021 | Levine et al. | |
| 11,133,942 B1 | 9/2021 | Griffin | |
| 11,153,177 B1 | 10/2021 | Hermoni et al. | |
| 11,164,078 B2 | 11/2021 | Jin et al. | |
| 11,227,047 B1 | 1/2022 | Vashisht et al. | |
| 11,227,187 B1 | 1/2022 | Weinberger | |
| 11,271,822 B1 | 3/2022 | Hermoni et al. | |
| 11,315,196 B1 | 4/2022 | Narayan et al. | |
| 11,328,068 B1 | 5/2022 | Niedzwiedz et al. | |
| 11,410,136 B2 | 8/2022 | Cook et al. | |
| 11,436,777 B1 | 9/2022 | Karli et al. | |
| 11,470,106 B1 | 10/2022 | Lin et al. | |
| 11,481,553 B1 | 10/2022 | Durvasula et al. | |
| 11,503,075 B1 | 11/2022 | Sirianni et al. | |
| 11,516,158 B1 | 11/2022 | Luzhnica et al. | |
| 11,516,222 B1 | 11/2022 | Srinivasan et al. | |
| 11,531,943 B1 | 12/2022 | Kumar | |
| 11,562,078 B2 | 1/2023 | Sabourin et al. | |
| 11,573,848 B2 | 2/2023 | Linck et al. | |
| 11,586,436 B1 | 2/2023 | Jennings | |
| 11,593,390 B2 | 2/2023 | Sundel | |
| 11,652,839 B1 | 5/2023 | Aloisio et al. | |
| 11,656,852 B2 | 5/2023 | Mazurskiy | |
| 11,663,409 B2 | 5/2023 | Terry et al. | |
| 11,663,662 B2 | 5/2023 | Chen et al. | |
| 11,676,685 B2 | 6/2023 | Jaganathan et al. | |
| 11,681,610 B2 | 6/2023 | Chang et al. | |
| 11,681,811 B1 | 6/2023 | Dixit | |
| 11,683,333 B1 | 6/2023 | Dominessy et al. | |
| 11,706,241 B1 | 7/2023 | Cross et al. | |
| 11,709,757 B1 | 7/2023 | Kurian et al. | |
| 11,720,686 B1 | 8/2023 | Cross et al. | |
| 11,734,418 B1 | 8/2023 | Epstein | |
| 11,734,591 B2 | 8/2023 | Turner et al. | |
| 11,741,226 B2 | 8/2023 | Dixit | |
| 11,750,717 B2 | 9/2023 | Walsh et al. | |
| 11,765,100 B1 | 9/2023 | Sloane et al. | |
| 11,803,792 B2 | 10/2023 | Makhija et al. | |
| 11,811,730 B1 | 11/2023 | Kandasamy et al. | |
| 11,823,108 B1 | 11/2023 | Bradbury et al. | |
| 11,842,408 B1 | 12/2023 | Martinez et al. | |
| 11,853,735 B1 | 12/2023 | Choudhury et al. | |
| 11,874,934 B1 | 1/2024 | Rao et al. | |
| 11,875,123 B1 | 1/2024 | Ben David et al. | |
| 11,875,130 B1 | 1/2024 | Bosnjakovic et al. | |
| 11,915,152 B2 | 2/2024 | Baker | |
| 11,924,027 B1 | 3/2024 | Mysore et al. | |
| 11,947,435 B2 | 4/2024 | Boulineau et al. | |
| 11,960,515 B1 | 4/2024 | Pallakonda et al. | |
| 11,983,806 B1 | 5/2024 | Ramesh et al. | |
| 11,990,139 B1 | 5/2024 | Sandrew | |
| 11,995,412 B1 | 5/2024 | Mishra | |
| 12,001,463 B1 | 6/2024 | Pallakonda et al. | |
| 12,007,963 B1 | 6/2024 | Rajagopalan et al. | |
| 12,026,599 B1 | 7/2024 | Lewis et al. | |
| 12,028,368 B1 | 7/2024 | Cohen et al. | |
| 12,088,611 B1 | 9/2024 | Lin et al. | |
| 12,094,010 B1 | 9/2024 | Hampapur et al. | |
| 12,106,205 B1 | 10/2024 | Jain et al. | |
| 12,111,747 B1 | 10/2024 | Jain et al. | |
| 12,131,819 B1 | 10/2024 | Murray et al. | |
| 12,135,949 B1 | 11/2024 | Cameron et al. | |
| 12,147,513 B1 | 11/2024 | Jain et al. | |
| 12,149,553 B1 | 11/2024 | Fly et al. | |
| 12,149,558 B1 | 11/2024 | Brown et al. | |
| 12,155,781 B1 | 11/2024 | Helfgott et al. | |
| 12,182,258 B2 | 12/2024 | Stokes et al. | |
| 12,236,193 B1 * | 2/2025 | Kuperman | G06F 40/284 |
| 12,321,862 B1 * | 6/2025 | Levin | G06N 20/00 |
| 2003/0007178 A1 | 1/2003 | Jeyachandran et al. | |
| 2004/0098454 A1 | 5/2004 | Trapp et al. | |
| 2005/0204348 A1 | 9/2005 | Horning et al. | |
| 2006/0095918 A1 | 5/2006 | Hirose | |
| 2007/0067848 A1 | 3/2007 | Gustave et al. | |
| 2010/0275263 A1 | 10/2010 | Bennett et al. | |
| 2010/0313189 A1 | 12/2010 | Beretta et al. | |
| 2014/0137257 A1 | 5/2014 | Martinez et al. | |
| 2014/0258998 A1 | 9/2014 | Adl-tabatabai et al. | |
| 2017/0061132 A1 | 3/2017 | Hovor et al. | |
| 2017/0262164 A1 | 9/2017 | Jain et al. | |
| 2017/0279826 A1 | 9/2017 | Mohanty et al. | |
| 2017/0295197 A1 | 10/2017 | Parimi et al. | |
| 2018/0020021 A1 | 1/2018 | Gilmore et al. | |
| 2018/0239903 A1 | 8/2018 | Bodin et al. | |
| 2018/0343114 A1 | 11/2018 | Ben-Ari | |
| 2019/0188706 A1 | 6/2019 | Mccurtis | |
| 2019/0236661 A1 | 8/2019 | Hogg et al. | |
| 2019/0286816 A1 | 9/2019 | Fu | |
| 2020/0012493 A1 | 1/2020 | Sagy | |
| 2020/0043164 A1 | 2/2020 | Fuchs et al. | |
| 2020/0074470 A1 | 3/2020 | Deshpande et al. | |
| 2020/0133711 A1 | 4/2020 | Webster et al. | |
| 2020/0153855 A1 | 5/2020 | Kirti et al. | |
| 2020/0219009 A1 | 7/2020 | Dao et al. | |
| 2020/0233979 A1 | 7/2020 | Tahmasebi Maraghoosh et al. | |
| 2020/0259852 A1 | 8/2020 | Wolff et al. | |
| 2020/0309767 A1 | 10/2020 | Loo et al. | |
| 2020/0314191 A1 | 10/2020 | Madhavan et al. | |
| 2020/0334326 A1 | 10/2020 | Zhang et al. | |
| 2020/0349054 A1 | 11/2020 | Dai et al. | |
| 2020/0380118 A1 | 12/2020 | Miller et al. | |
| 2020/0387608 A1 | 12/2020 | Miller et al. | |
| 2021/0012486 A1 | 1/2021 | Huang et al. | |
| 2021/0049288 A1 | 2/2021 | Li | |
| 2021/0089941 A1 | 3/2021 | Chen et al. | |
| 2021/0133182 A1 | 5/2021 | Anderson et al. | |
| 2021/0173935 A1 | 6/2021 | Ramasamy et al. | |
| 2021/0185094 A1 | 6/2021 | Waplington et al. | |
| 2021/0211431 A1 | 7/2021 | Albero et al. | |
| 2021/0256125 A1 | 8/2021 | Miller et al. | |

(56)     References Cited

U.S. PATENT DOCUMENTS

| | | |
|---|---|---|
| 2021/0264547 A1 | 8/2021 | Li |
| 2021/0273957 A1 | 9/2021 | Boyer et al. |
| 2021/0390465 A1 | 12/2021 | Werder et al. |
| 2022/0050928 A1 | 2/2022 | Shukla et al. |
| 2022/0114251 A1 | 4/2022 | Guim Bernat et al. |
| 2022/0114399 A1 | 4/2022 | Castiglione et al. |
| 2022/0147636 A1 | 5/2022 | Mahuli et al. |
| 2022/0179906 A1 | 6/2022 | Desai et al. |
| 2022/0198304 A1 | 6/2022 | Szczepanik et al. |
| 2022/0263843 A1 | 8/2022 | Aslam et al. |
| 2022/0263855 A1 | 8/2022 | Engelberg et al. |
| 2022/0263860 A1 | 8/2022 | Crabtree et al. |
| 2022/0278889 A1 | 9/2022 | Malleshaiah et al. |
| 2022/0286438 A1 | 9/2022 | Burke et al. |
| 2022/0286474 A1 | 9/2022 | Kuppa et al. |
| 2022/0294789 A1 | 9/2022 | Tikhomirov et al. |
| 2022/0294810 A1 | 9/2022 | Tyagi et al. |
| 2022/0303300 A1 | 9/2022 | Egan |
| 2022/0303302 A1 | 9/2022 | Hwang et al. |
| 2022/0303352 A1 | 9/2022 | Herzog et al. |
| 2022/0311681 A1 | 9/2022 | Palladino et al. |
| 2022/0318654 A1 | 10/2022 | Lin et al. |
| 2022/0327620 A1 | 10/2022 | Ndoutoumou |
| 2022/0334818 A1 | 10/2022 | Mcfarland |
| 2022/0342846 A1 | 10/2022 | Kunchakarra et al. |
| 2022/0345457 A1 | 10/2022 | Jeffords et al. |
| 2022/0358023 A1 | 11/2022 | Moser et al. |
| 2022/0366140 A1 | 11/2022 | Saito et al. |
| 2022/0368728 A1 | 11/2022 | Murray et al. |
| 2022/0377093 A1 | 11/2022 | Crabtree et al. |
| 2022/0398149 A1 | 12/2022 | Mcfarland et al. |
| 2022/0400135 A1 | 12/2022 | Gamra |
| 2022/0414213 A1 | 12/2022 | Dixit |
| 2022/0414536 A1 | 12/2022 | M L et al. |
| 2022/0417274 A1 | 12/2022 | Madanahalli et al. |
| 2023/0007039 A1 | 1/2023 | Waplington |
| 2023/0009999 A1 | 1/2023 | Higuchi et al. |
| 2023/0019072 A1 | 1/2023 | Okunlola |
| 2023/0032686 A1 | 2/2023 | Williams et al. |
| 2023/0033317 A1 | 2/2023 | Lin et al. |
| 2023/0035321 A1 | 2/2023 | Vijayaraghavan |
| 2023/0039855 A1 | 2/2023 | Greene |
| 2023/0044102 A1 | 2/2023 | Anderson et al. |
| 2023/0052608 A1 | 2/2023 | Wattiau et al. |
| 2023/0067128 A1 | 3/2023 | Engelberg et al. |
| 2023/0071264 A1 | 3/2023 | Hakala et al. |
| 2023/0076372 A1 | 3/2023 | Engelberg et al. |
| 2023/0077527 A1 | 3/2023 | Sarkar |
| 2023/0109021 A1 | 4/2023 | Curtin et al. |
| 2023/0113621 A1 | 4/2023 | Griffin et al. |
| 2023/0114719 A1 | 4/2023 | Thomas et al. |
| 2023/0117962 A1 | 4/2023 | Kaimal et al. |
| 2023/0118388 A1 | 4/2023 | Crabtree et al. |
| 2023/0123314 A1 | 4/2023 | Crabtree et al. |
| 2023/0132703 A1 | 5/2023 | Marsenic et al. |
| 2023/0135660 A1 | 5/2023 | Chapman et al. |
| 2023/0148116 A1 | 5/2023 | Stokes et al. |
| 2023/0164158 A1 | 5/2023 | Fellows et al. |
| 2023/0169397 A1 | 6/2023 | Smith et al. |
| 2023/0171282 A1 | 6/2023 | Bollinger |
| 2023/0177441 A1 | 6/2023 | Durvasula et al. |
| 2023/0177613 A1 | 6/2023 | Crabtree et al. |
| 2023/0186175 A1 | 6/2023 | Usatov et al. |
| 2023/0205888 A1 | 6/2023 | Tyagi et al. |
| 2023/0205891 A1 | 6/2023 | Yellapragada et al. |
| 2023/0208869 A1 | 6/2023 | Bisht et al. |
| 2023/0208870 A1 | 6/2023 | Yellapragada et al. |
| 2023/0208871 A1 | 6/2023 | Yellapragada et al. |
| 2023/0229542 A1 | 7/2023 | Watkins et al. |
| 2023/0252393 A1 | 8/2023 | Orzechowski et al. |
| 2023/0259860 A1 | 8/2023 | Sarkar |
| 2023/0269272 A1 | 8/2023 | Dambrot et al. |
| 2023/0274003 A1 | 8/2023 | Liu et al. |
| 2023/0359789 A1 | 11/2023 | Andre et al. |
| 2023/0362200 A1 | 11/2023 | Crabtree et al. |
| 2023/0396641 A1 | 12/2023 | Hebbagodi et al. |
| 2023/0412635 A1 | 12/2023 | Binyamini et al. |
| 2024/0012734 A1 | 1/2024 | Lee et al. |
| 2024/0020538 A1 | 1/2024 | Socher et al. |
| 2024/0054233 A1 | 2/2024 | Ohayon et al. |
| 2024/0054249 A1 | 2/2024 | Loubet Moundi et al. |
| 2024/0095077 A1 | 3/2024 | Singh et al. |
| 2024/0129345 A1 | 4/2024 | Kassam et al. |
| 2024/0202442 A1 | 6/2024 | Saito et al. |
| 2024/0256678 A1 | 8/2024 | Thompson |
| 2024/0364749 A1 | 10/2024 | Crabtree et al. |
| 2024/0403428 A1 | 12/2024 | Lal et al. |
| 2024/0403437 A1 | 12/2024 | Szigeti et al. |
| 2024/0403445 A1 | 12/2024 | Straub et al. |
| 2024/0406145 A1 | 12/2024 | Crabtree et al. |
| 2024/0411896 A1 | 12/2024 | Myers et al. |
| 2024/0414211 A1 | 12/2024 | Boyer et al. |
| 2024/0427994 A1* | 12/2024 | Odland ................... G06N 3/08 |
| 2025/0265504 A1* | 8/2025 | Upadhyay .............. G06N 20/00 |
| 2025/0362963 A1* | 11/2025 | Poothiyot ............. G06F 9/5027 |

FOREIGN PATENT DOCUMENTS

| | | |
|---|---|---|
| WO | 2022125803 A1 | 6/2022 |
| WO | 2024020416 A1 | 1/2024 |

OTHER PUBLICATIONS

Sun, J. et al., "Interval multiobjective optimization with memetic algorithms," IEEE Trans. on Cybernetics, vol. 50, No. 8 (Aug. 2020) pp. 3444-3457. (Year: 2020).*

Emmerich, M. et al., "Multicriteria optimization and decision making: principles, algorithms, and case studies," downloaded from <arxiv.org/abs/2407.00359> (Apr. 21, 2025) 129 pp. (Year: 2025).*

AI Risk Management Framework NIST, retrieved on Jun. 17, 2024, https://www.nist.gov/itl/ai-risk-management-framework.

Empower Your Team with a Compliance Co-Pilot, Sedric, retrieved on Sep. 25, 2024. https://www.sedric.ai/.

Independent analysis of AI language models and API providers. Artificial Analysis, retrieved on Jun. 13, 2024, https://artificialanalysis.ai/, 11 pages.

What is AI Verify?, AI Verify Foundation, Jun. 11, 2024, 3 pages, https://aiverifyfoundation.sg/.

Agarwal et al., How generative AI can help banks manage risk and compliance, Mckinsey & Company, Mar. 2024; Total pp. 8 (Year: 2024).

Behravesh et al., "Rule Modeling Engine for Optimizing Complex Event Processing Patterns", IEEE, pp. 128-135 (Year: 2009).

Brown, D., et al., "The Great AI Challenge: We Test Five Top Bots on Useful, Everyday Skills," The Wall Street Journal, published May 25, 2024.

Burnashev et al., "Design and Implementation of Integrated Development Environment for Building Rule-Based Expert Systems", IEEE, pp. 1-4 (Year: 2020).

Cranium, Adopt & Accelerate AI Safely, retrieved on Nov. 7, 2024, from https://cranium.ai/.

Cuadrado et al., "An Autonomous Engine for Services Configuration and Deployment", IEEE, pp. 520-536 (Year: 2012).

Dong, Y., et al., "Building Guardrails for Large Language Models," https://ar5iv.labs.arxiv.org/html/2402.01822v1, published May 29, 2024, 20 pages.

Fickas, "Design Issues in a Rule-Based System", ACM, pp. 208-215 (Year: 1985).

Futurism, "Sam Altman Admits That OpenAI Doesn't Actually Understand How Its AI Works", Jun. 11, 2024, 4 pages, https://futurism.com/sam-altman-admits-openai-understand-ai.

Ge et al., "Automatic Generation of Rule-based Software Configuration Management Systems", ACM, pp. 659 (Year: 2005).

Geiger, et al., "TadGAN: Time series anomaly detection using generative adversarial networks", 2020 IEEE International Conference on Big Data, 2020 (Year: 2020).

Generative machine learning models; IPCCOM000272835D, Aug. 17, 2023. (Year: 2023).

(56) References Cited

OTHER PUBLICATIONS

Genesis et al."CI Ref: A Tool for Visualizing the Historical Data of Software Refactorings in Java Projects", ACM, pp. 174-179 (Year: 2023).

Guana et al., "Backward Propagation of Code Refinements on Transformational Code Generation Environments", IEEE, pp. 55-60 (Year: 2013).

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Halvonik et al., "Large Language Models and Rule-Based Approaches in Domain-Specific Communication", IEEE, pp. 107046-107058 (Year: 2024).

Huang et al., "AI Coding: Learning to Construct Error Correction Codes", IEEE, pp. 26-39 (Year: 2020).

International Search Report and Written Opinion received in Application No. PCT/US25/24406, dated Jul. 18, 2025, 10 pages.

International Search Report and Written Opinion Received received in Application No. PCT/US23/85942, dated Feb. 15, 2024, 6 pages.

Jiang et al., "Self-Planning Code Generation with Large Language Models", ACM, pp. 1-30 (Year: 2024).

Kibria et al., "Big Data Analytics, Machine Learning, and Artificial Intelligence in Next-Generation Wireless Networks", IEEE, pp. 32328-32338 (Year: 2018).

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Kumar et al., "A Rule-based Recommendation System for Selection of Software Development Life Cycle Models", ACM, pp. 1-6 ( Year: 2013).

Langley et al., "Applications of Machine Learning and Rule Induction", ACM, pp. 54-64 (Year: 1995).

Idrizi "Exploring the Role of Explainable Artificial Intelligence(XAI) in Adaptive learning systems", ACM, pp. 100-105 (Year: 2024).

Li, et al., "Anomaly detection with generative adversarial networks for multivariate time series" arXiv: 1809.04758V3 [cs.LG] Jan. 15, 2019.

Mathews, A. W., "What AI Can Do in Healthcare—and What It Should Never Do," The Wall Street Journal, published on Aug. 21, 2024, retrieved on Sep. 5, 2024 https://www.wsj.com.

Mavrepis, P., et al., "XAI for All: Can Large Language Models Simplify Explainable AI?," https://arxiv.org/abs/2401.13110, Jan. 23, 2024, 10 pages.

Mezini, Programming and Execution Models for Next Generation Code Intelligence Systems (Keynote), ACM, pp. 1-2 (Year: 2021).

Mollick, E., "Latent Expertise: Everyone is in R&D," One Useful Thing, published on Jun. 20, 2024, https://www.oneusefulthing.org/p/latent-expertise-everyone-is-in-r.

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jun. 3, 2024].

Peers, M., "What California AI Bill Could Mean," The Briefing, published and retrieved Aug. 30, 2024, 8 pages, https://www.theinformation.com/articles/what-california-ai-bill-could-mean.

Rattanasawad et al., "A Review and Comparison of Rule Languages and Rule-based Inference Engines for the Semantic Web", IEEE, pp. 1-6 (Year: 2013).

Schlegl, et al., "f-AnoGAN: Fast unsupervised anomaly detection with generative adversarial networks", Medical Image Analysis 54 (2019) 30-44, 2019.

Soares et al., "Explaining Deep Learning Models Through Rule-Based Approximation and Visualization", IEEE, pp. 2399-2407 (Year: 2021).

Sottara et al., "Enhancing A Production Rule Engine with Predictive Models Using PMML", ACM, pp. 39-47 (Year: 2011).

Sumuk Shashidhar et al., 'Democratizing LLMs: An Exploration of Cost-Performance Trade-offs in Self-Refined Open-Source Models', arXiv:2310.07611v2, pp. 1-15, Oct. 2023.

Sun et al., "Efficient Rule Engine for Smart Building Systems", IEEE, pp. 1658-1669 (Year: 2015).

Vartak et al."MODELDB: A System for Machine Learning Model Management", ACM, pp. 1-3 (Year: 2016).

Vereschak et al., "Trust in AI-assisted Decision Making: Perspectives from Those Behind the System and Those for Whom the Decision is Made", ACM, pp. 1-14 (Year: 2024).

Verma et al., "Integration of Rule based and Case based Reasoning System to Support Decision Making", IEEE, pp. 106-108 (Year: 2014).

Wang et al., "Design and realization of distributed Rule Engine for scene linkage of Internet of Things", IEEE, pp. 396-401 (Year: 2024).

Wei, Jason, et al. "Chain-of-Thought Prompting Elicits Reasoning in Large Language Models," 36th Conference on Neural Information Processing Systems (NeurIPS 2022), arXiv:2201.11903 [cs. CL], Jan. 10, 2023, 43 pages.

Yang Liu et al., 'Trustworthy LLMS: a Survey and Guideline for Evaluating Large Language Models' Alignment , arXiv:2308. 05374v2, pp. 1-81, Mar. 2024.

Zhang et al., "Developing A Rule Engine for Automated Feature Recognition from CAD Models", IEEE, pp. 3925-3930 (Year: 2009).

Zhao, H., et al., "Explainability for Large Language Models: A Survey," https://arxiv.org/abs/2309.01029, Nov. 28, 2024, 38 pages.

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv./abs/2409.10102.

"Singapore launches Project Moonshot", a generative Artificial Intelligence testing toolkit to address LLM safety and security challenges, https://www.imda.gov.sg/resources/press-releases-factsheets-and-speeches/press-releases/2024/sg-launches-project-moonshot, May 31, 2024, 8 pages.

Aggarwal, Nitin , KPIs for gen AI: Why measuring your new AI is essential to its success, https://cloud.google.com/transform/kpis-for-gen-ai-why-measuring-your-new-ai-is-essential-to-its-success.

ANTHROP/C , Mapping the Mind of a Large Language Model, https://www.anthropic.com/research/mapping-mind-language-model, May 21, 2024.

Claburn, Thomas , OpenAI's GPT-4 can exploit real vulnerabilities by reading security advisories, The Register, https://www.theregister. com/2024/04/17/gpt4_can_exploit_real_vulnerabilities/?utm_source= tld rai, Apr. 17, 2024, 3 pages.

Marshall, Andrew , Threat Modeling AI/ML Systems and Dependencies, Nov. 2, 2022, 27 pages.

Roose, Kevin , "A.I. Has a Measurement Problem", The New York Times, Apr. 15, 2024, 5 pages.

Roose, Kevin , "A.I.'s Black Boxes Just Got a Little Less Mysterious", The New York Times, May 21, 2024, 5 pages.

Shah, Harshay , Decomposing and Editing Predictions by Modeling Model Computation, arXiv:2404.11534v1 [cs.LG] Apr. 17, 2024.

Shankar, Ram , "Failure Modes in Machine Learning", Nov. 2019, 14 pages.

Hu, Q., J., et al., "ROUTERBENCH: A Benchmark for Multi-LLM Routing System," arXiv:2403.12031v2 [cs.LG] Mar. 28, 2024, 16 pages.

* cited by examiner

Data Flow Legend: ──────▶ User Input   ─ ─ ─▶ Context/Performance Data   ······▶ Routing Decision   ─·─·─▶ Learning Updates   ─ ─ ─▶ Model Response

*The system creates a closed-loop optimization cycle where each component enhances the others through continuous feedback and adaptation.*

800

Input component(s)
804

Network connection component(s)
816

Output component(s)
806

Persistent storage(s)
818

Processor(s)
808

Computer-readable media drive(s)
820

Storage(s) 810

Application(s) 812

Application
812a

Application
812b

. . .

Application
812n

Model(s) 814

Model
814a

Model
814b

. . .

Model
814n

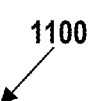
1100
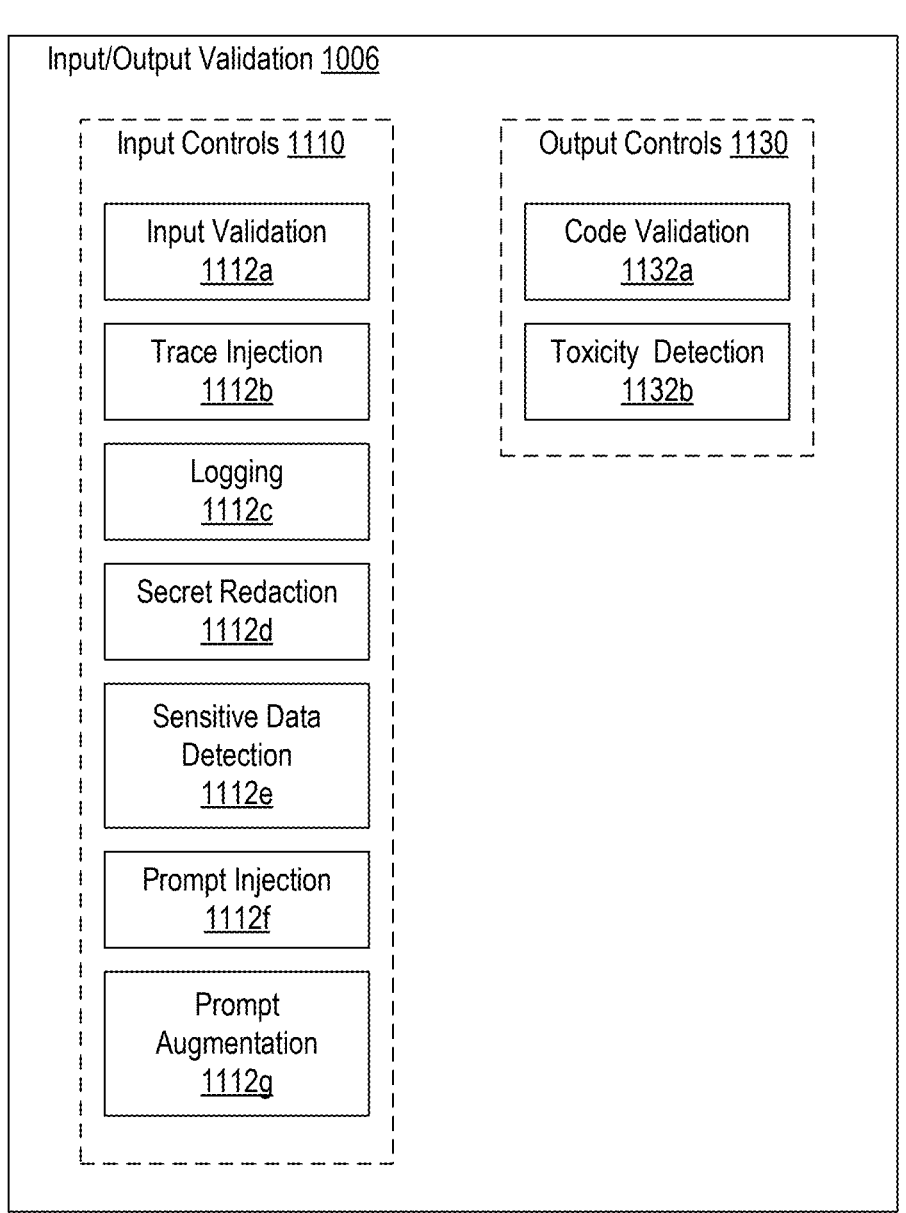
FIG. 11

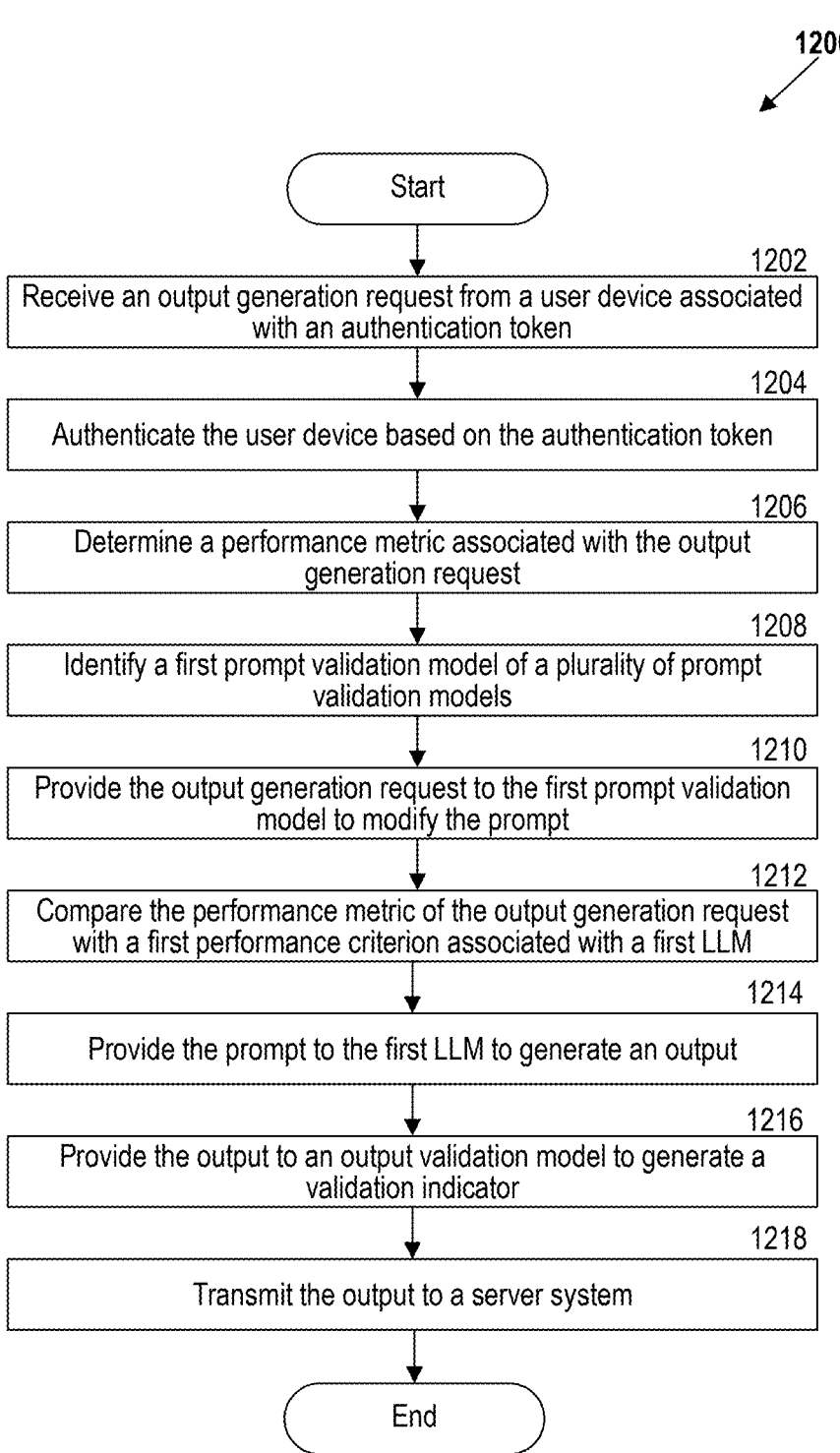

1200

Start

1202
Receive an output generation request from a user device associated with an authentication token 1204
Authenticate the user device based on the authentication token 1206
Determine a performance metric associated with the output generation request 1208
Identify a first prompt validation model of a plurality of prompt validation models 1210
Provide the output generation request to the first prompt validation model to modify the prompt 1212
Compare the performance metric of the output generation request with a first performance criterion associated with a first LLM 1214
Provide the prompt to the first LLM to generate an output 1216
Provide the output to an output validation model to generate a validation indicator 1218
Transmit the output to a server system End

| Performance Metric 1402 | Usage Value 1404 | Maximum Value 1406 | Threshold Metric Value 1408 |
|---|---|---|---|
| Central Processing Unit (CPU) Usage | 45% | 100% | 55% |
| Memory Usage | 12.30 GB | 50.00 GB | 37.70 GB |
| Hard Disk Space Usage | 93.2 TB | 100.0 TB | 68.0 TB |
| Number of Input Tokens | 150 | 200 | 50 |
| Cost Incurred | $5,203 | $12,000 | $6,797 |

1700

| Hardware Configuration 1710 | | Software Configuration 1730 | | Communication Configuration 1750 | |
|---|---|---|---|---|---|
| CPU Arch. | x86 | Operating System | OpSys A | Wireless Network Interface | 802.11 b 2.4GHz |
| GPU Arch. | SIMD | OS Version | 2.4.5 | Wireless Network Type | WPA2 |
| Storage Type | SSD | Home Path | '/home' | Wireless Network Encryption | AES |
| Storage Space | 1 TB | Display Identifier | '/disp' | Wireless Network Ports | 80 and 443 |
| Memory Space | 16 GB | Language | 'en_GB.UTF-8' | Ethernet Input | IEEE 802.3 |
| | | | | Ethernet Cable | IEEE 802.3 |
| | | | | Ethernet Connector | RJ45 |
| | | | | Ethernet Ports | 80 and 443 |

FIG. 17

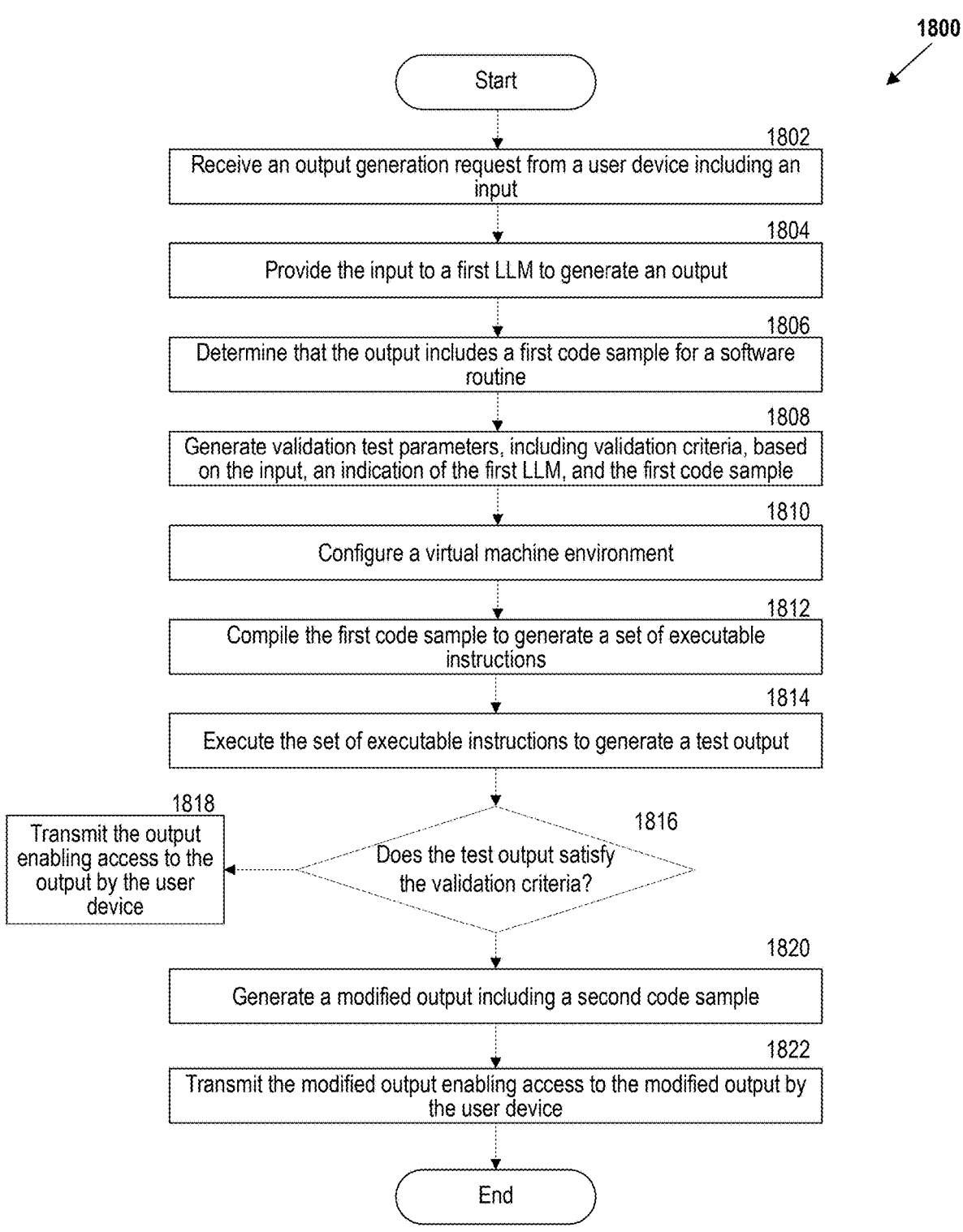

1800

Start

1802
Receive an output generation request from a user device including an input

1804
Provide the input to a first LLM to generate an output

1806
Determine that the output includes a first code sample for a software routine 1808
Generate validation test parameters, including validation criteria, based on the input, an indication of the first LLM, and the first code sample 1810
Configure a virtual machine environment 1812
Compile the first code sample to generate a set of executable instructions 1814
Execute the set of executable instructions to generate a test output 1818
Transmit the output enabling access to the output by the user device 1816
Does the test output satisfy the validation criteria?

1820
Generate a modified output including a second code sample

1822
Transmit the modified output enabling access to the modified output by the user device End

*FIG. 18*

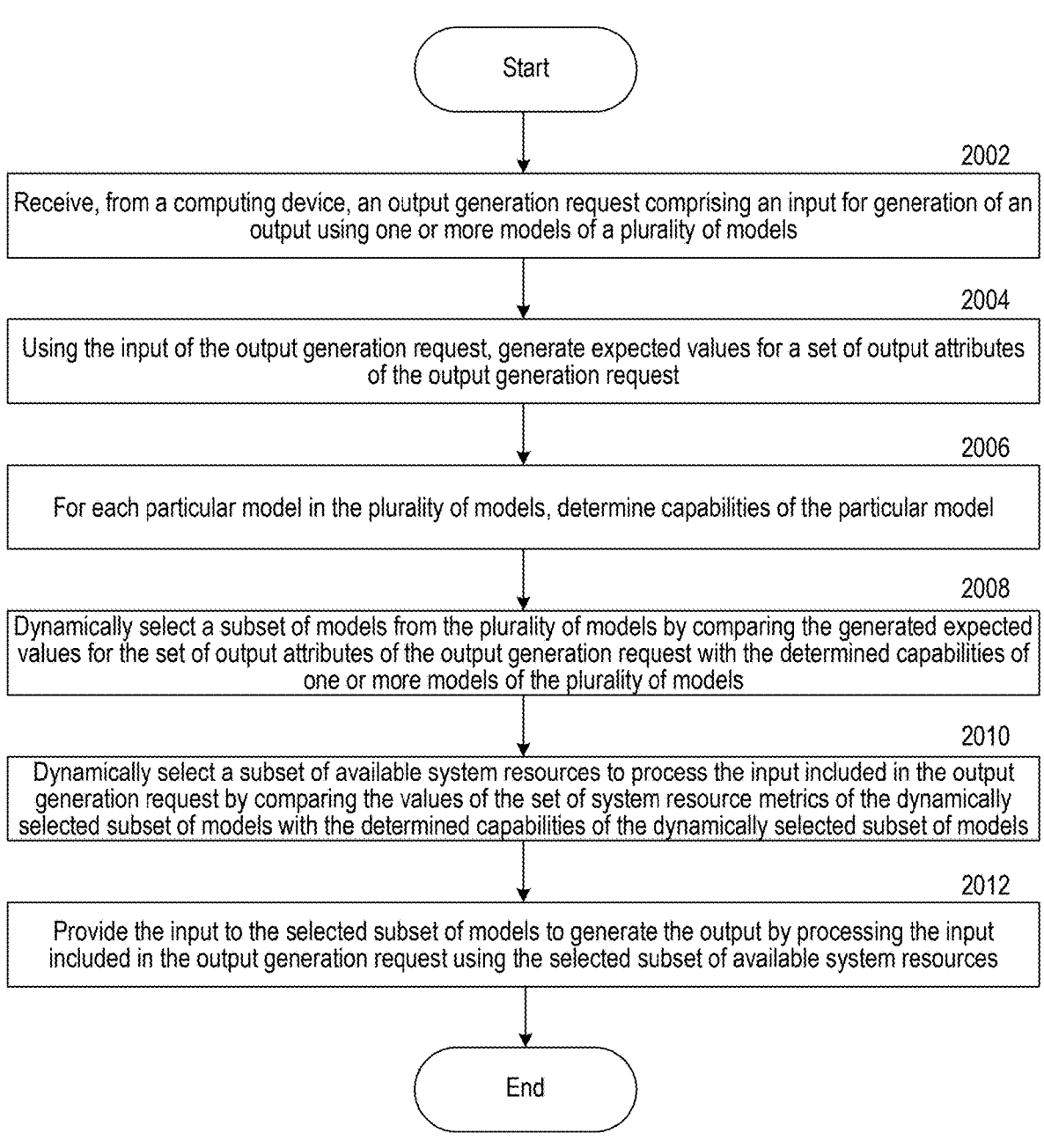

Start

2002

Receive, from a computing device, an output generation request comprising an input for generation of an output using one or more models of a plurality of models

2004

Using the input of the output generation request, generate expected values for a set of output attributes of the output generation request

2006

For each particular model in the plurality of models, determine capabilities of the particular model

2008

Dynamically select a subset of models from the plurality of models by comparing the generated expected values for the set of output attributes of the output generation request with the determined capabilities of one or more models of the plurality of models

2010

Dynamically select a subset of available system resources to process the input included in the output generation request by comparing the values of the set of system resource metrics of the dynamically selected subset of models with the determined capabilities of the dynamically selected subset of models

2012

Provide the input to the selected subset of models to generate the output by processing the input included in the output generation request using the selected subset of available system resources End

| Body | Cookies (1) | Headers (13) | Test Results | Status: 200 OK  Time: 9.19 s |
|---|---|---|---|---|
| Key 2302 | | | | Value 2304 |
| Content-Type | | |  | text/event-stream; charset=utf-8 |
| Date | | |  | Mon, 05 Feb 2025 10:36:32 GMT |
| Ratelimit-Limit | | |  | 100 |
| Ratelimit-Remaining | | |  | 99 |
| Ratelimit-Reset | | |  | 28 |
| Server | | |  | Caddy |
| X-Ratelimit-Limit-Requests | | |  | 100, 100;w=60, 10000;w=86400 |
| X-Ratelimit-Limit-Tokens | | |  | 50000, 50000;w=60, 5000000;w=86400 |
| X-Ratelimit-Remaining-Requests | | |  | 99, 99;w=60, 9994;w=86400 |
| X-Ratelimit-Remaining-Tokens | | |  | 50000, 50000;w=60, 4999077,w=86400 |
| X-Ratelimit-Reset-Requests | | |  | 28 |
| X-Ratelimit-Reset-Tokens | | |  | 28 |
| Transfer-Encoding | | |  | chunked |

*FIG. 23*

MULTI-VARIABLE OPTIMIZATION FOR ROUTING REQUESTS TO LANGUAGE MODELS

CROSS-REFERENCE TO RELATED APPLICATION(S)

This application is a continuation-in-part of U.S. patent application Ser. No. 18/812,913 entitled "DYNAMIC SYSTEM RESOURCE-SENSITIVE MODEL SOFTWARE AND HARDWARE SELECTION" and filed Aug. 22, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. This application is related to U.S. patent application Ser. No. 18/653,858 entitled "VALIDATING VECTOR CONSTRAINTS OF OUTPUTS GENERATED BY MACHINE LEARNING MODELS" and filed May 2, 2024, and U.S. patent application Ser. No. 18/637,362 entitled "DYNAMICALLY VALIDATING AI APPLICATIONS FOR COMPLIANCE" filed on Apr. 16, 2024. The content of the foregoing applications is incorporated herein by reference in its entirety.

BACKGROUND

Large language models (LLMs) are artificial intelligence systems designed to process and generate human language (for example, text, audio, video, and the like) based on vast amounts of training data. These models utilize deep learning techniques, particularly transformer architectures, to understand and produce coherent and contextually relevant language. LLMs can perform a wide range of natural language processing tasks, including text generation, translation, summarization, and question-answering.

Routing in computing refers to the process of selecting a path for traffic in a network or between different components of a system. In the context of distributed systems and cloud computing, routing involves directing requests or data to appropriate resources based on various criteria such as availability, capacity, and performance. Efficient routing mechanisms are important for optimizing resource utilization, minimizing latency, and ensuring system reliability.

SUMMARY

LLMs have revolutionized natural language processing and generation capabilities. However, effectively routing queries to the most appropriate LLMs while balancing multiple competing objectives remains a significant technical challenge. Existing routing systems typically optimize for a single objective, such as cost or quality, using simple threshold-based decisions or basic classification models. This approach fails to simultaneously balance multiple important and sometimes competing factors like cost, latency, quality, carbon footprint, data privacy, and regulatory compliance.

Additionally, current LLM routing solutions often make stateless decisions, treating each query independently without considering conversation history, accumulated context, or previous model performance within a session (or across multiple sessions). This leads to suboptimal routing choices, especially for multi-turn conversations or complex tasks that build on prior context. Furthermore, many existing routers rely on static pre-trained models or fixed rules that do not adapt based on real-world performance and user feedback. The lack of continuous learning and improvement based on actual usage patterns and outcomes limits the long-term effectiveness of these systems.

To address these and other technical challenges, this disclosure presents an advanced multi-objective routing system that employs optimization techniques, context-aware state management, and adaptive learning mechanisms. The system can utilize, for example, LLMs, small language models (SLMs), retrieval-augmented generation (RAG) procedures, fine-tuned models, or other types of models. The optimization framework can simultaneously consider multiple objectives and find optimal routing solutions that balance competing factors. By maintaining a comprehensive conversation state and implementing online learning algorithms, the system makes intelligent routing decisions informed by historical context and continuously improves its performance over time.

In particular, the system receives a plurality of session-specific data elements in response to a request to generate output using LLMs. These data elements can relate to a specific session or multiple sessions and can include prior interaction data, system environment parameters, and computational context values, which can be dynamically updated based on each request and response. The system determines a hierarchy of operational constraints for routing the request, including a first subset of constraints related to privacy and data handling protocols and a second subset of constraints including processing latency thresholds, model response requirements, and resource allocation limitations.

Using the session-specific data elements, the system dynamically updates weights for a multi-variable optimization process. This allows the routing decisions to adapt in real time to changing conditions and priorities. The system then executes the multi-variable optimization across a plurality of candidate LLMs, ensuring that each candidate satisfies the critical first subset of constraints while optimizing the second subset of constraints. Importantly, the optimization is performed such that any further improvement of one constraint in the second subset would necessarily cause degradation of at least one other constraint. Based on the results of this optimization process, the system selects at least one candidate LLM to handle the request. The request is then routed to the selected LLM, which generates the desired output. This approach ensures that the most appropriate LLM is chosen for each specific task, considering the full context of the request and the current state of the system.

Moreover, the system incorporates a feedback loop to continuously improve its performance. In response to receiving system performance feedback relating to at least one constraint in the second subset, such as latency exceeding a threshold of 500 ms or quality scores dropping below 85%, the system can automatically select a different LLM from among the candidate pool. This selection is made to improve the performance of the constraint in question, even if it results in some degradation of other constraints in the second subset. In some implementations, data, memory, or context can be shared between LLMs, for example, when a different LLM is selected for the request. This dynamic rebalancing allows the system to adapt to changing priorities and performance requirements over time.

By addressing the technical challenges of multi-objective optimization, context-aware routing, and continuous adaptation, this system represents a significant advancement in LLM routing technology. The approach implements sophisticated optimization algorithms that simultaneously balance multiple competing objectives without sacrificing critical performance parameters. The system's state management capabilities maintain comprehensive conversation context across multiple turns, enabling more coherent and contextually appropriate responses. Furthermore, the adaptive learning mechanisms continuously refine routing decisions based on real-world performance data, creating a self-improving system that becomes more efficient over time. This technical solution enables more precise, effective, and context-appropriate use of language models while rigorously maintaining privacy safeguards and regulatory compliance standards. The result is a highly flexible, scalable, and computationally efficient system capable of optimizing LLM usage across diverse applications, computational environments, and use cases.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 11 shows a schematic illustrating components of input/output validation, in accordance with some implementations of the present technology.

FIG. 12 shows a flow diagram illustrating a process for evaluating natural language prompts for model selection and for validating generated responses, in accordance with some implementations of the present technology.

FIG. 17 shows a data structure depicting a virtual machine configuration, in accordance with some implementations of the present technology.

FIG. 18 shows a flow diagram illustrating a process for dynamic evaluation of machine model outputs in an isolated environment, in accordance with some implementations of the present technology.

FIG. 20 is a flow diagram illustrating a process for the dynamic selection of models and infrastructure to process the request with the selected models based on evaluation of user prompts, in accordance with some implementations of the present technology.

FIG. 23 is an example user interface for illustrating an example use case providing configurations for the selection of models or the selection of available system resources, in accordance with some implementations of the present technology.

Figure 1:
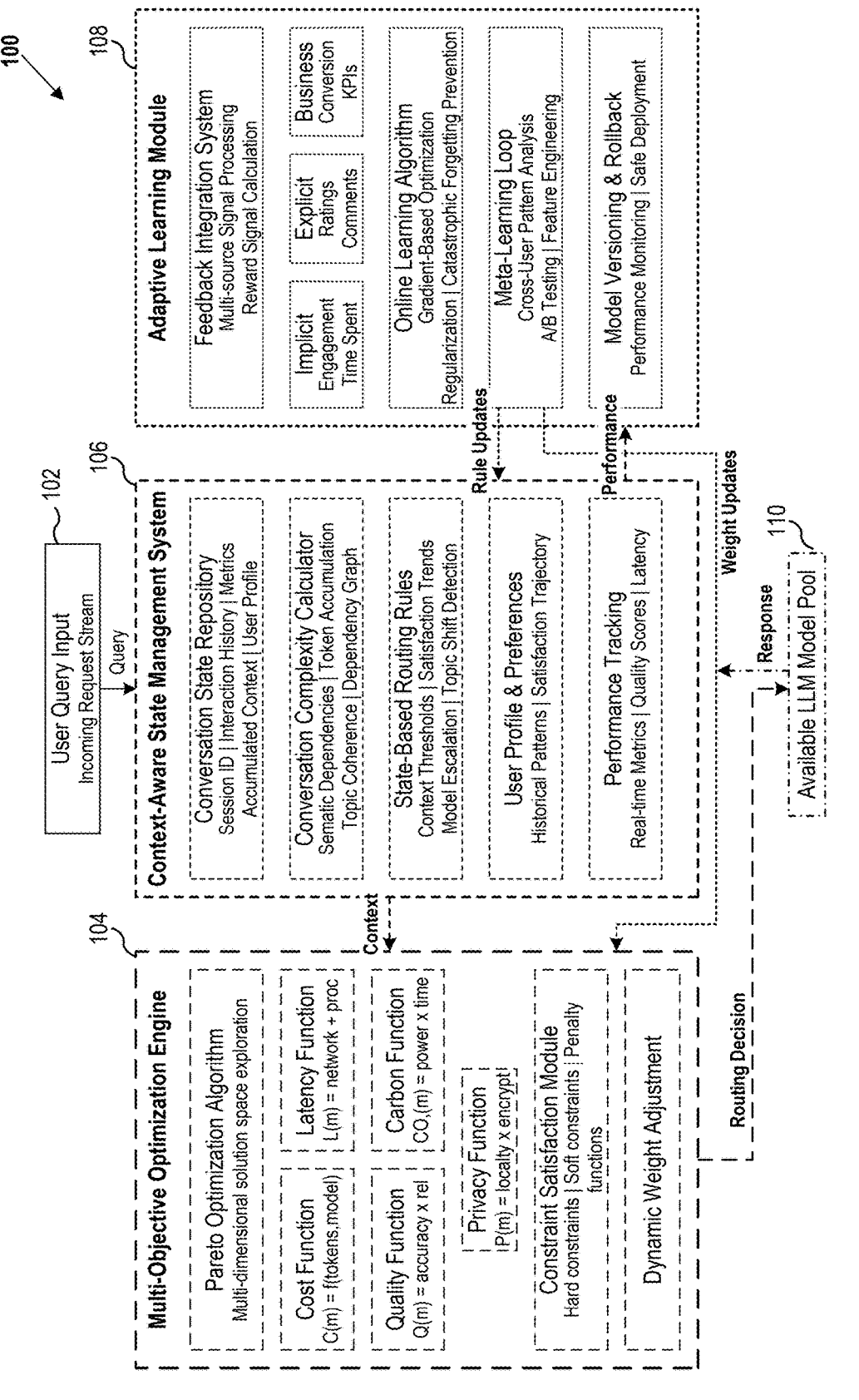
FIG. 1 illustrates an architecture for a unified multi-objective LLM routing system, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implemen-

DETAILED DESCRIPTION

In the following description, for the purposes of explanation, numerous specific details are set forth in order to provide a thorough understanding of the disclosed implementations. It will be appreciated, however, by those having skill in the art, that the implementations can be practiced without these specific details or with an equivalent arrangement. In other cases, well-known models and devices are shown in block diagram form in order to avoid unnecessarily obscuring the disclosed implementations. It should also be noted that the methods and systems disclosed herein are also suitable for applications unrelated to LLM routing systems.

The disclosed technology addresses the complex technical challenge of efficiently routing queries to models while simultaneously optimizing multiple competing objectives. To overcome limitations of traditional routing systems, the present disclosure introduces a routing system that employs advanced techniques in multi-objective optimization, context-aware state management, and continuous adaptive learning. This approach enables more nuanced and effective query routing that can balance a diverse set of objectives, including cost, latency, quality, data classification, and privacy requirements. The system implements a sophisticated multi-objective optimization engine to optimize across multiple dimensions. Unlike simple threshold-based approaches, this engine can identify solutions where improving one objective can necessarily result in the degradation of another, ensuring a balanced and efficient use of resources.

The system can incorporate a context-aware state management component. This allows the routing system to make informed decisions based on the full history of a conversation or user session rather than treating each query in isolation. By maintaining a comprehensive conversation state, including previous model selections, performance metrics, and accumulated context complexity, the system can make more intelligent routing choices that improve coherence and user experience over time. Furthermore, the system employs adaptive learning techniques that continuously refine routing strategies based on real-world performance and feedback. These techniques include implementing online learning algorithms that adjust to changing usage patterns, user preferences, and business requirements. By incorporating both implicit signals (such as user engagement metrics) and explicit feedback (like user ratings), the system can evolve its routing strategies to optimize for long-term performance and user satisfaction. The combination of these advanced techniques-multi-objective optimization, context-aware state management, and adaptive learning-represents a significant advancement over existing LLM routing solutions.

In particular, the disclosed technology provides a system and method for dynamically routing requests to models (e.g., LLMs, SLMs, RAG procedures, fine-tuned models, or other types of models) through multi-objective optimization, context-aware state management, and continuous adaptive learning mechanisms. The system receives session-specific data elements in response to a request to generate output using LLMs. These data elements can relate to a single session or can span multiple sessions. These data elements can include prior interaction data, system environment parameters, and computational context values, which are updated based on each request and response. The system determines operational constraints for routing the request to an LLM. The constraints can include subsets of constraints, such as a first subset including privacy and data handling protocols and a second subset encompassing processing latency thresholds, model response requirements, and resource allocation limitations. Using the session-specific data elements, the system dynamically updates weights for a multi-variable optimization. This optimization is then executed across multiple candidate LLMs, with each candidate satisfying the first subset of constraints and optimizing the second subset. The optimization process ensures that improving one constraint in the second subset results in the degradation of at least one other constraint in that subset. Based on the results of this multi-variable optimization, the system selects at least one candidate LLM for the request. The request is then routed to the selected LLM, causing it to generate the desired output.

The system can also incorporate a feedback mechanism. In some implementations, performance feedback can result in an automatic evaluation of which LLM should be used. In some implementations, upon receiving system performance feedback related to at least one constraint in the second subset, the system can automatically select a different LLM from among the candidate LLMs. This selection aims to improve the performance for the specific constraint, acknowledging that this improvement can result in the degradation of at least one other constraint in the second subset. This approach enables the system to balance multiple competing objectives, adapt to changing conditions, and continuously refine its routing decisions based on real-time performance feedback. By considering a comprehensive set of constraints and dynamically adjusting its optimization strategy, the system can make nuanced routing decisions that maximize overall performance across various metrics.

The system can implement sophisticated mechanisms for sharing memory and context across various LLMs, for example, when switching between models or to a different model. In some aspects, a centralized context repository can be maintained, storing relevant information from each interaction in a standardized format accessible to all LLMs within the system. This repository can include not only the raw conversation history but also derived features, entity recognition results, and semantic understanding outputs. When switching between LLMs, the system can employ intelligent context distillation algorithms to extract the most pertinent information from this repository, tailoring it to the specific capabilities and input requirements of the target LLM. In some cases, the system can utilize transfer learning techniques to efficiently adapt the context representation from one LLM's internal state to another, preserving contextual nuances while optimizing for the new model's architecture.

FIG. 1 illustrates an LLM routing system 100, in accordance with some implementations of the present technology. The LLM routing system 100 includes a user query input 102 that receives an incoming request stream. The user query input 102 can include incoming requests not only from users but also from other systems or models. For example, the input stream can include queries generated by other LLMs, automated systems, or AI agents. This flexibility allows the routing system to handle diverse input sources, including machine-generated queries, application programming interface (API) calls, or outputs from other models in a larger AI ecosystem. The system can process these various input types differently, taking into account their source and characteristics when making routing decisions. The LLM routing system 100 further includes a multi-objective optimization engine 104, a context-aware state management system 106, and an adaptive learning module 108. These components work synergistically to optimize LLM selection and usage based on various factors and constraints.

The multi-objective optimization engine 104 can implement a sophisticated optimization framework (for example, a Pareto optimization framework) that simultaneously considers multiple objectives. Multi-objective optimization is a field of study that deals with optimization problems involving multiple, often conflicting, objectives. Unlike single-objective optimization, which seeks to find the best solution for a single criterion, multi-objective optimization aims to find a set of solutions that represent optimal trade-offs between different objectives. This approach is particularly relevant in complex systems where decision-makers must balance multiple factors simultaneously.

This multi-objective optimization engine 104 can include several functions, including a cost function, latency function, quality function, carbon function, and/or privacy function. Each of these functions evaluates different aspects of LLM performance and resource utilization. For example, the cost function can calculate the expected financial cost of using a particular LLM for a given query, while the latency function estimates the expected response time. The quality function can assess the predicted accuracy and relevance of the LLM's output, and the carbon function can estimate the environmental impact of using the LLM in terms of carbon emissions. The privacy function can evaluate the data protection and compliance aspects of using a specific LLM.

The multi-objective optimization engine 104 also includes a constraint satisfaction module and dynamic weight adjustment capability. The constraint satisfaction module ensures that all selected LLMs meet mandatory requirements, such as compliance with rules and regulations (for example, data privacy regulations, IP rules compliance, etc.) or maximum latency thresholds. The dynamic weight adjustment feature allows the LLM routing system 100 to adapt its optimization priorities based on changing conditions or user preferences. For instance, during peak usage hours, the LLM routing system 100 can automatically increase the weight of the latency function to prioritize faster response times.

The context-aware state management system 106 maintains a comprehensive view of each conversation session and user interaction history. The context-aware state management system 106 includes a conversation state repository that tracks session IDs, interaction histories, and various metrics. A conversation complexity calculator analyzes semantic dependencies, token accumulation, and topic coherence to assess the complexity of ongoing conversations. This information helps the LLM routing system 100 make more informed routing decisions, especially for multi-turn interactions where context retention can be important.

The context-aware state management system 106 also incorporates state-based routing rules and maintains user profiles and preferences. These features enable the LLM routing system 100 to tailor its routing decisions based on individual user needs and past interactions. For example, if a user has consistently preferred more detailed responses, the LLM routing system 100 can route their queries to LLMs known for generating more comprehensive outputs. A performance tracking component within the context-aware state management system 106 monitors real-time metrics, quality scores, and latency. This continuous monitoring allows the LLM routing system 100 to quickly identify and respond to changes in LLM performance or user satisfaction.

The adaptive learning module 108 incorporates a feedback integration system with multi-source signal processing and reward signal calculation capabilities. The adaptive learning module 108 processes implicit engagement metrics (such as user interaction time or follow-up query patterns), explicit ratings provided by users, and business conversion key performance indicators (KPIs). By integrating these diverse feedback sources, the LLM routing system 100 can continuously refine its routing strategies to optimize for both user satisfaction and business objectives. The adaptive learning module 108 contains an online learning algorithm with gradient-based optimization and regularization features. This algorithm allows the LLM routing system 100 to adapt its routing decisions in real time based on the latest performance data and feedback. The adaptive learning module 108 also includes a meta-learning loop that enables cross-user pattern analysis and A/B testing. This feature allows the LLM routing system 100 to identify broader trends in user preferences and LLM performance, facilitating more generalized improvements to the routing algorithm.

An available LLM model pool 110 can include different model options. In some implementations, the available LLM model pool 110 includes SLMs, RAG procedures, fine-tuned models, or other model types. This available LLM model pool 110 provides the LLM routing system 100 with a range of options to choose from when routing queries, allowing it to select the most appropriate model based on the specific requirements and constraints of each request.

The LLM routing system 100 creates a closed-loop optimization cycle in which the multi-objective optimization engine 104, the context-aware state management system 106, and the adaptive learning module 108 enhance each other through continuous feedback and adaptation. For example, as the LLM routing system 100 routes queries and receives feedback, it can update its optimization weights, refine its state management rules, and adjust its learning algorithms. This continuous improvement cycle ensures that the LLM routing system 100 becomes increasingly effective at routing queries over time, adapting to changes in user behavior, LLM capabilities, and operational conditions.

In practice, the LLM routing system 100 can significantly enhance the efficiency and effectiveness of LLM utilization across various applications. For instance, in a customer service scenario, the LLM routing system 100 can route simple queries to faster, less expensive models within the available LLM model pool 110 while directing complex, nuanced inquiries to more sophisticated LLMs capable of handling intricate context. Similarly, in a content generation application, the LLM routing system 100 can select LLMs based on the specific style, tone, and complexity requirements of each content piece, balancing factors such as output quality, generation speed, and resource costs.

The architecture's modular design allows for easy integration of new objectives, constraints, or LLMs as they become available. This flexibility ensures that the LLM routing system 100 can evolve alongside advancements in LLM technology and changing operational requirements. Furthermore, the system's comprehensive approach to optimization, context management, and adaptive learning addresses many of the limitations found in simpler, single-objective routing systems, providing a more nuanced and effective solution for managing LLM resources in complex, dynamic environments.

In some implementations, the system receives a plurality of session-specific data elements in response to a request to generate output using LLMs. These session-specific data elements can include prior interaction data, system environment parameters, and computational context values. The prior interaction data encompasses comprehensive historical information about past interactions, decisions, and outcomes, including previous queries, selected models, response quality metrics, and user engagement patterns. System environment parameters capture the current state of the operational environment, including factors such as resource availability (CPU/GPU utilization percentages, memory allocation limits), network conditions (bandwidth, latency measurements, connection stability metrics), and external inputs (time of day, geographic location, regulatory jurisdiction identifiers). Computational context values provide detailed insights into the system's internal state, including processing loads (thread utilization, queue depths), memory usage (cache hit rates, garbage collection frequency), active algorithms (model version identifiers, parameter configurations), and run-time performance metrics (inference time, token processing rates).

The system continuously updates these session-specific data elements based on each request processed by the LLM routing system and each corresponding response generated. This dynamic updating ensures that the system maintains an up-to-date understanding of the operational context and routing behavior. For example, when the routing system processes a request, the system updates the prior interaction data to include details of this new interaction, such as the specific query text, timestamp, processing duration, and response characteristics. Similarly, the system environment parameters are refreshed to reflect any changes in the operational environment resulting from the request and response cycle, including updated resource utilization metrics, network performance indicators, and environmental conditions. The computational context values are recalculated to capture the current state of the routing system's processing capabilities and internal operations, with metrics such as memory allocation, thread utilization, and algorithm performance being updated in real time. This continuous updating process operates at multiple timescales, with some metrics being refreshed on a per-request basis (e.g., query-specific performance data) while others are updated at regular intervals (e.g., system-wide resource utilization trends) to balance accuracy with computational efficiency.

In some implementations, the system employs a sophisticated multi-layered data filtering mechanism to ensure compliance with privacy and security protocols. This filtering process excludes session-specific data elements that do not meet established compliance criteria through a series of progressively more stringent filters. For example, if certain types of personal data (such as personally identifiable information, health records, or financial details) are prohibited from being used in LLM routing decision-making processes, the filtering mechanism removes such data from the session-specific elements before they are utilized for further analysis or decision-making. The filtering mechanism implements various techniques including pattern matching against predefined sensitive data templates, statistical anonymization methods that preserve aggregate information while removing individual identifiers, and contextual analysis algorithms that identify potentially sensitive information based on surrounding content. Additionally, the system maintains detailed audit logs of all filtering operations, recording which data elements were excluded, the specific compliance rules that triggered the exclusion, and timestamps of when the filtering occurred. This comprehensive logging enables retrospective compliance verification and continuous improvement of the filtering mechanisms.

The system can implement various advanced data collection and processing techniques to efficiently gather and update session-specific data elements. For example, the system can use event-driven architectures to capture and process data in real time as users interact with LLMs, enabling immediate propagation of relevant state changes to all interested components. The system employs distributed stream processing frameworks that can handle millions of events per second with sub-millisecond latency, ensuring that all session-specific data remains current even under high load conditions. Additionally, the system can employ distributed data storage and retrieval mechanisms such as sharded databases, content-addressable storage systems, and hierarchical caching layers to handle large volumes of session-specific data across multiple LLMs and operational contexts. These storage systems can implement sophisticated partitioning strategies based on access patterns, data locality requirements, and retrieval frequency to optimize performance. For time-series data such as performance metrics and interaction histories, the system utilizes specialized time-series databases with efficient compression algorithms and automated data retention policies that maintain high-resolution recent data while progressively down sampling older information to balance storage requirements with analytical capabilities.

The system determines a hierarchy of operational constraints for routing requests to LLMs. This hierarchy can include two primary subsets of constraints: a first subset related to privacy and data handling protocols, and a second subset encompassing processing latency thresholds, model response requirements, and resource allocation limitations. The hierarchical structure enables the system to prioritize critical requirements (such as regulatory compliance and data protection) while optimizing for performance and efficiency within those boundaries. The constraint hierarchy can be implemented as a directed acyclic graph (DAG) where nodes represent individual constraints and edges define dependency and priority relationships. This structure allows the system to efficiently evaluate constraint satisfaction by traversing the graph in topological order, ensuring that high-priority constraints are checked before dependent lower-priority ones. The constraint definitions themselves can be expressed using a domain-specific language that supports both simple threshold conditions (e.g., "latency must be below 500 ms") and complex logical expressions combining multiple metrics and contextual factors (e.g., "for financial queries from enterprise customers during business hours, use only models with SOC 2 compliance and response accuracy above 95%").

The system dynamically updates weights for multi-variable optimization using session-specific data elements. This dynamic weight updating process enables real-time adaptation to changing conditions and priorities within the operational environment. The session-specific data elements used for weight updating include prior interaction data, system environment parameters, and computational context values. These elements form a comprehensive dataset that captures both historical performance and current operational conditions, enabling the system to make informed adjustments to optimization priorities. The weight updating mechanism implements a sophisticated mathematical framework that translates observed changes in operational metrics into proportional adjustments to objective weights, ensuring that the optimization process remains responsive to evolving requirements while maintaining overall system stability.

The system continuously monitors these session-specific data elements to detect changes that warrant weight adjustments. Prior interaction data includes metrics such as response times, accuracy rates, resource utilization patterns, and user satisfaction scores from previous interactions. For example, the system tracks detailed performance metrics for each LLM, including token processing rates (measured in tokens per second), factual accuracy scores (calculated through comparison with verified knowledge bases), and user engagement metrics (such as time spent reviewing responses and follow-up query patterns). System environment parameters capture the current state of the operational context, including factors such as network latency (measured in milliseconds between request and initial response), available computational resources (quantified as percentage of GPU/CPU capacity, memory allocation limits, and queue depths), active user load (tracked as concurrent sessions and requests per minute), and time of day (correlated with historical usage patterns). Computational context values provide insights into the internal state of the system, including processing loads (thread utilization percentages, queue depths for different priority levels), memory usage (cache hit rates, garbage collection frequency, memory fragmentation metrics), active algorithms (model version identifiers, parameter configurations, optimization settings), and run-time performance metrics (inference time per token, attention mechanism efficiency, context window utilization).

To determine revised weights for the multi-variable optimization, the system analyzes changes in the monitored data elements. For example, if the prior interaction data shows a trend of increasing response times, the system adjusts the weight associated with the latency objective to prioritize faster responses. Similarly, if system environment parameters indicate a surge in user activity, the system increases the weight of the scalability objective to ensure efficient resource allocation during peak demand periods. During periods of high system load, when resource contention increases operational costs, the system can dynamically increase the cost function weight to favor more economical models, potentially adjusting from a default weight of 0.3 to 0.5 to reflect the heightened importance of cost efficiency under current conditions.

Once revised weights are determined, the system applies them to adjust the relative importance of objectives within the multi-variable optimization process. This adjustment alters how the system balances competing goals such as performance, cost, quality, and resource efficiency. For example, if the revised weights increase the importance of energy efficiency due to detected changes in power consumption patterns, the optimization process prioritizes solutions that minimize energy usage, potentially at the expense of marginal performance gains.

The dynamic weight updating process can operate on multiple timescales to address both rapid fluctuations and longer-term trends. Short-term weight adjustments occur in near real time, responding to immediate changes in the operational environment. For instance, if a sudden spike in network latency is detected, the system quickly increases the weight of the communication efficiency objective to compensate. These rapid adjustments typically operate on a sub-minute timescale, with weight updates occurring as frequently as every 10-15 seconds during periods of high volatility. The system implements a sliding window approach for short-term adjustments, considering only the most recent 50-100 data points to ensure responsiveness to emerging conditions. Longer-term weight adjustments are based on aggregated data over extended periods, capturing gradual shifts in system behavior or user preferences. These adjustments ensure that the optimization process remains aligned with evolving operational patterns and strategic priorities. The system employs time-series decomposition techniques to separate seasonal patterns (such as daily or weekly cycles) from underlying trends, enabling it to distinguish between recurring fluctuations and genuine evolutionary changes in system behavior. Long-term adjustments typically operate on timescales ranging from hours to days, with comprehensive weight recalibrations performed during scheduled maintenance windows to minimize disruption to ongoing operations.

To implement dynamic weight updating, the system utilizes a flexible optimization framework that supports runtime modification of objective weights. The system employs efficient update mechanisms to propagate weight changes throughout the optimization process without requiring a full recomputation. For example, incremental optimization techniques allow the system to rapidly adjust existing solutions based on weight changes rather than solving the entire optimization problem from scratch.

In some implementations, the system implements context-aware weight updating by maintaining separate weight profiles for different operational modes or user segments. For example, the system uses distinct weight configurations for high-load periods versus low-activity periods or for premium users versus standard users. These context-specific weights enable more nuanced optimization that accounts for varying priorities and constraints across different operational contexts. The system can implement a time-of-day cost weighting schedule where cost sensitivity varies throughout the day, with higher weights during peak hours (0.8 during 9:00 a.m. to 5:00 p.m. business hours) when resources are in high demand, moderate weights during evening hours (0.5 during 5:00 p.m. to 10:00 p.m.), and lower weights during overnight periods (0.3 during 10:00 p.m. to 9:00 a.m.) when excess capacity is available.

In some implementations, user segment quality weighting can adjust constraint priorities based on user characteristics, with premium users receiving higher-quality weights (0.9) compared to standard users (0.7) or trial users (0.5). These dynamic adjustments are implemented through a rule engine that evaluates current conditions against predefined adjustment policies, modifying constraint weights accordingly. The system maintains a library of weight profiles for common operational scenarios, such as "business hours," "maintenance window," "marketing campaign," and "holiday peak," each defining a complete set of objective weights optimized for the specific context. When the system detects a transition between operational modes, it smoothly interpolates between the corresponding weight profiles over a configurable period (typically 5-15 minutes) to prevent abrupt changes in optimization behavior.

By dynamically updating weights for multi-variable optimization using session-specific data elements, the system creates a highly adaptive decision-making framework. This framework continuously refines its prioritization of objectives based on real-time operational insights, enabling more efficient and context-appropriate resource allocation, task routing, and performance optimization. This balanced approach enables the system to adapt effectively to both expected variations (such as daily usage patterns and planned operational changes) and unexpected developments (such as sudden shifts in user behavior or environmental conditions), maintaining optimal performance across diverse and dynamic operational scenarios. The resulting optimization framework demonstrates significant advantages over static approaches, including improved resource utilization efficiency (typically 15-25% reduction in idle resources), enhanced user satisfaction (measured through engagement metrics and explicit feedback), and greater operational resilience (quantified as reduced performance variability under changing conditions).

The system executes a multi-variable optimization across a plurality of candidate LLMs. This optimization process involves evaluating multiple objectives simultaneously to find solutions that balance competing priorities. In the context of model selection, these objectives can include factors such as processing speed (measured in tokens per second or total response time), output quality (assessed through metrics like relevance, coherence, and factual accuracy), resource utilization (quantified as computational resources consumed, including CPU/GPU cycles, memory usage, and network bandwidth), and operational cost (calculated based on per-token pricing, subscription fees, or infrastructure expenses). This approach is particularly valuable in complex systems where decision-makers must balance multiple factors simultaneously, such as in resource allocation, portfolio management, and—as in this case— LLM selection.

The multi-variable optimization can begin with the identification of candidate LLMs that satisfy the first subset of constraints. These constraints, as discussed earlier, can focus on privacy, data handling protocols, or other constraints. For example, the system can filter out LLMs that do not meet specific data encryption standards or those that process data in unauthorized geographical locations (violating data sovereignty requirements like cross-border data transfers). The system implements sophisticated filtering mechanisms that evaluate each potential LLM against a comprehensive set of privacy and compliance criteria. For example, when handling healthcare information, the system can restrict consideration to only those LLMs specifically certified for HIPAA compliance, which requires stringent safeguards for protected health information including access controls, audit trails, and secure transmission protocols. This initial filtering ensures that all candidate LLMs under consideration meet the non-negotiable requirements for data security and regulatory compliance.

Once the system has identified the set of candidate LLMs that satisfy the first subset of constraints, it proceeds to optimize across the second subset of constraints. This second subset can include factors such as processing latency thresholds (e.g., maximum acceptable response times), model response requirements (e.g., qualitative and quantitative criteria for outputs, including coherence, factual accuracy, and adherence to specified formats), resource allocation limitations (e.g., computational resources available for LLM processing, including CPU time, GPU utilization, memory allocation, and network bandwidth), or other constraints. The optimization process then aims to find solutions that provide the best possible performance across these variables, recognizing that improvements in one area can often come at the expense of another.

Figure 2:
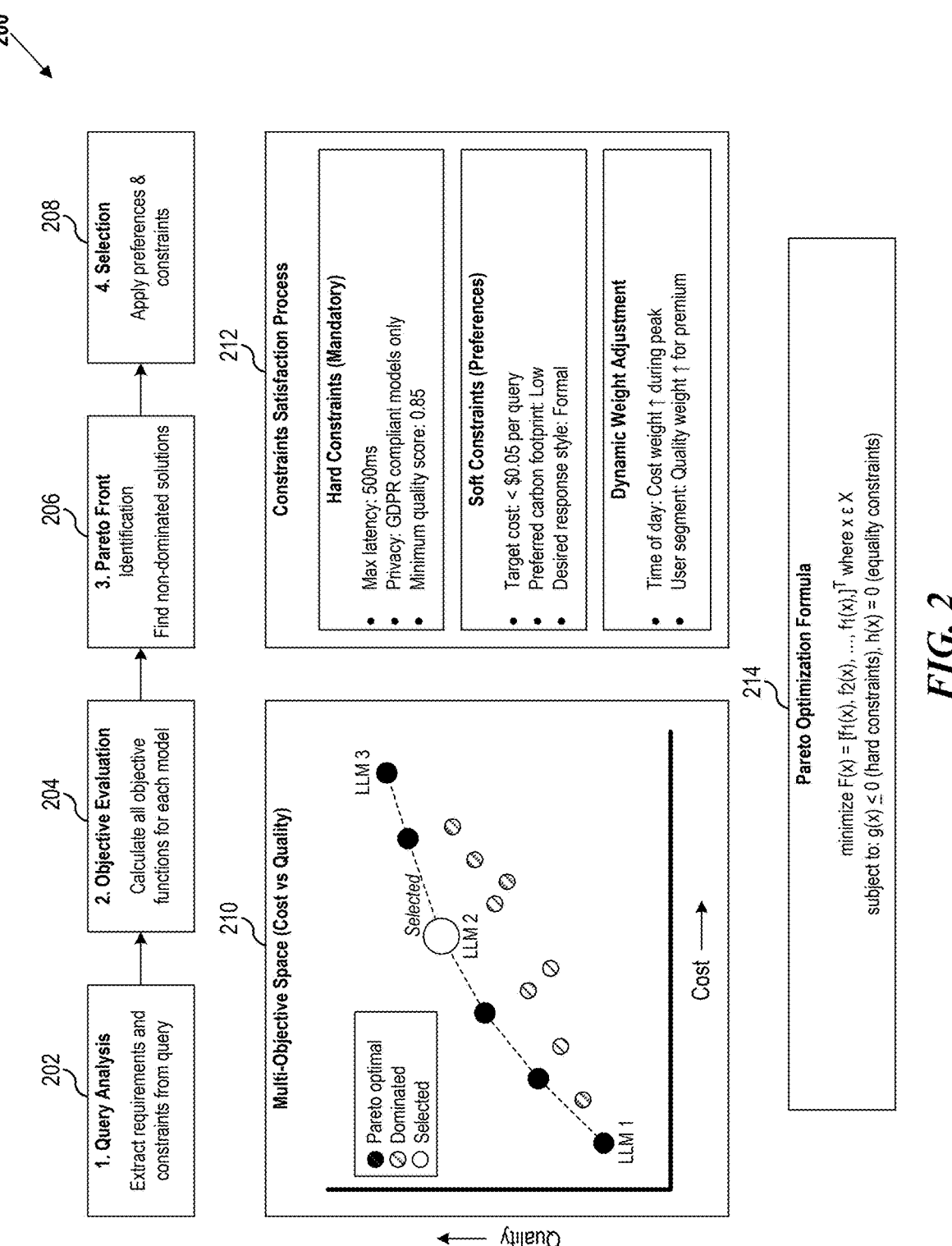
FIG. 2 illustrates a multi-objective optimization process, in accordance with some implementations of the present technology.

FIG. 2 illustrates a multi-objective optimization process 200, in accordance with some implementations of the present technology. The process begins with query analysis 202, where the system extracts key requirements and constraints from the incoming query. This analysis involves sophisticated natural language understanding techniques, including intent classification (categorizing the query's purpose, such as information retrieval, task completion, or creative generation), entity recognition (identifying key objects, concepts, or parameters mentioned in the query), and semantic parsing (determining the logical structure and relationships within the query). For example, when analyzing a query like "Generate a summary of the quarterly financial report that highlights revenue growth trends," the system can identify the intent as "summarization," recognize entities such as "quarterly financial report" and "revenue growth trends," and understand the semantic relationship requiring the summary to focus specifically on growth trends. This detailed analysis informs the subsequent steps of the optimization process, ensuring that the selected LLM aligns with the specific needs of the query. The query analysis component employs advanced machine learning models trained on diverse query datasets to accurately extract these elements even from ambiguous or complex requests, achieving classification accuracy rates typically exceeding 95% for common query types.

Following query analysis, the system performs objective evaluation 204 for each candidate LLM. This step involves calculating the performance of each model across the various objectives defined in the second subset of constraints. For example, the system can evaluate the expected processing time (using predictive models that estimate inference duration based on input length, model architecture, and current system load), estimated resource consumption (calculating anticipated CPU/GPU utilization, memory requirements, and network bandwidth needs), and predicted output quality (using specialized evaluation models that assess factors like relevance, coherence, and factual accuracy) for each LLM when applied to the current query. The objective evaluation component implements prediction algorithms that combine historical performance data with real-time system metrics to generate accurate estimates. For instance, the latency prediction model can incorporate factors such as current queue depths, observed processing rates for similar queries, and known performance characteristics of each model architecture. These predictions are continuously refined through feedback loops that compare estimated values with actual outcomes, enabling the system to achieve prediction accuracy that typically improves over time, with error rates decreasing from initial levels of 15-20% to stabilized rates of 5-8% after sufficient operational data has been collected.

The system then performs Pareto front identification 206. This can involve identifying a set of solutions for which improving one objective necessarily results in the degradation of at least one other objective. In the context of LLM selection, a solution on the Pareto front represents an LLM configuration where any improvement in, for example, processing speed can only be achieved by accepting lower output quality or higher resource consumption. The Pareto front identification process employs computational geometry algorithms to efficiently identify non-dominated solutions from the candidate pool. A solution is considered "non-dominated" if no other solution exists that is superior in all objectives simultaneously. For example, if LLM-A processes queries in 200 ms with 85% quality and $0.03 cost, while LLM-B processes in 300 ms with 95% quality and $0.02 cost, neither dominates the other since each excels in different dimensions. Both can be part of the Pareto-optimal set, representing different but equally valid trade-offs between speed, quality, and cost.

The multi-objective space graph 210 visually represents this optimization process. The graph plots different solutions, with some marked as Pareto optimal and others as dominated. Dominated solutions are those for which there exists at least one other solution that performs better in all objectives. The graph also shows a trajectory between different LLM models, illustrating how they occupy distinct positions in the trade-off space between objectives such as cost and quality. This visualization helps stakeholders understand the relationship between different models and the trade-offs involved in selecting one over another. For example, the graph can show LLM 1 positioned at the low-cost, moderate-quality region, LLM 2 in the midrange for both cost and quality, and LLM 3 in the high-quality, high-cost region. The Pareto front can connect these non-dominated solutions, forming a curve that represents the boundary of what is currently achievable given the available models. Any point below this curve represents a dominated solution that should not be selected, as there exists at least one option on the Pareto front that offers better performance in all dimensions. The system can generate these visualizations dynamically to support decision-making and provide transparency into the optimization process, helping users understand why particular models were selected for specific tasks.

After identifying the Pareto-optimal set of solutions, the system proceeds to selection 208. This step involves applying user preferences and constraint priorities to choose the most appropriate solution from the Pareto-optimal set. The selection process balances multiple factors according to the current context and requirements of the specific query. The system implements several sophisticated selection strategies to navigate this final decision. One approach uses weighted sum methods, where each objective is assigned a weight reflecting its relative importance, and the solution with the best weighted score is selected. For example, in a customer service scenario, quality can receive a weight of 0.5, latency 0.3, and cost 0.2, leading to the selection of a model that prioritizes accuracy over speed or economy. Another approach employs reference point methods, where an "ideal" target is defined for each objective, and the system selects the solution closest to this ideal point in the normalized objective space. The system can also implement interactive selection processes for high-stakes decisions, presenting the Pareto-optimal alternatives to human decision-makers along with visualizations of the trade-offs involved. The selection component incorporates contextual factors such as time of day, user preferences, application domain, and current system load when determining the appropriate weights or reference points. For instance, during peak usage hours, the system can increase the importance of latency and resource efficiency, while during off-peak hours it can prioritize quality and thoroughness.

The constraints satisfaction process 212 illustrates how the system applies both hard and soft constraints during the optimization process. The hard constraints include mandatory requirements that cannot be violated, such as maximum latency thresholds or minimum quality scores. These hard constraints can align with the first subset of constraints related to privacy and data handling protocols as well as critical performance thresholds from the second subset. The system implements these hard constraints as filtering predicates that eliminate candidate models failing to meet any mandatory requirement, regardless of their performance on other dimensions. For example, if a regulatory requirement mandates that all data processing must occur within specific geographical boundaries (e.g., EU data must be processed within the EU for GDPR compliance), any model that cannot guarantee this locality can be immediately excluded from consideration, regardless of its performance in terms of quality, speed, or cost. Similarly, if a service level agreement (SLA) specifies a maximum response time of 500 milliseconds for critical applications, models that cannot consistently meet this threshold can be filtered out. The system can employ a constraint propagation algorithm that efficiently evaluates these requirements in order of computational complexity, starting with simple checks (such as binary compliance flags) before proceeding to more expensive evaluations (such as quality prediction models), thereby minimizing unnecessary computation for candidates that will ultimately be rejected.

The soft constraints outline preferences that the system strives to meet when possible, without violating the hard constraints. These soft constraints are incorporated into the optimization objective function as weighted penalty terms. For example, the system can apply a penalty proportional to how much a model's expected cost exceeds a target threshold. Unlike hard constraints, which are implemented as binary filters, soft constraints can influence the relative desirability of different solutions without absolutely excluding any options. For instance, a soft constraint can specify a target cost of $0.05 per query, but models exceeding this cost can still be considered if they offer significant advantages in other dimensions. The system implements these soft constraints through penalty functions that quantify the degree of deviation from the desired target. For example, a quadratic penalty function can impose a penalty proportional to the square of the difference between the actual cost and the target cost, creating progressively stronger disincentives for larger deviations. The soft constraint implementation includes normalization mechanisms that convert disparate metrics (such as dollars, carbon emissions, and stylistic scores) into comparable units, enabling meaningful aggregation into a single objective function. This approach allows the system to make nuanced trade-offs between different soft constraints based on their relative importance in the current context.

In some implementations, the system can adapt the relative importance of different constraints based on contextual factors. This adaptive weighting mechanism enables the optimization process to remain responsive to changing operational conditions and user requirements. For example, the time-of-day cost weighting implements a schedule-based approach where cost sensitivity varies throughout the day, with higher weights during peak hours when resources are in high demand and lower weights during off-peak periods when excess capacity is available. The system can set the cost weight to 0.8 during business hours (9:00 a.m. to 5:00 p.m.) when system load is highest, reduce it to 0.5 during evening hours (5:00 p.m. to 10:00 p.m.) when demand is moderate, and further lower it to 0.3 during overnight hours (10:00 p.m. to 9:00 a.m.) when resources are abundant. Similarly, the user segment quality weighting adjusts constraint priorities based on user characteristics, with premium users receiving higher-quality weights (e.g., 0.9) compared to standard users (e.g., 0.7) or trial users (e.g., 0.5). These dynamic adjustments can be implemented through a rule engine that evaluates current conditions against predefined adjustment policies, modifying constraint weights accordingly. The adjustment system also includes feedback mechanisms that monitor the outcomes of routing decisions and fine-tune the weighting parameters over time to optimize overall system performance and user satisfaction. For example, if increasing the quality weight during customer service interactions consistently leads to improved satisfaction scores and higher task completion rates, the system can preferentially apply similar adjustments in comparable scenarios.

The Pareto optimization formula 214 illustrates a mathematical foundation of the process. This formula implements the core optimization algorithm that identifies the set of non-dominated solutions from which the final selection is made. The formula can be represented as min $f(x)=[w_1f_1(x), w_2f_2(x), \ldots, w_nf_n(x)]$ subject to $g(x)\leq 0$ and $h(x)=0$, where $f(x)$ is the vector of objective functions to be minimized, w represents the weight vector $[w_1, w_2, \ldots, w_n]$ that can be dynamically updated, $g(x)$ represents inequality constraints (such as "latency must be below 500 ms"), and $h(x)$ represents equality constraints (such as "data must be processed in the EU region"). This mathematical formulation enables the system to express complex multi-objective optimization problems in a structured way that can be solved using various computational techniques.

By executing this multi-variable optimization process, the system can efficiently compare and evaluate multiple candidate LLMs across a complex, multi-dimensional decision space. This approach enables the selection of LLMs that not only meet critical privacy and security requirements but also provide optimal performance across various operational metrics. The system's constraint-based approach provides several key advantages, including the ability to handle complex, multi-dimensional decision spaces with dozens of potential models and numerous competing objectives; guaranteed satisfaction of critical requirements through strict enforcement of hard constraints; and flexible adaptation to changing conditions through dynamic weight adjustment and continuous performance monitoring. These capabilities enable the system to make sophisticated routing decisions that maximize value across multiple dimensions simultaneously rather than optimizing for a single metric at the expense of others.

Once the system has performed the multi-variable optimization, the system selects, based on the multi-variable optimization, at least one candidate LLM for the request. This selection process involves comparing the results of the multi-variable optimization for each of the plurality of candidate LLMs that satisfies the first subset of constraints. The system can evaluate how closely each candidate LLM satisfies the second subset of constraints in accordance with the dynamically updated weights. The system can then select the at least one candidate LLM that most closely satisfies the second subset of constraints in accordance with the dynamically updated weights. For example, if the second subset of constraints includes processing latency thresholds, model response requirements, and resource allocation limitations, the system compares how well each candidate LLM performs across these dimensions based on the optimization results. The selection algorithm can implement a scoring mechanism that combines the weighted performance metrics for each candidate LLM into a comprehensive score. The selection process incorporates the trade-offs between different objectives as identified through the Pareto optimization. For instance, one candidate LLM can offer the fastest processing time but at a higher computational cost, while another can provide higher-quality outputs but with slower response times. The system evaluates these trade-offs in light of the current context and priorities as reflected in the dynamically updated weights. The system implements this selection process using algorithms that can handle large candidate pools and complex weighting schemes, enabling real-time decision-making even under changing conditions.

In some implementations, the system determines a context complexity score. This score can be derived from the plurality of session-specific data elements. This score quantifies the complexity of the current request and its associated context. For example, the context complexity score can consider factors such as the length and intricacy of the input query, the depth of domain-specific knowledge required, the number of interrelated concepts involved, and the historical context accumulated from previous interactions within the same session. The context complexity calculation employs a multi-faceted approach that combines several specialized metrics. Semantic depth analysis examines the conceptual sophistication of the query, identifying abstract concepts, specialized terminology, and complex logical relationships. This analysis uses techniques such as dependency parsing, semantic role labeling, and ontology mapping to quantify the conceptual complexity.

The system can apply a complexity threshold for selecting the candidate LLM based on the context complexity score. This approach ensures that requests with high complexity are routed to more sophisticated models capable of handling intricate queries, while simpler requests can be efficiently processed by less resource-intensive models. For instance, if the context complexity score exceeds a predefined threshold, the system can prioritize candidate LLMs with larger parameter counts or more extensive training in relevant domains. The complexity-based routing implements a tiered approach with multiple thresholds corresponding to different model capabilities. This tiered approach optimizes resource allocation by matching query complexity with appropriate model capabilities, avoiding the inefficiency of using overpowered models for simple tasks while ensuring that complex queries receive the sophisticated processing they require. The system can dynamically adjust these thresholds based on observed performance patterns, user feedback, and changing model capabilities, ensuring that the complexity-based routing remains effective as the LLM ecosystem evolves.

Figure 3:
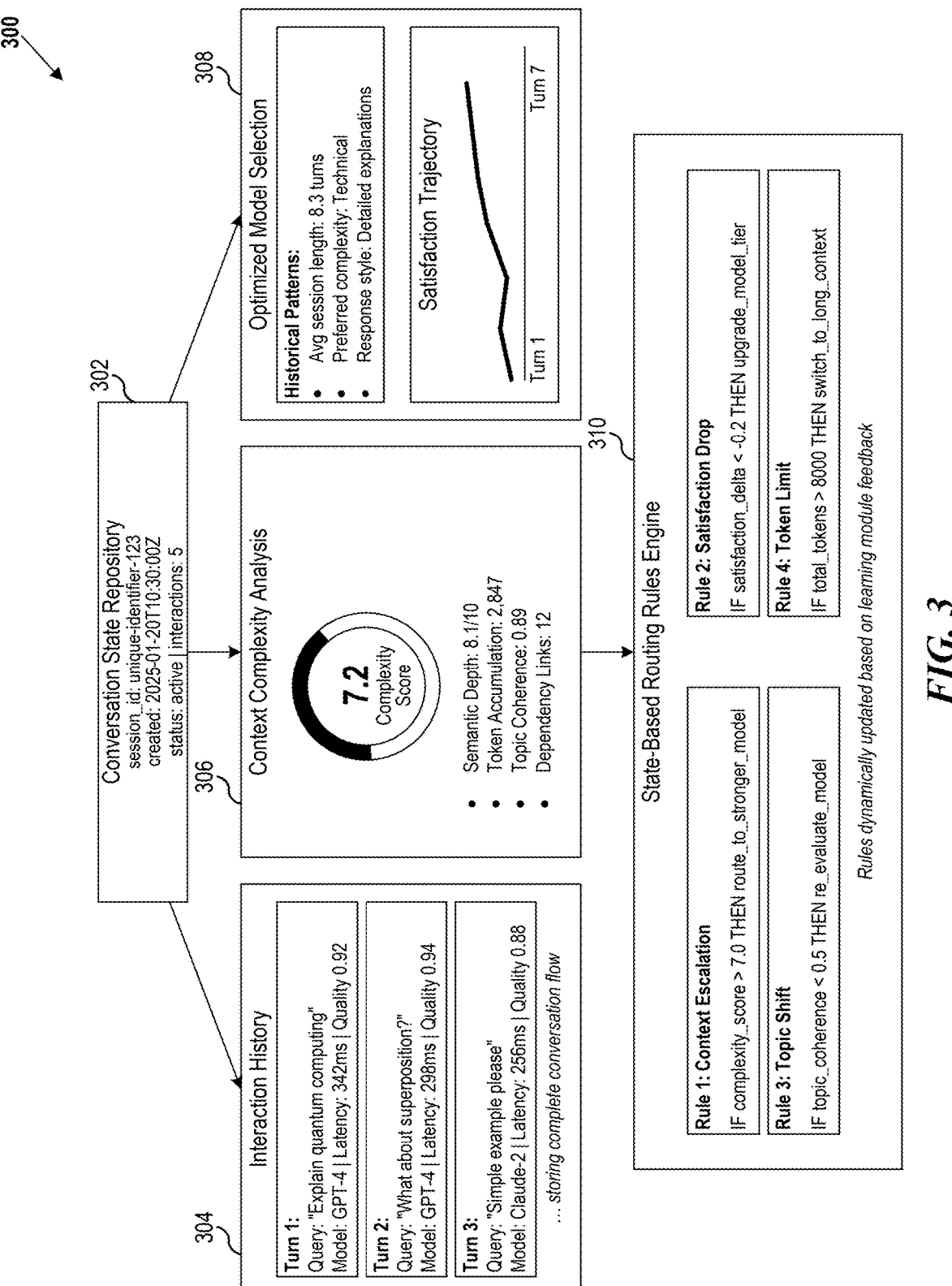
FIG. 3 illustrates a state management system, in accordance with some implementations of the present technology.

FIG. 3 illustrates a state management system 300, in accordance with some implementations of the present technology. The conversation state repository 302 stores session information, including a unique identifier, creation timestamp, status, and interaction count. This conversation state repository 302 provides a comprehensive view of the conversation history and context, which informs the LLM selection process. The state management system 300 maintains a persistent record of each conversation session, enabling the system to make routing decisions informed by the full history rather than treating each query in isolation. The conversation state repository 302 can track session-level metrics such as average response times, user satisfaction indicators, and aggregate complexity measures that provide a high-level view of the conversation's characteristics and performance. This comprehensive state management enables sophisticated routing strategies that consider the full conversation context, leading to more coherent and contextually appropriate responses compared to stateless routing approaches.

The interaction history 304 can include a record of conversation turns, including queries, model selections, latency measurements, and quality scores. The interaction history 304 contributes to the context complexity score and helps the system make informed decisions about which LLM to select for the current request. The interaction history 304 maintains a detailed log of each turn in the conversation, capturing both user inputs and system responses along with associated metadata. For each turn, the system records the raw query text, any preprocessing applied (such as entity anonymization or prompt reformulation), the specific LLM selected to handle the request, and comprehensive performance metrics for the interaction. These metrics include precise latency measurements broken down by processing stage (e.g., queue time, inference time, post-processing time), quality assessments derived from both automated evaluations and user feedback, and resource utilization statistics. The interaction history 304 can also track contextual shifts within the conversation, such as topic transitions, changes in user intent, or escalations in complexity. This detailed record enables sophisticated analysis of conversation patterns and model performance across different contexts. For example, the system can identify that a particular LLM consistently performs well for factual queries but struggles with creative requests from the same user, informing future routing decisions.

The context complexity analysis 306 illustrates a complexity score along with additional metrics including semantic depth, token accumulation, topic coherence, and dependency links measurements. These metrics can collectively form the basis for calculating the context complexity score used in LLM selection. The semantic depth metric can quantify the conceptual sophistication of the conversation, with higher values indicating more abstract, specialized, or nuanced content. The token accumulation metric can track both the raw volume of relevant context (measured in tokens) and a weighted measure that prioritizes more recent or semantically significant information. The topic coherence metric can evaluate the diversity and interconnectedness of subjects within the conversation, with lower scores indicating focused discussions on a single topic and higher scores reflecting conversations that span multiple related or unrelated domains. The dependency links measurement can quantify the degree of referential complexity in the conversation, tracking anaphora (references to previously mentioned entities), discourse markers, and logical dependencies between different parts of the discussion. Together, these metrics can provide a multi-dimensional view of conversation complexity that guides LLM selection toward models with appropriate capabilities for the specific context.

The optimized model selection 308 can utilize historical patterns data showing average session length and preferences along with a satisfaction trajectory graph plotting user satisfaction trends. The optimized model selection 308 can influence the selection process by favoring LLMs that have historically performed well in similar contexts or for users with similar satisfaction trajectories. The historical patterns component analyzes aggregated data across multiple sessions to identify recurring characteristics and preferences. The satisfaction trajectory graph visualizes how user satisfaction has evolved throughout the current session, typically measured through a combination of explicit feedback (such as ratings or comments) and implicit signals (such as engagement metrics or linguistic markers of satisfaction/frustration).

Once the system has selected the candidate LLM, it routes the request to the chosen model to generate the output. This routing process involves sending the input query, along with any relevant context or parameters, to the selected LLM for processing. The routing mechanism ensures that the request is properly formatted and includes all necessary information for the chosen LLM to generate an appropriate response. The routing system implements a sophisticated request preparation pipeline that optimizes the input for the specific characteristics of the selected model. This pipeline includes context distillation algorithms that identify and extract the most relevant information from the conversation history, reducing the full context to a concise yet comprehensive summary that fits within the model's context window limitations while preserving essential details. For models with specific formatting requirements or prompt engineering best practices, the system applies appropriate templates and structural elements to maximize performance.

The routing mechanism can also handle authentication and authorization requirements for accessing different LLMs, managing API keys, rate limits, and usage quotas transparently. The system implements efficient connection pooling and request batching where appropriate to minimize overhead and maximize throughput when sending multiple requests to the same model. Additionally, the routing layer includes comprehensive monitoring and instrumentation that tracks request volumes, success rates, and performance metrics for each model, enabling continuous optimization of the routing strategy based on observed behavior.

In some implementations, the system can route the request to multiple candidate LLMs in parallel, particularly in cases where different models excel in complementary aspects of the task. For example, one LLM can be selected for its strength in factual accuracy, while another can be chosen for its natural language generation capabilities. The system can then combine or select from the outputs of these models to produce the final response. This ensemble routing approach implements several sophisticated strategies for leveraging multiple models simultaneously. In the competitive ensemble method, the system sends identical requests to multiple models and selects the best response based on automated quality evaluations or confidence scores.

For example, a request to analyze financial data and generate a narrative summary can route the analytical portion to a model fine-tuned for numerical reasoning while the narrative generation is handled by a model optimized for natural language generation. The sequential ensemble method implements a pipeline where the output from one model becomes the input to another, enabling progressive refinement or transformation of the content. For example, an initial response generated by a fast but less precise model can be sent to a second model specialized in fact-checking and correction, producing a final response that combines the efficiency of the first model with the accuracy of the second. These ensemble approaches can be valuable for complex or high-stakes tasks where leveraging the complementary strengths of multiple models can produce superior results compared to any single model alone.

As shown in FIG. 3, the state-based routing rules engine 310 implements rules such as context escalation, satisfaction drop, topic shift, and token limit. These rules can influence both the selection of the candidate LLM and the routing process. For instance, if the context escalation rule is triggered due to increasing complexity, the system can route the request to a more capable LLM. Similarly, if the satisfaction drop rule is activated, the system can select an LLM that has historically performed well in improving user satisfaction for similar queries. The context escalation rule monitors the complexity score and triggers when it exceeds predefined thresholds or shows a significant rate of increase. For example, the rule can specify that "If complexity_score>7.0 OR complexity_increase_rate>0.5 per turn, then route to high-capacity model." This ensures that conversations that become increasingly sophisticated are handled by models with sufficient capabilities to maintain quality.

The satisfaction drop rule detects declining user satisfaction and implements interventions to reverse the trend. The rule can be formulated as "If satisfaction_score decreases by >15% over 2 consecutive turns, then upgrade model tier and prioritize quality over cost." This responsive approach helps prevent user frustration and abandonment by proactively adjusting the routing strategy when negative trends are detected. The topic shift rule identifies significant changes in conversation subject matter and adjusts routing accordingly. For instance, "If topic_coherence<0.6 between current query and previous context, then re-evaluate model selection based on new topic requirements." This ensures that model selection remains appropriate even when conversations pivot to new domains with different knowledge or capability requirements.

The token limit rule manages context window constraints by implementing strategies for handling conversations that approach model limitations. The rule can specify that "If accumulated_tokens>80% of model context window, then either summarize context, select model with larger context window, or segment conversation." This prevents quality degradation or errors that can occur when conversations exceed model capacity limits. These rules operate within a comprehensive rules engine 310 that evaluates conditions in real time and applies appropriate actions based on the current conversation state, creating a dynamic and responsive routing system that adapts to evolving conversation characteristics.

By leveraging the comprehensive context information, complexity analysis, and historical performance data illustrated in FIG. 3, the system can make sophisticated decisions about which LLM to select and how to route requests. This approach ensures that each query is processed by the most appropriate model given the current context, complexity, and optimization priorities, ultimately leading to more effective and efficient use of LLM resources. The state-based routing system represents a significant advancement over stateless approaches that treat each query independently. By maintaining comprehensive conversation context and applying sophisticated analysis techniques, the system can make more informed routing decisions that consider the full trajectory of the interaction rather than just the current query in isolation.

The system can automatically select a different LLM in response to receiving system performance feedback relating to at least one constraint in the second subset of constraints. This automatic selection process aims to improve performance for the specific constraint while acknowledging that this improvement can result in the degradation of at least one other constraint in the second subset. The system implements a feedback loop that continuously monitors and evaluates LLM performance across multiple dimensions, enabling dynamic adjustments to model selection based on real-time operational data. This adaptive model selection capability represents a significant advancement over static routing approaches that maintain fixed model assignments regardless of observed performance.

The feedback loop incorporates multiple data sources to assess model performance, including direct measurements (such as response times, error rates, and resource utilization), user feedback (both explicit ratings and implicit engagement signals), and business metrics (such as task completion rates and conversion metrics). The system employs statistical analysis techniques to distinguish between random fluctuations and significant performance trends. When performance metrics for a specific constraint consistently deviate beyond control limits, the system triggers the model selection reevaluation process.

To facilitate this automatic selection process, the system retrieves an updated plurality of session-specific data elements. These updated data elements encompass a wide range of information, including recent interaction histories, current system environment parameters, and the latest computational context values. For example, the updated data elements include metrics such as response latency, output quality scores, resource utilization rates, and user satisfaction indicators collected since the last model selection decision.

Upon retrieving the updated session-specific data elements, the system dynamically updates the weights used in the multi-variable optimization process. This weight updating mechanism translates recent performance data and feedback into proportional adjustments to the relative importance of different optimization objectives. For instance, if the system receives feedback indicating that response quality has fallen below acceptable thresholds, the weight associated with the quality objective increases to prioritize this aspect in subsequent optimizations.

The system increases the weight associated with an objective within the multi-variable optimization corresponding to the at least one constraint in the second subset for which performance feedback has been received. This targeted weight adjustment ensures that the optimization process places greater emphasis on improving the specific aspect of performance that has been identified as suboptimal. For example, if the system receives feedback that processing latency has exceeded desired thresholds, the weight for the latency-related objective increases depending on the severity of the issue and the relative importance of latency in the current operational context.

After adjusting the weights, the system re-executes the multi-variable optimization using the increased weight and the updated plurality of session-specific data elements. This re-optimization process generates an updated candidate set of LLMs that reflects both the new prioritization (as expressed through the adjusted weights) and the current operational context (as captured in the updated data elements). The optimization algorithm considers factors such as model capabilities, historical performance, resource requirements, and compatibility with current system constraints to identify LLMs that offer the best potential performance under the new conditions.

The re-execution of the multi-variable optimization employs mathematical techniques to navigate the complex, multi-dimensional decision space created by competing objectives and constraints. For instance, the system implements a Pareto optimization approach that identifies non-dominated solutions-LLMs for which improving performance on one objective necessarily degrades performance on at least one other objective. This approach ensures that the system considers the full range of trade-offs involved in model selection, rather than simplistically optimizing for a single metric at the expense of all others. For example, the system implements incremental optimization techniques that start from the previous optimal solution and make targeted adjustments based on the weight changes and updated data. This approach significantly reduces computational overhead compared to a full re-optimization, enabling rapid adaptation to changing conditions. The techniques discussed above in relation to FIG. 2 can be implemented to re-execute the multi-variable optimization.

The system can select, as the different LLM, a candidate LLM from the updated candidate set that provides improved performance for the at least one constraint of the second subset while still satisfying the first subset of constraints. This selection process involves evaluating each candidate LLM against the full set of constraints and objectives, with particular emphasis on the constraint that triggered the re-optimization. The system employs decision-making algorithms that balance the potential performance improvements against the risk of degradation in other areas, ensuring that the selected model offers a net positive impact on overall system performance. For example, if the original performance feedback indicated issues with response latency, the system selects an LLM that offers faster processing times while still meeting minimum quality thresholds and operating within resource allocation limits. This selection considers not only the raw performance metrics but also factors such as model stability, adaptability to different query types, and consistency of outputs to ensure that the chosen LLM provides robust improvements across a range of operational scenarios.

Figure 4:
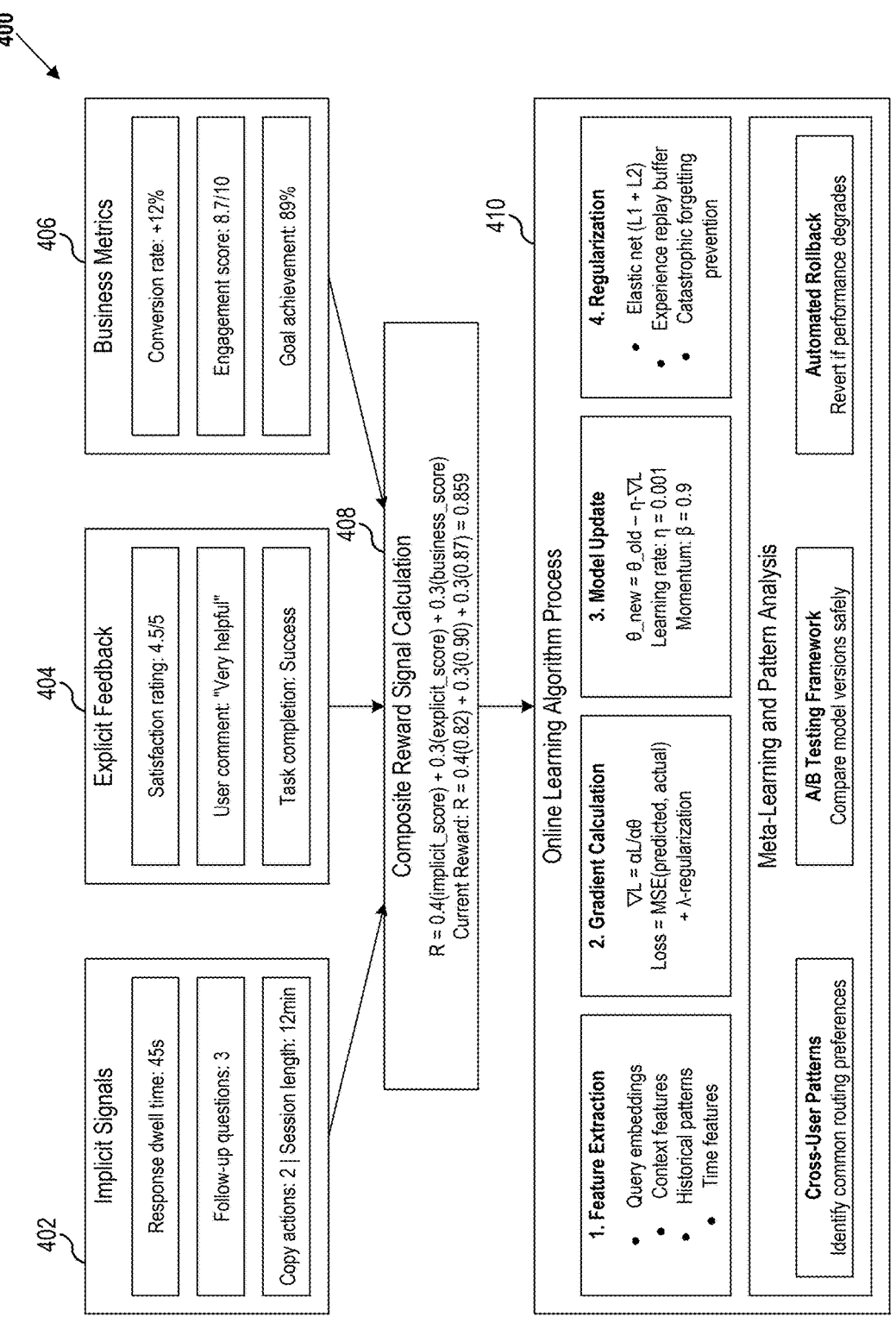
FIG. 4 illustrates an online learning architecture, in accordance with some implementations of the present technology.

FIG. 4 illustrates an online learning architecture 400, in accordance with some implementations of the present technology. The architecture can include categories for collecting multi-source feedback: implicit signals 402, explicit feedback 404, and business metrics 406. This multi-source approach ensures that the system captures a comprehensive view of performance and satisfaction across different dimensions rather than optimizing for a single metric that cannot fully represent overall effectiveness. The implicit signals 402 can include metrics such as response dwell time of 45 seconds, three follow-up questions, and copy actions with a session length of 12 minutes. These implicit signals provide valuable insights into user engagement and satisfaction without requiring direct user input. For example, a longer response dwell time can indicate that the user found the information useful and spent time reviewing it thoroughly. The presence of follow-up questions suggests ongoing engagement with the system, while copy actions can indicate that the user found the information valuable enough to save or share.

The explicit feedback 404 can include a satisfaction rating of 4.5/5, a user comment indicating "Very helpful," and successful task completion. This direct feedback from users provides clear indicators of system performance and user satisfaction. The high satisfaction rating and positive comment suggest that the system effectively met the user's needs, while the successful task completion metric confirms that the user achieved their intended goal. The business metrics 406 can include a conversion rate of +12%, an engagement score of 8.7/10, and goal achievement of 89%. These metrics offer a broader perspective on the system's impact on organizational objectives. The positive conversion rate indicates that the system effectively influences user behavior toward desired outcomes, while the high engagement score suggests sustained user interest and interaction. The goal achievement percentage provides a quantitative measure of how well the system helps users accomplish their intended tasks.

These inputs can feed into a composite reward signal calculation 408, which applies weighted coefficients to combine the different feedback types. The calculation can use weights of 0.4 for implicit score, 0.3 for explicit score, and 0.3 for business score, resulting in a current reward value of 0.859. This composite reward signal provides a holistic assessment of system performance, balancing various feedback sources to guide the learning process.

The online learning algorithm process 410 can include four components: feature extraction, gradient calculation, model update, and regularization. The feature extraction component processes input data to identify relevant characteristics, including query embeddings, context features, historical patterns, and time features. This step transforms raw data into a format suitable for machine learning algorithms, enabling the system to capture important aspects of user interactions and environmental conditions. The gradient calculation component computes the direction and magnitude of adjustments needed to improve system performance based on the composite reward signal and current model parameters. This step leverages mathematical optimization techniques to guide the learning process toward more effective behaviors. The model update component applies the calculated gradients to refine the system's decision-making model, incorporating learning rate and momentum parameters to control the pace and stability of learning. This iterative process allows the system to continuously adapt its behavior based on observed outcomes and feedback. The regularization component implements techniques such as elastic net and experience replay buffer to prevent overfitting and maintain the model's ability to generalize across diverse scenarios. These methods help balance the system's adaptation to recent experiences with its retention of valuable knowledge from past interactions.

A meta-learning and pattern analysis component can include cross-user patterns for identifying common routing preferences, an A/B testing framework for comparing model versions safely, and automated rollback functionality to revert if performance degrades. This meta-learning loop enables the system to extract higher-level insights from aggregated user interactions, refine its learning strategies, and implement safeguards against potential performance regressions. The cross-user patterns component analyzes feedback and behavior across multiple users to identify common preferences, challenges, or effective strategies. This broader perspective allows the system to make more informed decisions that benefit a wider range of users, rather than overfitting to individual preferences. The A/B testing framework facilitates controlled experiments to evaluate the impact of potential system modifications. By comparing the performance of different model versions or routing strategies, the system can make data-driven decisions about which improvements to implement more broadly. The automated rollback functionality provides a safety mechanism to revert to a previous system state if newly implemented changes lead to unexpected performance degradation. This feature ensures that the system maintains a baseline level of performance while exploring potential improvements.

In some implementations, the system can monitor user emotions during interactions with the associated platform. Based on user feedback, language cues, and engagement patterns, the system detects user emotional indicators such as signs of frustration, satisfaction, or confusion. These emotional signals can be incorporated into the implicit signals 402 and explicit feedback 404 components of the feedback loop, providing additional context for evaluating system performance. If the system detects negative emotions, such as frustration or confusion, it can dynamically adjust the routing strategy to improve the user experience in real time. For example, the system escalates to higher-quality or more specialized models or prioritizes faster response times. These adjustments are implemented through the online learning algorithm process 410, which updates the model parameters to address the detected emotional indicators.

Figure 5:
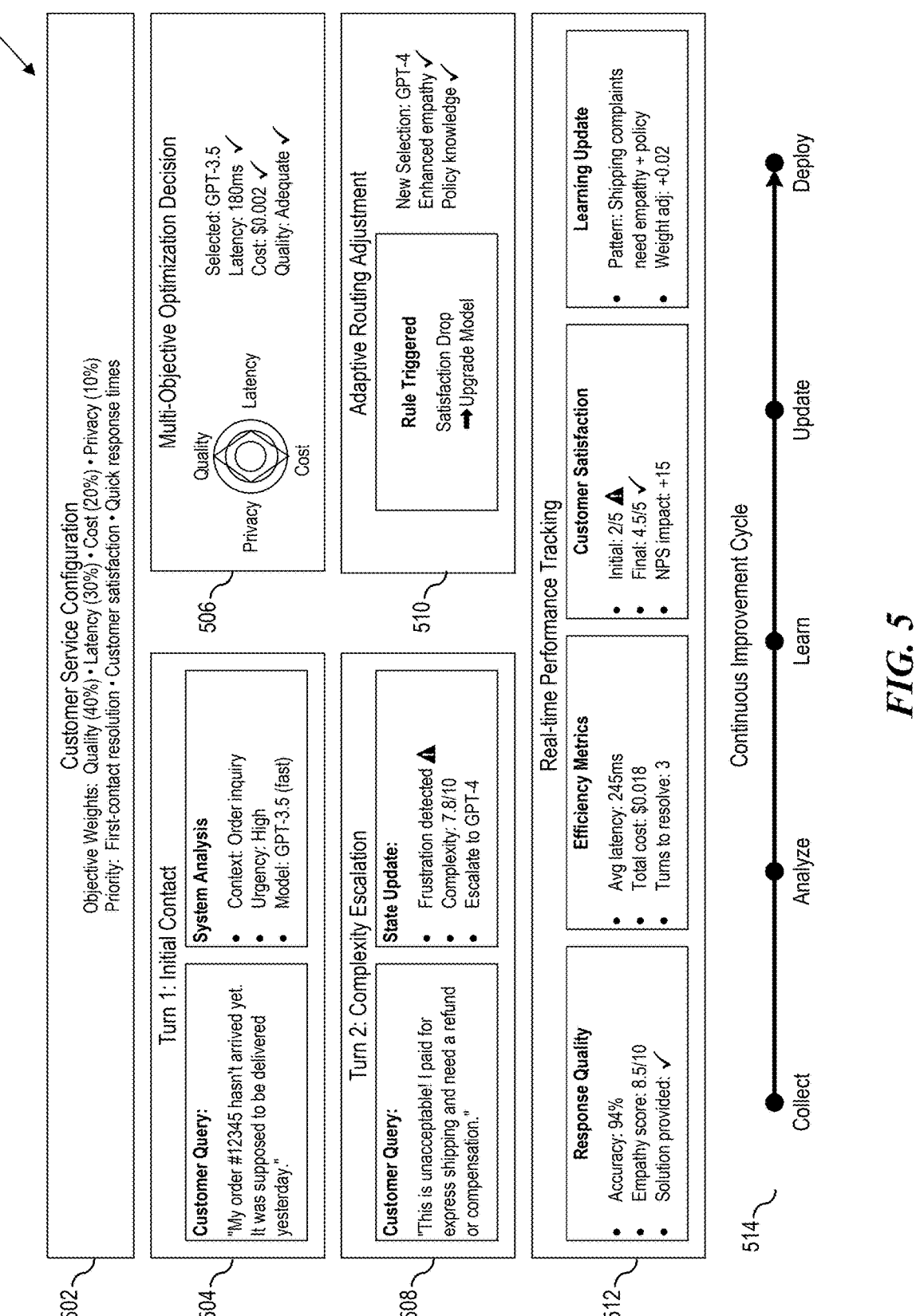
FIG. 5 illustrates a system operation diagram showing a customer service implementation, in accordance with some implementations of the present technology.

The disclosed technology can be implemented in various operational scenarios, including customer service applications. FIG. 5 illustrates a system operation diagram 500 showing a customer service implementation, in accordance with some implementations of the present technology. Customer service represents a particularly valuable application domain for multi-objective LLM routing due to the complex balance of competing priorities in this context.

The system operation diagram 500 includes a customer service configuration 502 indicating objective weights and priorities for the customer service implementation of an LLM routing system. In this configuration, the system assigns different weights to various objectives, including quality (40%), latency (30%), cost (20%), and privacy (10%). These weights reflect the relative importance of each factor in the customer service context. For example, the high weight assigned to quality (40%) indicates that accurate and helpful responses are prioritized, while the significant weight on latency (30%) reflects the importance of quick response times in customer interactions. The system also specifies priorities for first-contact resolution and customer satisfaction, emphasizing the importance of resolving customer issues efficiently and effectively.

The system operation diagram 500 illustrates two main interaction turns, demonstrating how the system handles customer queries and adapts to changing situations. The first turn includes an initial contact 504 containing a customer query regarding an undelivered order. A multi-objective optimization decision display 506 shows various metrics including quality, latency, privacy, and cost, with corresponding performance indicators. This display illustrates how the system balances multiple objectives when selecting the most appropriate response strategy. For example, the system can consider factors such as response accuracy, processing time, data protection requirements, and operational costs when determining how to handle the customer's query about the undelivered order.

The second turn 508 demonstrates a complexity escalation scenario. An updated customer query shows the customer expressing dissatisfaction, indicating an increase in the complexity and urgency of the interaction. An adaptive routing adjustment 510 shows the system's response to this escalation, including rule triggers and model adjustments. For instance, the system can trigger a rule to escalate the query to a more advanced language model or a human agent if the detected frustration level exceeds a certain threshold. These adaptive adjustments enable the system to provide more appropriate and effective responses as the customer interaction becomes more complex or emotionally charged.

A real-time performance tracking section 512 can include four subsections: Response Quality, Efficiency Metrics, Customer Satisfaction, and Learning Update. These sections display various performance indicators, metrics, and learning patterns that the system uses to continuously evaluate and improve its performance.

The system operation diagram 500 further includes a continuous improvement cycle 514 showing a sequential process flow through collect, analyze, learn, update, and deploy stages. This cycle illustrates the system's ongoing optimization process, where it continuously gathers data from interactions, analyzes performance, learns from outcomes, updates its models and strategies, and deploys improved versions to handle future customer service interactions.

As an illustrative example, a customer can submit a query about an undelivered order and the system analyzes the query content, customer history, and current context to determine the appropriate response strategy. The multi-objective optimization decision process balances factors such as response quality, latency, privacy, and cost to select the most suitable language model or response generation method. If the customer expresses dissatisfaction in a follow-up query, the system detects this escalation through its real-time analysis capabilities. The state update process records the increased frustration level and complexity score, triggering the adaptive routing adjustment mechanism. This can result in the system selecting a more advanced language model, prioritizing response quality over cost, or even escalating the query to a human agent if necessary.

Throughout this process, the real-time performance tracking components continuously monitor various metrics. The Response Quality tracking ensures that the system's replies meet accuracy and relevance standards. Efficiency Metrics monitor factors like response time and resource usage to maintain operational effectiveness. Customer Satisfaction tracking helps the system gauge the overall success of the interaction. The Learning Update component uses this performance data to refine the system's models and decision-making processes.

The continuous improvement cycle ensures that insights gained from each interaction feed back into the system, enhancing its capabilities over time. For instance, if the system identifies a pattern of customer dissatisfaction related to undelivered orders, it can update its response strategies to provide more proactive and detailed information about order tracking and resolution processes in future interactions. This customer service implementation demonstrates how the disclosed technology can adapt to complex, real-time interactions while balancing multiple objectives and continuously improving its performance. By leveraging advanced language models, multi-objective optimization, and adaptive routing strategies, the system can provide efficient, effective, and personalized customer service experiences.

Figure 6:
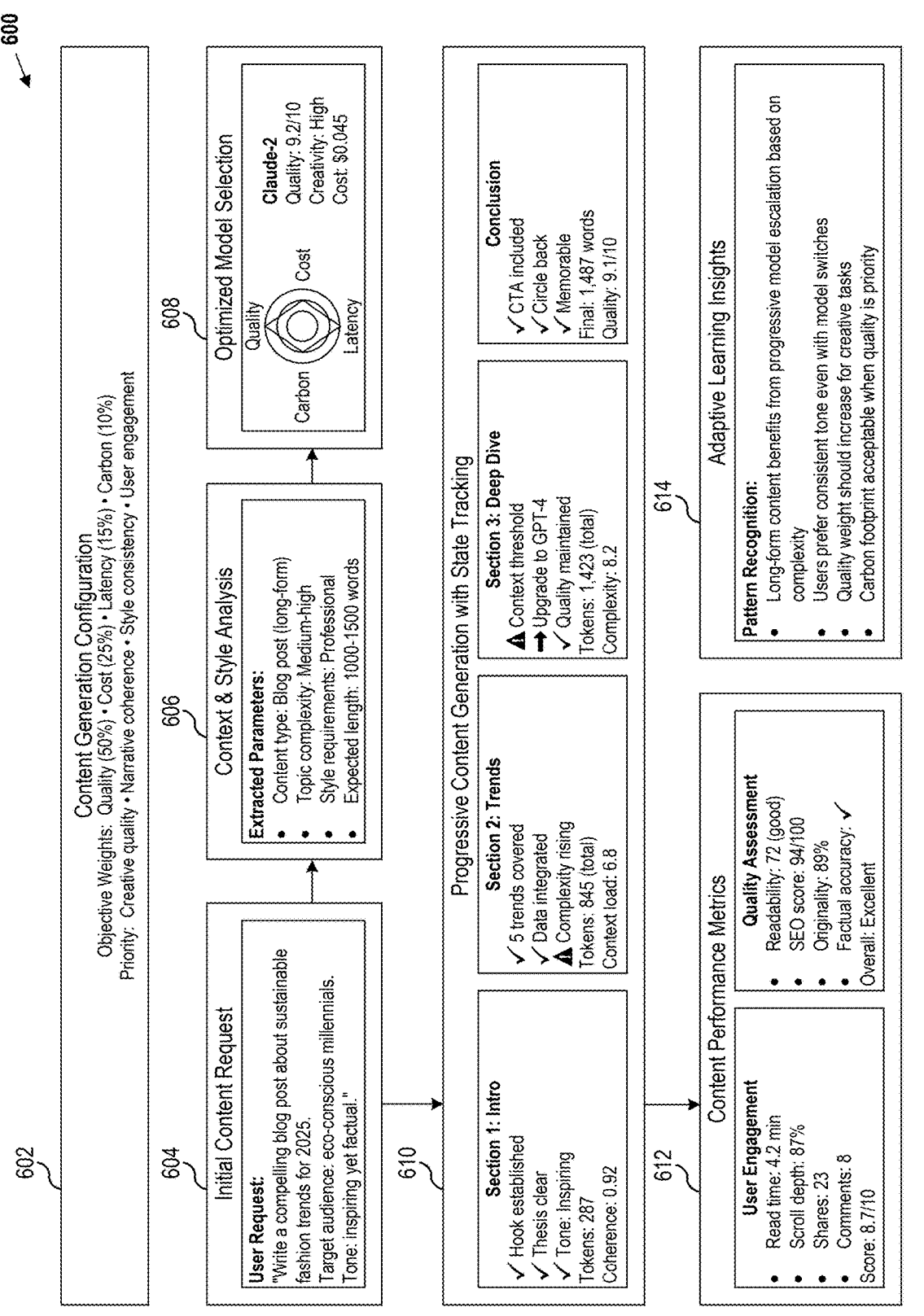
FIG. 6 illustrates a system operation diagram showing a content generation implementation, in accordance with some implementations of the present technology.

FIG. 6 illustrates a system operation diagram 600 showing a content generation implementation, in accordance with some implementations of the present technology. This diagram demonstrates how the multi-objective optimization and adaptive learning techniques can be applied to content creation tasks, showcasing the system's versatility across different domains.

The system operation diagram 600 can begin with a content generation configuration 602, which can include objective weights and priorities tailored for content creation tasks. In this configuration, the system assigns different weights to various objectives, including quality (50%), cost (25%), latency (15%), and carbon footprint (10%). These weights reflect the relative importance of each factor in the content generation context. For example, the high weight assigned to quality (50%) indicates that creative and coherent output is prioritized, while the significant weight on cost (25%) reflects the importance of efficient resource utilization for longer generation sessions. The system also specifies priorities for creative quality, narrative coherence, style consistency, and user engagement, emphasizing the importance of producing compelling and well-structured content.

The workflow begins with an initial content request 604 containing a user request for a blog post about sustainable fashion trends. This step captures the initial input that triggers the content generation process, including specific requirements or guidelines provided by the user. A context and style analysis 606 can extract key parameters from the content request. This analysis can include determining the content type (e.g., blog post, article, product description), assessing topic complexity, identifying style requirements (e.g., formal, casual, technical), and estimating the expected length of the content. The system can employ natural language processing techniques to parse the request and extract relevant features that will inform the subsequent content generation steps.

An optimized model selection 608 displays the results of the multi-objective optimization process for selecting the most appropriate language model for the content generation task. This component includes a chart visualizing the performance metrics for quality, carbon footprint, cost, and latency. The selected model parameters, such as quality ratings and associated costs, are also presented. This visualization helps illustrate how the system balances multiple objectives when choosing the optimal model for the specific content generation task. The progressive content generation 610 demonstrates the system's approach to creating content in stages, with continuous monitoring and optimization throughout the process. This section is divided into four subsections representing different parts of the blog post: introduction, trends, deep dive, and conclusion. Each subsection includes specific metrics, allowing for granular tracking of the content creation progress. This staged approach enables the system to apply adaptive strategies at each phase of content generation, potentially adjusting the model or parameters based on the evolving context and quality of the output.

The content performance metrics section 612 displays user engagement data and quality assessment scores for the generated content. This can include metrics such as read time, social shares, or expert evaluations of the content's accuracy and relevance. These metrics serve as key indicators for evaluating the success of the content generation process and inform future optimizations. The adaptive learning insights section 614 presents pattern recognition findings related to content generation and model performance. This component showcases how the system learns from each content creation task to improve its future performance.

The entire system demonstrated in FIG. 6 illustrates a structured yet flexible approach to content generation that leverages multi-objective optimization, real-time performance tracking, and adaptive learning. This implementation showcases how the disclosed technology can be applied beyond customer service scenarios to creative tasks that require balancing quality, efficiency, and user engagement. By continuously monitoring performance metrics and applying adaptive strategies throughout the content creation process, the system can produce high-quality, engaging content while optimizing resource utilization and adapting to user preferences over time.

Other Implementations

Pre-existing LLMs and other generative machine learning models are promising for a variety of natural language processing and generation applications. In addition to generating human-readable, verbal outputs, pre-existing systems can leverage LLMs to generate technical content, including software code, architectures, or code patches based on user prompts, such as in the case of a data analysis or software development pipeline. Based on particular model architectures and training data used to generate or tune LLMs, such models can exhibit different performance characteristics, specializations, performance behaviors, and attributes.

However, users or services of pre-existing software development systems (e.g., data pipelines for data processing and model or application development) do not have intuitive, consistent, or reliable ways to select particular LLM models and/or design associated prompts in order to solve a given problem (e.g., to generate a desired code associated with a particular software application). As such, pre-existing systems risk selection of sub-optimal (e.g., relatively inefficient and/or insecure) generative machine learning models. Furthermore, pre-existing software development systems do not control access to various system resources or models. Moreover, pre-existing development pipelines do not validate outputs of the LLMs for security breaches in a context-dependent, and flexible manner. Code generated through an LLM can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks. As such, preexisting software development pipelines can require manual application of rules or policies for output validation depending on the precise nature of generated output, thereby leading to inefficiencies in data processing and application development.

In addition to the challenges in selecting particular LLM models in order to solve a given problem, users or services of pre-existing software development systems faced significant challenges in understanding and managing the infrastructure needed to run these models. For example, users can not know what system resources are required to run the models (e.g., software, hardware, network resources), how to set up the models, how to test the models, or how to fine-tune the models effectively. Further, organizations often found themselves discarding legacy hardware that were unable to run newer models, which is undesirable from an Environmental, Social, and Governance (ESG) principle. For example, discarding legacy hardware not only leads to increased costs but also missed opportunities to reuse existing resources. Additionally, users tend to select the biggest, latest models under the presumption that the newest models were the best, without considering the cost implications and the potential for more efficient alternatives. Thus, conventional approaches often resulted in higher expenses and overlooked the benefits of using legacy hardware.

The data generation platform disclosed herein enables dynamic evaluation of machine learning prompts for model selection, as well as validation of the resulting outputs, in order to improve the security, reliability, and modularity of data pipelines (e.g., software development systems). The data generation platform can receive a prompt from a user (e.g., a human-readable request relating to software development, such as code generation) and determine whether the user is authenticated based on an associated authentication token (e.g., as provided concurrently with the prompt). Based on the selected model, the data generation platform can determine a set of performance metrics (and/or corresponding values) associated with processing the requested prompt via the selected model. By doing so, the data generation platform can evaluate the suitability of the selected model (e.g., LLM) for generating an output based on the received input or prompt. The data generation platform can validate and/or modify the user's prompt according to a prompt validation model. Based on the results of the prompt validation model, the data generation platform can modify the prompt such that the prompt satisfies any associated validation criteria (e.g., through the redaction of sensitive data or other details) thereby mitigating the effect of potential security breaches, inaccuracies, or adversarial manipulation associated with the user's prompt.

The inventors have also developed a system for dynamically selecting models for processing user prompts in a resource-sensitive manner. The system state can include a current CPU usage associated with processors of the data generation platform. Based on the system state, the data generation platform can calculate a threshold metric value that indicates an allotment of system resources available for generating an output based on the prompt. The data generation platform can determine the estimated performance metric value associated with generating the output using the user's selected machine learning model (e.g., LLM). In response to determining that the estimated performance metric value satisfies the threshold metric value, the data generation platform can provide the prompt to the selected model (e.g., LLM) for generation of the requested output and subsequent transmission to a system that enables the user to view the output. When the estimated performance metric value does not satisfy the threshold metric value, the data generation platform can determine another model (e.g., a second LLM) for generation of the output.

As such, the disclosed data generation platform enables flexible, secure, and modular control over the use of LLMs to generate outputs. By evaluating the system effects associated with processing an input (e.g., a natural language prompt) using an LLM to generate an output, the data generation platform can mitigate adverse effects associated with system overuse (e.g., CPU overclocking or cost overruns). Furthermore, by redirecting the prompt to an appropriate model (e.g., such that the predicted system resource use is within expected or allowed bounds), the data generation platform enables the generation of outputs in a resilient, flexible manner, such that inputs are dynamically evaluated in light of changing system conditions (e.g., changing values of CPU usage, bandwidth, or incurred cost).

The inventors have also developed a system for evaluating model outputs in an isolated environment to mitigate errors and security breaches. For example, the data generation platform determines whether an output from a machine learning model, such as an LLM, includes particular types of data (e.g., including software-related information, such as a code sample, code snippet, or an executable program). In such cases, the data generation platform can provide the generated output to a parameter generation model (e.g., an LLM) configured to generate validation test parameters to validate the nature of the output data (e.g., the generated code). For example, using the parameter generation model, the platform generates compilation instructions for an appropriate programming language, where the compilation instructions identify or locate a compiler for compiling a set of executable instructions based on the generated code.

The parameter generation model can generate a virtual machine configuration for testing the behavior of the executable instructions. For example, the data generation platform determines an indication of a simulated hardware configuration for a virtual environment in which to test and host the compiled instructions, including a processor architecture and/or memory/storage limits associated with the virtual environment. In some implementations, the data generation platform determines a software configuration for the virtual environment, including an operating system and/or associated environment variables (e.g., directory structures and/or relevant filepaths). The data generation platform can generate the virtual environment (e.g., within a virtual machine) according to the virtual machine configuration to enable compilation of the generated code within an isolated environment (e.g., a "sandcastle") for testing the code.

The disclosed data generation platform enables the flexible evaluation of output in an application-specific manner. To illustrate, the data generation platform can configure a validation test for evaluating code generated from an LLM based on information within the prompt provided to the LLM and the nature of the output of the LLM. Furthermore, the data generation platform can configure the test environment (e.g., a virtual machine environment) depending on the applicability of the generated code or nature of the input and/or user. By monitoring test outputs from compiled code generated by a machine learning model (e.g., an LLM), the data generation platform enables mitigation of errors, software bugs, or other unintended system effects.

The inventors have further developed a system for dynamically selecting, in response to an input, one or more AI models to generate an output and the infrastructure to run the one or more AI models. For example, the system receives an output generation request including an input for the generation of an output using one or more models from a plurality of models. The system can generate expected values for a set of output attributes (e.g., a type of the output generated from the input, a threshold response time of the generation of the output) of the output generation request. For each particular model in the plurality of models, the system can determine the capabilities of the particular model (e.g., estimated performance metric values for processing requests, system resource metric values indicating an estimated resource usage), and dynamically select a subset of models from the plurality of models. For the selected subset of models, the system can dynamically select a subset of available system resources to process the input included in the output generation request. The system generates the output by processing the input included in the output generation request using the selected subset of available system resources.

The disclosed data generation platform reduces the risk of selecting inefficient or insecure generative machine learning models and increases the efficiency of running the selected models. For example, the platform allows for the reuse of legacy hardware by reducing the need to discard older equipment and allowing organizations to manage costs of running the models more effectively. Additionally, the platform simplifies the management of infrastructure needed to run the selected models, reducing the need for users to understand the intricacies of system resource requirements and model specifications. By dynamically selecting the models and infrastructure in response to an incoming user inquiry (e.g., a prompt), the disclosed data generation platform can tailor the constraints used in selecting the models or infrastructure to a specific use case. The flexibility allows the disclosed platform to adapt to various use cases with differing criteria, such as performance, cost, security, and environmental considerations. For example, in a high-security environment, the platform can prioritize models and infrastructure that offer more security features and thorough output validation. In cost-sensitive scenarios, the platform can select models and hardware configurations that more efficiently use resources and lower expenses. Additionally, the platform can reuse legacy hardware to align with ESG principles by reducing waste and promoting sustainability.

The methods disclosed herein cause a reduction in greenhouse gas emissions compared to traditional methods for operating models. Every year, approximately 40 billion tons of $CO^2$ are emitted around the world. Power consumption by digital technologies account for approximately 4% of this figure. Further, conventional user device and application settings can sometimes exacerbate the causes of climate change. For example, the average U.S. power plant expends approximately 500 grams of carbon dioxide for every kWh generated. The implementations disclosed herein for conserving hardware, software, and network resources can mitigate climate change by reducing and/or preventing additional greenhouse gas emissions into the atmosphere. For example, reducing the system resources used to run selected models and reusing legacy hardware (as opposed to discarding the hardware) as described herein reduces electrical power consumption compared to traditional methods. In particular, by adjusting the models and infrastructure selected based on particular output attributes of an incoming output generation request, the disclosed systems provide increased efficiency compared to traditional methods.

Moreover, in the U.S., datacenters are responsible for approximately 2% of the country's electricity use, while globally they account for approximately 200 terawatt Hours (TWh). Transferring 1 GB of data can produce approximately 3 kg of $CO^2$. Each GB of data downloaded thus results in approximately 3 kg of $CO^2$ emissions or other greenhouse gas emissions. The storage of 100 GB of data in the cloud every year produces approximately 0.2 tons of $CO^2$ or other greenhouse gas emissions. Adjusting the models and infrastructure selected according to the implementations disclosed herein reduces the amount of data downloaded, and obviates the need for wasteful $CO^2$ emissions. Therefore, the disclosed implementations for reconfiguring the amount of resources used by output generation requests mitigates climate change and the effects of climate change by reducing the amount of data stored and downloaded in comparison to conventional network technologies.

Attempting to create a system to dynamically select the most appropriate AI models and system resources based on varying output generation requests and system states in view of the available conventional approaches created significant technological uncertainty. Creating such platform required addressing several unknowns in conventional approaches in processing output generation requests, such as how to accurately predict the performance and resource requirements of different AI models under varying demands in output generation requests before processing the output generation requests. Similarly, conventional approaches in processing output generation requests did not provide methods of adapting the selection of the corresponding infrastructure (e.g., system resources) of selected AI model(s) to real-time changes in system resource availability and user demands between output generation requests.

Conventional approaches rely on static allocation of resources and predefined model selection criteria, which do not account for real-time variations in system state or user demands. For example, a conventional system can allocate a fixed amount of CPU and memory to each AI model based on historical usage patterns, and fail to consider the current load or the specific requirements of the incoming requests. In response to variations in system state or user demands, conventional approaches typically involve manual configurations, which can not only be time-consuming but also challenging for users unfamiliar with model performance metrics, much less managing the infrastructure needed to run the models. Conversely, the disclosed system determines how to dynamically allocate resources like CPU, GPU, and memory to different selected AI models based on the particular model(s)' specific needs and/or current available system resources, all of which is subject to variation between output generation requests.

Additionally, integrating legacy hardware into the system created further technological uncertainty, since the legacy hardware must be integrated efficiently without compromising the performance of newer, more demanding AI models. Legacy hardware often has limited computational power and memory compared to modern systems, which can create bottlenecks when running resource-intensive AI models. To successfully integrate legacy hardware into the system, all potential factors of efficiency and compatibility (e.g., computational complexity of each model, software frameworks used by each model, the data throughput requirements, latency constraints, compatibility issues between the legacy hardware and the newer software frameworks) must be taken into consideration.

To overcome the technological uncertainties, the inventors systematically evaluated multiple design alternatives. For example, the inventors tested different AI models of varying capabilities for text generation, image recognition, and summarization tasks. The inventors measured values of metrics such as the response time, accuracy, and/or resource usage of each model under various conditions, such as different input sizes and types, varying system loads, and different hardware configurations. The data was used to create performance profiles for each model, which allowed the inventors to use the performance profiles to predict a particular model's behavior under different conditions.

The use of static resource allocation, where fixed amounts of CPU, GPU, and memory were pre-assigned to each AI model, proved to be inefficient as static allocation failed to adapt to real-time variations in system load and user demands, leading to resource underutilization and bottlenecks. Similarly, implementing a first-come-first-served (FCFS) scheduling algorithm did not account for the varying computational complexities and priorities of different tasks which increases latency for the output generation requests. Further, only the latest hardware, which, while simpler, led to higher operational costs and electronic waste and ignored the potential benefits of integrating legacy hardware for environmental sustainability.

Thus, the inventors experimented with different methods for dynamically allocating system resources. For example, the inventors tested various algorithms for load balancing (e.g., round-robin, least connections, weighted least connections), resource scheduling (e.g., first-come-first-served, priority-based scheduling, fair scheduling), and model selection to identify the most efficient and effective approaches. Additionally, the inventors systematically evaluated different strategies for integrating legacy hardware into the system. The inventors evaluated, for example, different methods of partitioning a single workload between new and legacy hardware (e.g., a "hybrid" approach), such as off-loading less demanding tasks to older systems while reserving newer hardware for more demanding tasks.

While the current description provides examples related to Large Language Models (LLMs), one of skill in the art would understand that the disclosed techniques can apply to other forms of machine learning or algorithms, including unsupervised, semi-supervised, supervised, and reinforcement learning techniques. For example, the disclosed data generation platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Data Generation Platform

Figure 7:
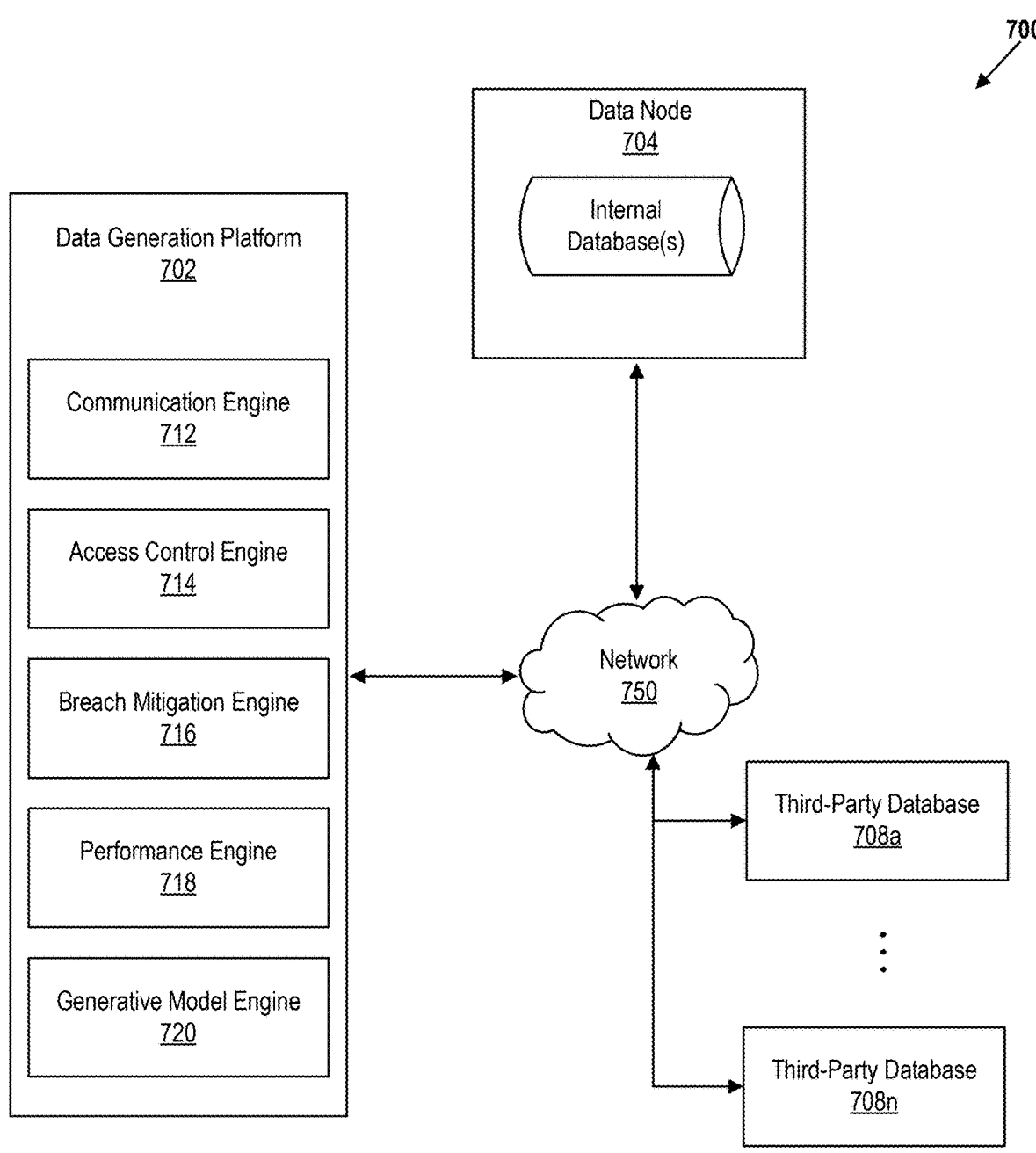
FIG. 7 shows an illustrative environment for evaluating language model prompts and outputs for model selection and validation, in accordance with some implementations of the present technology.

FIG. 7 shows an illustrative environment 700 for evaluating machine learning model inputs (e.g., language model prompts) and outputs for model selection and validation, in accordance with some implementations of the present technology. For example, the environment 700 includes the data generation platform 702, which is capable of communicating with (e.g., transmitting or receiving data to or from) a data node 704 and/or third-party databases 708a-708n via a network 750. The data generation platform 702 can include software, hardware, or a combination of both and can reside on a physical server or a virtual server (e.g., as described in FIG. 9) running on a physical computer system. For example, the data generation platform 702 can be distributed across various nodes, devices, or virtual machines (e.g., as in a distributed cloud server). In some implementations, the data generation platform 702 can be configured on a user device (e.g., a laptop computer, smartphone, desktop computer, electronic tablet, or another suitable user device). Furthermore, the data generation platform 702 can reside on a server or node and/or can interface with third-party databases 708a-708n directly or indirectly.

The data node 704 can store various data, including one or more machine learning models, prompt validation models, associated training data, user data, performance metrics and corresponding values, validation criteria, and/or other suitable data. For example, the data node 704 includes one or more databases, such as an event database (e.g., a database for storage of records, logs, or other information associated with LLM-related user actions), a vector database, an authentication database (e.g., storing authentication tokens associated with users of the data generation platform 702), a secret database, a sensitive token database, and/or a deployment database.

An event database can include data associated with events relating to the data generation platform 702. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 702 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 702). By doing so, the data generation platform 702 can store and track information relating to performance, errors, and troubleshooting. The data generation platform 702 can include one or more subsystems or subcomponents. For example, the data generation platform 702 includes a communication engine 712, an access control engine 714, a breach mitigation engine 716, a performance engine 718, and/or a generative model engine 720.

A vector database can include data associated with vector embeddings of data. For example, the vector database includes a numerical representations (e.g., arrays of values) that represent the semantic meaning of unstructured data (e.g., text data, audio data, or other similar data). For example, the data generation platform 702 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 702 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 702 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as API keys, passwords, credentials, or other such information. For example, sensitive information includes personally identifiable information (PII), such as names, identification numbers, or biometric information. By storing secrets or other sensitive information, the data generation platform 702 can evaluate prompts and/or outputs to prevent breaches or leakage of such sensitive information.

A deployment database can include data associated with deploying, using, or viewing results associated with the data generation platform 702. For example, the deployment database can include a server system (e.g., physical or virtual) that stores validated outputs or results from one or more LLMs, where such results can be accessed by the requesting user.

The data generation platform 702 can receive inputs (e.g., prompts), training data, validation criteria, and/or other suitable data from one or more devices, servers, or systems. The data generation platform 702 can receive such data using communication engine 712, which can include software components, hardware components, or a combination of both. For example, the communication engine 712 includes or interfaces with a network card (e.g., a wireless network card and/or a wired network card) that is associated with software to drive the card and enables communication with network 750. In some implementations, the communication engine 712 can also receive data from and/or communicate with the data node 704, or another computing device. The communication engine 712 can communicate with the access control engine 714, the breach mitigation engine 716, the performance engine 718, and the generative model engine 720.

In some implementations, the data generation platform 702 can include the access control engine 714. The access control engine 714 can perform tasks relating to user/device authentication, controls, and/or permissions. For example, the access control engine 714 receives credential information, such as authentication tokens associated with a requesting device and/or user. In some implementations, the access control engine 714 can retrieve associated stored credentials (e.g., stored authentication tokens) from an authentication database (e.g., stored within the data node 704). The access control engine 714 can include software components, hardware components, or a combination of both. For example, the access control engine 714 includes one or more hardware components (e.g., processors) that are able to execute operations for authenticating users, devices, or other entities (e.g., services) that request access to an LLM associated with the data generation platform 702. The access control engine 714 can directly or indirectly access data, systems, or nodes associated with the third-party databases 708a-708n and can transmit data to such nodes. Additionally or alternatively, the access control engine 714 can receive data from and/or send data to the communication engine 712, the breach mitigation engine 716, the performance engine 718, and/or the generative model engine 720.

The breach mitigation engine 716 can execute tasks relating to the validation of inputs and outputs associated with the LLMs. For example, the breach mitigation engine 716 validates inputs (e.g., prompts) to prevent sensitive information leakage or malicious manipulation of LLMs, as well as validate the security or safety of the resulting outputs. The breach mitigation engine 716 can include software components (e.g., modules/virtual machines that include prompt validation models, performance criteria, and/or other suitable data or processes), hardware components, or a combination of both. As an illustrative example, the breach mitigation engine 716 monitors prompts for the inclusion of sensitive information (e.g., PII), or other forbidden text, to prevent leakage of information from the data generation platform 702 to entities associated with the target LLMs. The breach mitigation engine 716 can communicate with the communication engine 712, the access control engine 714, the performance engine 718, the generative model engine 720, and/or other components associated with the network 750 (e.g., the data node 704 and/or the third-party databases 708a-708n).

The performance engine 718 can execute tasks relating to monitoring and controlling performance of the data generation platform 702 (e.g., or the associated development pipeline). For example, the performance engine 718 includes software components (e.g., performance monitoring modules), hardware components, or a combination thereof. To illustrate, the performance engine 718 can estimate performance metric values associated with processing a given prompt with a selected LLM (e.g., an estimated cost or memory usage). By doing so, the performance engine 718 can determine whether to allow access to a given LLM by a user, based on the user's requested output and the associated estimated system effects. The performance engine 718 can communicate with the communication engine 712, the access control engine 714, the performance engine 718, the generative model engine 720, and/or other components associated with the network 750 (e.g., the data node 704 and/or the third-party databases 708a-708n).

The generative model engine 720 can execute tasks relating to machine learning inference (e.g., natural language generation based on a generative machine learning model, such as an LLM). The generative model engine 720 can include software components (e.g., one or more LLMs, and/or API calls to devices associated with such LLMs), hardware components, and/or a combination thereof. To illustrate, the generative model engine 720 can provide users' prompts to a requested, selected, or determined model (e.g., LLM) to generate a resulting output (e.g., to a user's query within the prompt). As such, the generative model engine 720 enables flexible, configurable generation of data (e.g., text, code, or other suitable information) based on user input, thereby improving the flexibility of software development or other such tasks. The generative model engine 720 can communicate with the communication engine 712, the access control engine 714, the performance engine 718, the generative model engine 720, and/or other components associated with the network 750 (e.g., the data node 704 and/or the third-party databases 708a-708n).

Engines, subsystems, or other components of the data generation platform 702 are illustrative. As such, operations, subcomponents, or other aspects of particular subsystems of the data generation platform 702 can be distributed, varied, or modified across other engines. In some implementations, particular engines can be deprecated, added, or removed. For example, operations associated with breach mitigation are performed at the performance engine 718 instead of at the breach mitigation engine 716.

Suitable Computing Environments

Figure 8:
FIG. 8 shows a block diagram showing some of the components typically incorporated in at least some of the computer systems and other devices on which the disclosed system operates in accordance with some implementations of the present technology.

FIG. 8 shows a block diagram showing some of the components typically incorporated in at least some of the computer systems and other devices 800 on which the disclosed system (e.g., the data generation platform 702) operates in accordance with some implementations of the present technology. In various implementations, these computer systems and other device(s) 800 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 804, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 806, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 808, including a CPU for executing computer programs, a GPU for executing computer graphic programs and handling computing graphical elements; storage(s) 810, including at least one computer memory for storing programs (e.g., application(s) 812, model(s) 814, and other programs) and data while they are being used, including the facility and associated data, an operating system including a kernel, and device drivers; a network connection component(s) 816 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 818, such as a hard drive or flash drive for persistently storing programs and data; and computer-readable media drives 820 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 9:
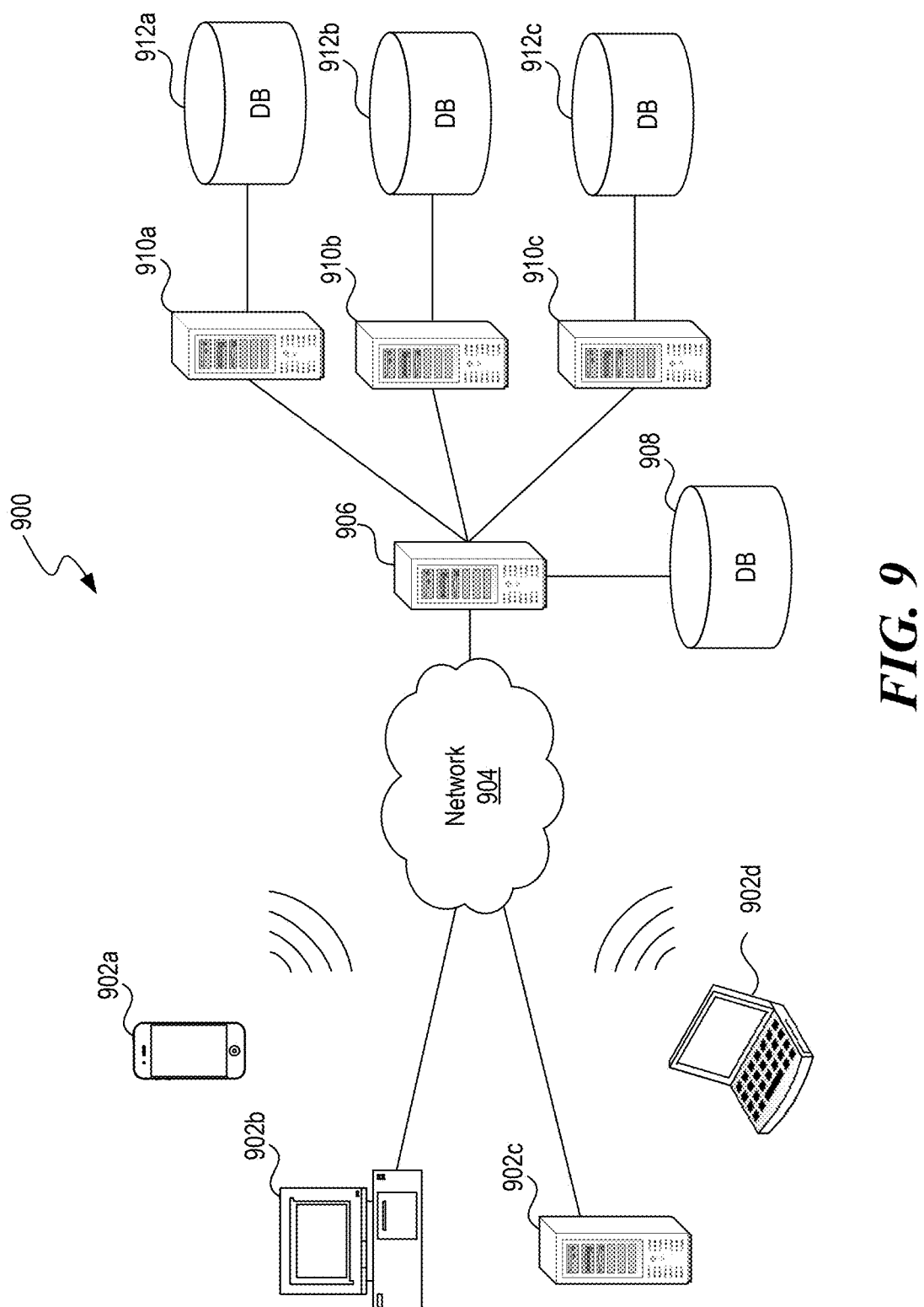
FIG. 9 is a system diagram illustrating an example of a computing environment in which the disclosed system operates in some implementations of the present technology.

FIG. 9 is a system diagram illustrating an example of a computing environment 900 in which the disclosed system operates in some implementations of the present technology. In some implementations, environment 900 includes one or more client computing devices 902a-902d, examples of which can host graphical user interfaces associated with client devices. For example, one or more of the client computing devices 902a-902d includes user devices and/or devices associated with services requesting responses to queries from LLMs. Client computing devices 902 operate in a networked environment using logical connections through network 904 (e.g., the network 750) to one or more remote computers, such as a server computing device (e.g., a server system housing the data generation platform 702 of FIG. 7). In some implementations, client computing devices 902 can correspond to device 800 (FIG. 8).

In some implementations, server computing device 906 is an edge server that receives client requests and coordinates fulfillment of those requests through other servers, such as server computing devices 910a-910c. In some implementations, server computing devices 906 and 910 comprise computing systems. Though each server computing device 906 and 910 is displayed logically as a single server, server computing devices can each be a distributed computing environment encompassing multiple computing devices located at the same or at geographically disparate physical locations. In some implementations, each server computing device 910 corresponds to a group of servers.

Client computing devices 902 and server computing devices 906 and 910 can each act as a server or client to other server or client devices. In some implementations, server computing devices (906, 910a-910c) connect to a corresponding database (908, 912a-912c). For example, the corresponding database includes a database stored within the data node 704 (e.g., a sensitive token database, an event database, or another suitable database). As discussed above, each server computing device 910 can correspond to a group of servers, and each of these servers can share a database or can have its own database (and/or interface with external databases, such as third-party databases 708a-708n). In addition to information described concerning the data node 704 of FIG. 7, databases 908 and 912 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 908 and 912 are displayed logically as single units, databases 908 and 912 can each be a distributed computing environment encompassing multiple computing devices, can be located within their corresponding server, or can be located at the same or at geographically disparate physical locations.

Network 904 (e.g., corresponding to the network 750) can be a local area network (LAN) or a wide area network (WAN) but can also be other wired or wireless networks. In some implementations, network 904 is the Internet or some other public or private network. Client computing devices 902 are connected to network 904 through a network interface, such as by wired or wireless communication. While the connections between server computing device 906 and server computing device 910 are shown as separate connections, these connections can be any kind of LAN, WAN, wired network, or wireless network, including network 904 or a separate public or private network.

Data Generation Platform

Figure 10:
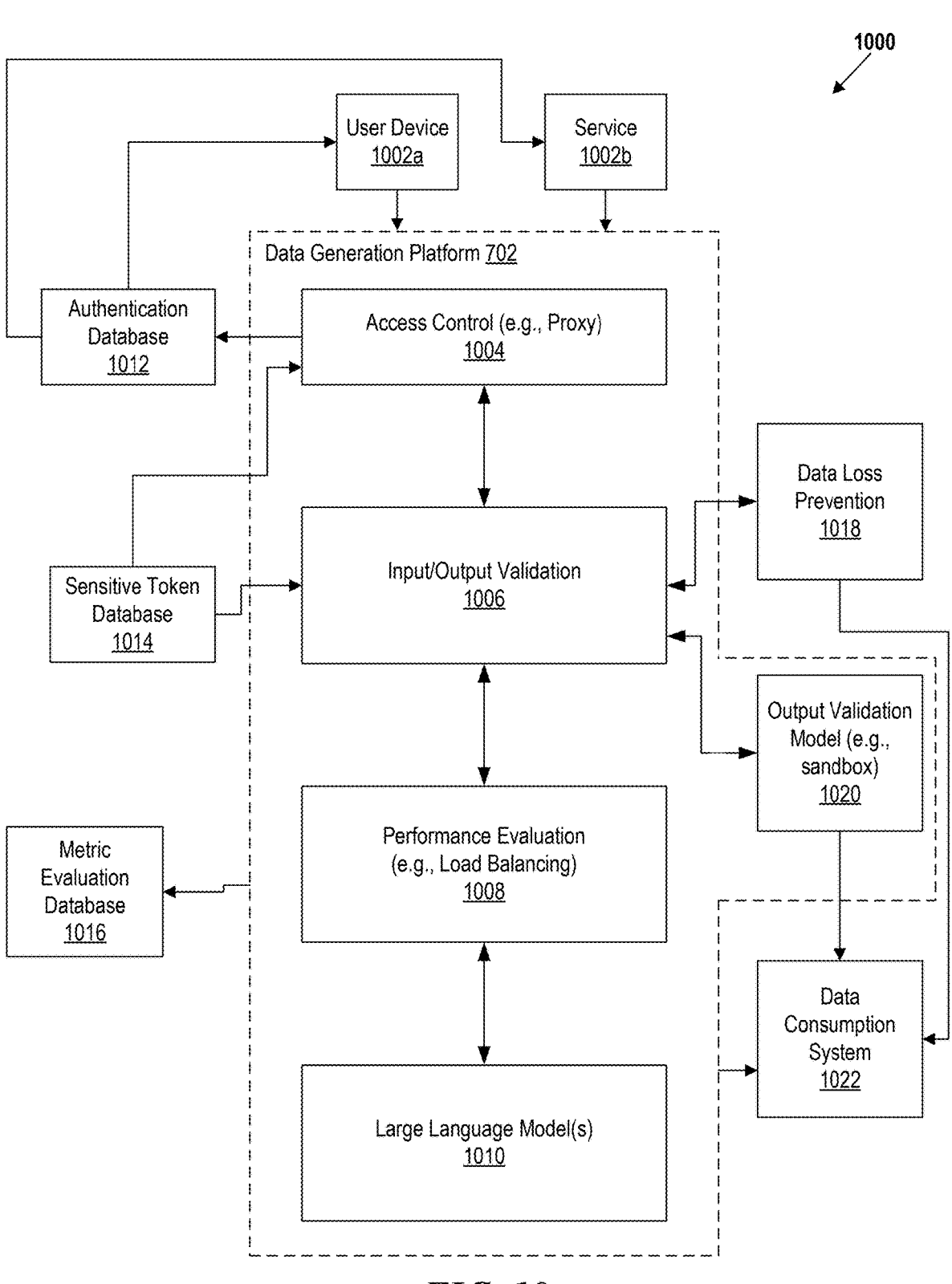
FIG. 10 is a schematic illustrating a process for validating model inputs and outputs, in accordance with some implementations of the present technology.

FIG. 10 is a schematic illustrating a process 1000 for validating model inputs and outputs, in accordance with some implementations of the present technology. For example, a user device 1002a or a service 1002b provides an output generation request (e.g., including an input, such as a prompt, and an authentication token) to the data generation platform 702 (e.g., to the access control engine 714 for access control 1004 via the communication engine 712 of FIG. 7). The access control engine 714 can authenticate the user device 1002a or service 1002b by identifying stored tokens within an authentication database 1012 that match the provided authentication token. The access control engine 714 can communicate the prompt to the breach mitigation engine 716 for input/output validation 1006. The breach mitigation engine 716 can communicate with a sensitive token database 1014 and/or a data-loss prevention engine 1018, and/or an output validation model 1020 for validation of prompts and/or LLM outputs. Following input validation, the performance engine 718 can evaluate the performance of LLMs to route the prompt to an appropriate LLM (e.g., large language model(s) 1010). The data generation platform 702 can transmit the generated output to the output validation model 1020 for testing and validation of the output (e.g., to prevent security breaches). The output validation model 1020 can transmit the validated output to a data consumption system 1022, for exposure of the output to the user device 1002a and/or the service 1002b. In some implementations, the data generation platform 702 can transmit metric values, records, or events associated with the data generation platform 702 to a metric evaluation database 1016 (e.g., an event database) for monitoring, tracking, and evaluation of the data generation platform 702.

A user device (e.g., the user device 1002a) and/or a module, component, or service of a development pipeline (e.g., a service 1002b) can generate and transmit an output generation request to the data generation platform 702 (e.g., via the communication engine 712 of FIG. 7). An output generation request can include an indication of a requested output from a machine learning model. The output generation request can include an input, such as a prompt, an authentication token, and/or a user/device identifier of the requester. To illustrate, the output generation request can include a prompt (e.g., a query) requesting data, information, or data processing (e.g., from an LLM). The prompt can include a natural language question or command (e.g., in English). For example, the prompt includes a request for an LLM to generate code (e.g., within a specified programming language) that executes a particular operation. Additionally or alternatively, a prompt includes a data processing request, such as a request to extract or process information of a database (e.g., associated with one or more of the third-party databases 708a-708n). The output generation request can be transmitted to the data generation platform 702 using an API call to an API associated with the data generation platform 702 and/or through a graphical user interface (GUI).

The output generation request can include textual and/or non-textual inputs. For example, the output generation request includes audio data (e.g., a voice recording), video data, streaming data, database information, and other suitable information for processing using a machine learning model. For example, the output generation request is a video generation request that includes an image and a textual prompt indicating a request to generate a video based on the image. As such, machine learning models of the data generation platform disclosed herein enable inputs of various formats or combinations thereof.

FIG. 11 shows a schematic 1100 illustrating components of input/output validation, in accordance with some implementations of the present technology. For example, input/output validation 1006 (e.g., through breach mitigation engine 716) includes input controls 1110 (e.g., associated with prompt validation) that include one or more prompt validation models. The input/output validation 1006 can additionally or alternatively include output controls 1130, as discussed below. Modules, components, or models associated with the input/output validation 1006 can be updated, modified, added, removed, activated, or deactivated (e.g., according to attributes of the output generation request, a classification of the user, or other suitable factors). Thus the breach mitigation engine 716 (and the data generation platform 702) are flexible, modular, and configurable in an application-specific manner.

A prompt (e.g., input) validation model can include a module (e.g., a software component), model, algorithm, or process for validating, authenticating, modifying, and/or controlling inputs (e.g., to LLMs). For example, a prompt validation model includes one or more input controls 1110, as shown in FIG. 11. Additionally or alternatively, the input controls 1110 can include one or more prompt validation models capable of executing operations including input validation 1112a, trace injection 1112b, logging 1112c, secret redaction 1112d, sensitive data detection 1112e, prompt injection 1112f, and/or prompt augmentation 1112g. A prompt validation model can generate a validation indicator. The validation indicator can indicate a validation status (e.g., a binary indicator specifying whether the prompt is suitable for provision to the associated LLM). Additionally or alternatively, the validation indicator can indicate or specify aspects of the prompt that are validated and/or invalid, thereby enabling further modification to cure any associated deficiencies in the prompt.

Process for Validating LLM Inputs and Outputs

FIG. 12 shows a flow diagram illustrating a process 1200 for the dynamic evaluation of large-language model prompts and validation of the resulting outputs, in accordance with some implementations of the present technology. For example, the process 1200 is used to generate data and/or code for in the context of data processing or software development pipelines.

At act 1202, process 1200 can receive an output generation request from a user device (e.g., where the user device is associated with an authentication token). For example, the data generation platform 702 receives an output generation request from a user device, where the user device is associated with an authentication token, and where the output generation request includes a prompt for generation of a text-based output using a first large-language model (LLM). As an illustrative example, the data generation platform 702 receives a request from a user, through a computing device, indicating a query to request the generation of code for a software application. The request can include a user identifier, such as a username, as well as a specification of a particular requested LLM architecture. By receiving such a request, the data generation platform 702 can evaluate the prompt and generate a resulting output in an efficient, secure manner.

In some implementations, process 1200 can generate an event record that describes the output generation request. For example, the data generation platform 702 generates, based on the output generation request, an event record including the performance metric value, a user identifier associated with the user device, and the prompt. The data generation platform 702 can transmit, to the server system, the event record for storage in an event database. As an illustrative example, the data generation platform 702 can generate a log of requests from users for generation of outputs (e.g., including the user identifier and associated timestamp). By doing so, the data generation platform 702 can track, monitor, and evaluate the use of system resources, such as LLMs, thereby conferring improved control to system administrators to improve the effectiveness of troubleshooting and system resource orchestration.

At act 1204, process 1200 can authenticate the user. For example, the data generation platform 702 authenticates the user device based on the authentication token (e.g., credentials associated with the output generation request). As an illustrative example, the data generation platform 702 can identify the user associated with the output generation request and determine whether the user is allowed to submit a request (e.g., and/or whether the user is allowed to select an associated LLM). By evaluating the authentication status of the user, the data generation platform 702 can protect the associated software development pipeline from malicious or unauthorized use.

In some implementations, process 1200 can compare the authentication token with a token stored within an authentication database in order to authenticate the user. For example, the data generation platform 702 determines a user identifier associated with the user device. The data generation platform 702 can determine, from a token database, a stored token associated with the user identifier. The data generation platform 702 can compare the stored token and the authentication token associated with the output generation request. In response to determining that the stored token and the authentication token associated with the output generation request match, the data generation platform 702 can authenticate the user device. As an illustrative example, the data generation platform 702 can compare a first one-time password assigned to a user (e.g., as stored within an authentication database) with a second one-time password provided along with the authentication request. By confirming that the first and second passwords match, the data generation platform 702 can ensure that the user submitting the output generation request is authorized to interact to use the requested LLMs.

At act 1206, process 1200 can determine a performance metric value associated with the output generation request. For example, the data generation platform 702 determines a performance metric value associated with the output generation request, where the performance metric value indicates an estimated resource requirement for the output generation request. As an illustrative example, the data generation platform 702 can determine an estimated memory usage associated with the output generation request (e.g., an estimated memory size needed by the associated LLM to generate the requested output based on the input prompt). By doing so, the data generation platform 702 can determine the load or burden on the system associated with the user's request, thereby enabling the data generation platform 702 to evaluate and suggest resource use optimization strategies to improve the efficiency of the associated development pipeline.

At act 1208, process 1200 can identify a prompt validation model, for validation of the output generation request, based on an attribute of the request. For example, the data generation platform 702 identifies, based on an attribute of the output generation request, a first prompt validation model of a plurality of prompt validation models (e.g., of a set of input controls). As an illustrative example, the data generation platform 702 can determine a technical application or type of requested output associated with the prompt. The attribute can include an indication that the prompt is requesting code (e.g., for software development purposes). Based on this attribute, the data generation platform 702 can determine a prompt validation model (e.g., an input control) that is suitable for the given prompt or output generation request. By doing so, the data generation platform 702 enables tailored, flexible, and modular controls or safety checks on prompts provided by users, thereby improving the efficiency of the system will targeting possible vulnerabilities in a prompt-specific manner.

At act 1210, process 1200 can provide the output generation request to the identified model for modification of the prompt. For example, the data generation platform 702 provides the output generation request to the first prompt validation model to modify the prompt. As an illustrative example, the data generation platform 702 can execute one or more input controls to evaluate the prompt, including trace injection, prompt injection, logging, secret redaction, sensitive data detection, prompt augmentation, or input validation. By doing so, the data generation platform 702 can improve the accuracy, security, and stability of prompts that are subsequently provided to LLMs, thereby preventing unintended data leakage (e.g., of sensitive information), malicious prompt manipulation, or other adverse effects.

In some implementations, process 1200 can replace or hide sensitive data within the user's prompt. For example, the data generation platform 702 determines that the prompt includes a first alphanumeric token. The data generation platform 702 can determine that one or more records in a sensitive token database include a representation of the first alphanumeric token. The data generation platform 702 can modify the prompt to include a second alphanumeric token in lieu of the first alphanumeric token, where the sensitive token database does not include a record representing the second alphanumeric token. As an illustrative example, the data generation platform 702 can detect that the prompt includes sensitive information (e.g., PII), such as users' personal names, social security numbers, or birthdays. By masking such information, the data generation platform 702 can ensure that such sensitive information is not leaked to or provided to external systems (e.g., via an API request to an externally-housed LLM), thereby mitigating security breaches associated with LLM use.

In some implementations, process 1200 can remove forbidden tokens from the user's prompt. For example, the data generation platform 702 determines that the prompt includes a forbidden token. The data generation platform 702 can generate the modified prompt by omitting the forbidden token. As an illustrative example, the data generation platform 702 can determine whether the user's prompt includes inappropriate or impermissible tokens, such as words, phrases, or sentences that are associated with swear words. The data generation platform 702 can mask or replace such inappropriate tokens, thereby improving the quality of inputs to the target LLM and preventing unintended or undesirable outputs as a result.

In some implementations, process 1200 can inject a trace token into the user's prompt to improve model evaluation and tracking capabilities. For example, the data generation platform 702 can generate a trace token comprising a traceable alphanumeric token. The data generation platform 702 can generate the modified prompt to include the trace token. As an illustrative example, the data generation platform 702 can inject (e.g., by modifying the prompt to include) tokens, such as characters, words, or phrases, that are designed to enable tracking, evaluation, or monitoring of the prompt any resulting outputs. By doing so, the data generation platform 702 enables evaluation and troubleshooting with respect to LLM outputs (e.g., to detect or prevent prompt manipulation or interception of the prompt or output by malicious actors).

At act 1212, process 1200 can compare the performance metric value with a performance criterion (e.g., a threshold metric value) that is related to the LLM associated with the output generation request. For example, the data generation platform 702 compares the performance metric value of the output generation request with a first performance criterion associated with the first LLM of a plurality of LLMs. As an illustrative example, the data generation platform 702 can compare a requirement of system resources for execution of the LLM using the given prompt with a threshold value (e.g., as associated with the LLM, the user, and/or the attribute of the output generation request). For example, the data generation platform 702 can compare an estimated system memory usage for use of the LLM with an available system memory availability to determine whether the LLM can be used without adversely affecting the associated computing system. By doing so, the data generation platform 702 can prevent unintended system-wide issues regarding resource use.

In some implementations, process 1200 can generate a cost metric value and determine whether the cost metric value satisfies a threshold cost (e.g., a threshold associated with the performance criterion). For example, the data generation platform 702 generates a cost metric value associated with the estimated resource requirement for the output generation request. The data generation platform 702 can determine a threshold cost associated with the first LLM. The data generation platform 702 can determine that the cost metric value satisfies the threshold cost. As an illustrative example, the data generation platform 702 can determine a monetary cost associated with running the LLM with the requested prompt. Based on determining that the cost is greater than a threshold cost (e.g., a remaining budget within the user's allotment), the data generation platform 702 can determine not to provide the prompt to the LLM. Additionally or alternatively, the data generation platform 702 can determine that the cost is less than the threshold cost and, in response to this determination, proceed to provide the prompt to the LLM. By doing so, the data generation platform 702 provides improved flexibility and/or control over the use of system resources (including memory, computational, and/or financial resources), enabling optimization of the associated development pipeline.

At act 1214, process 1200 can provide the prompt (e.g., as modified by suitable prompt validation models) to the LLM generate the requested output. For example, in response to determining that the performance metric satisfies the first performance criterion, the data generation platform 702 provides the prompt to the first LLM to generate an output.

As an illustrative example, the data generation platform 702 can generate a vector representation of the prompt (e.g., using a vectorization system and/or the vector database) and provide the vector representation to a transformer model and/or a neural network associated with an LLM (e.g., through an API call). By doing so, the data generation platform 702 can generate a resulting output (e.g., generated code or natural language data) in response to a query submitted by the user within the prompt.

At act 1216, process 1200 can validate the output from the LLM. For example, the data generation platform 702 provides the output to an output validation model to generate a validation indicator associated with the output. As an illustrative example, the data generation platform 702 can validate the output of the LLM to prevent security breaches or unintended behavior. For example, the data generation platform 702 can review output text using a toxicity detection model and determine an indication of whether the output is valid or invalid. In some implementations, the data generation platform 702 can determine a sentiment associated with the output and modify the output (e.g., by resubmitting the output to the LLM) to modify the sentiment associated with the output. By doing so, the data generation platform 702 can ensure the accuracy, utility, and reliability of generated data.

In some implementations, process 1200 can validate the output by generating and testing an executable program compiled on the basis of the output. For example, the data generation platform 702 extracts a code sample from the output, where the code sample includes code for a software routine. The data generation platform 702 can compile, within a virtual machine of the system, the code sample to generate an executable program associated with the software routine. The data generation platform 702 can execute, within the virtual machine, the software routine using the executable program. The data generation platform 702 can detect an anomaly in the execution of the software routine. In response to detecting the anomaly in the execution of the software routine, the data generation platform 702 can generate the validation indicator to include an indication of the anomaly. As an illustrative example, the data generation platform 702 can generate a validation indicator based on determining that the output contains code and testing the code (and/or the compiled version of the code) in an isolated environment for potential adverse effects, viruses, or bugs. By doing so, the data generation platform 702 can ensure the safety and security of generated code, thereby protecting the software development pipeline from security breaches or unintended behavior.

At act 1218, process 1200 can enable access to the output by the user. For example, in response to generating the validation indicator, the data generation platform 702 transmits the output to a server system enabling access to the output by the user device. As an illustrative example, the data generation platform 702 can provide the output to a server that enables users to access the output data (e.g., through login credentials) for consumption of the data and/or use in other downstream applications. As such, the data generation platform 702 provides a robust, flexible, and modular way to validate LLM-generated content.

Figure 13:
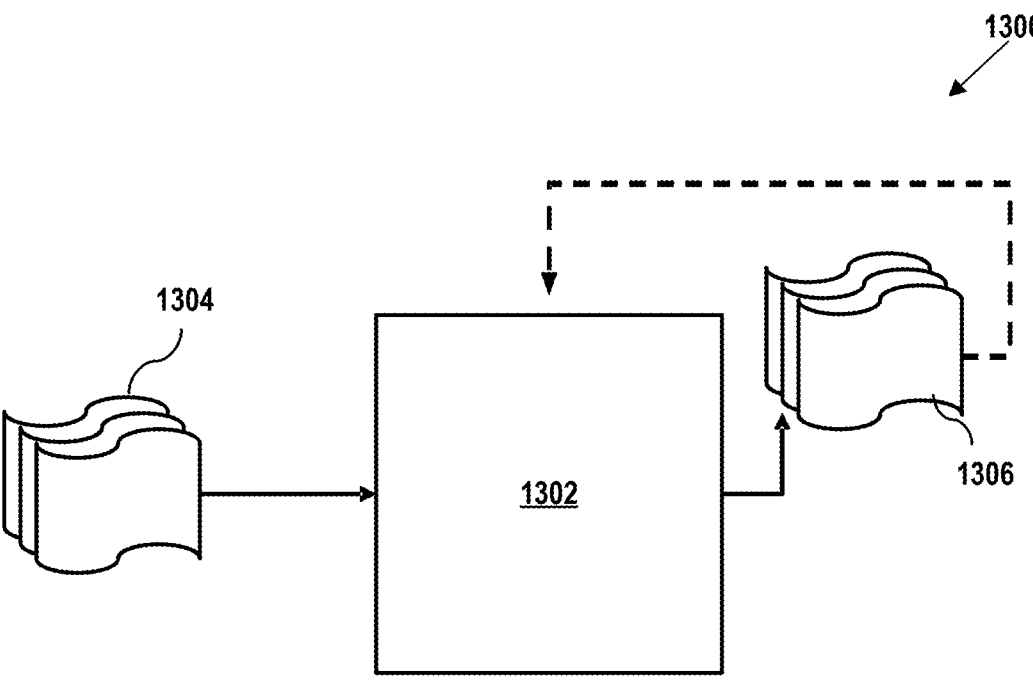
FIG. 13 shows a diagram of an artificial intelligence (AI) model, in accordance with some implementations of the present technology.

FIG. 13 shows a diagram of an AI model, in accordance with some implementations of the present technology. AI model 1300 is shown. In some implementations, AI model 1300 can be any AI model. In some implementations, AI model 1300 can be part of, or work in conjunction with, server computing device 906 (FIG. 9). For example, server computing device 906 can store a computer program that can use information obtained from AI model 1300, provide information to AI model 1300, or communicate with AI model 1300. In other implementations, AI model 1300 can be stored in database 908 and can be retrieved by server computing device 906 to execute/process information related to AI model 1300, in accordance with some implementations of the present technology.

In some implementations, AI model 1300 can be a machine learning model 1302. Machine learning model 1302 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 13, machine learning model 1302 can take inputs 1304 and provide outputs 1306. In one use case, outputs 1306 can be fed back to machine learning model 1302 as input to train machine learning model 1302 (e.g., alone or in conjunction with user indications of the accuracy of outputs 1306, labels associated with the inputs, or other reference feedback information). In another use case, machine learning model 1302 can update its configurations (e.g., weights, biases, or other parameters) based on its assessment of its prediction (e.g., outputs 1306) and reference feedback information (e.g., user indication of accuracy, reference labels, or other information). In another use case, where machine learning model 1302 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 1302 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there can or can not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Dynamic Model Selection for the Data Generation Platform

The data generation platform disclosed herein enables dynamic model selection for processing inputs (e.g., prompts) to generate associated outputs (e.g., responses to the prompts). For example, the data generation platform can redirect a prompt to a second LLM (e.g., distinct from the first LLM selected by the user within the output generation request). Additionally or alternatively, the data generation platform operates with other suitable machine learning model algorithms, inputs (e.g., including images, multimedia, or other suitable data), and outputs (e.g., including images, video, or audio). By doing so, the data generation platform 702 can mitigate adverse system performance (e.g., excessive incurred costs or overloaded memory devices or processors) by estimating system effects associated with the output generation request (e.g., the prompt) and generating an output using an appropriate model.

Figure 14:
FIG. 14 shows a schematic of a data structure illustrating a system state and associated threshold metric values, in accordance with some implementations of the present technology.

FIG. 14 shows a schematic of a data structure 1400 illustrating a system state and associated threshold metric values, in accordance with some implementations of the present technology. For example, the data structure 1400 includes usage values 1404 and maximum values 1406 for performance metrics 1402. The data generation platform 702 can determine threshold metric values based on data associated with system performance (e.g., at the time of receipt of the output generation request). By doing so, the data generation platform 702 enables dynamic evaluation of requests for output generation, as well as dynamic selection of suitable models with which to process such requests.

As discussed in relation to FIG. 10 above, a performance metric can include an attribute of a computing system that characterizes system performance. For example, the performance metric is associated with monetary cost, system memory, system storage, processing power (e.g., through a CPU or a GPU), and/or other suitable indications of performance. The system state (e.g., a data structure associated with the system state) can include information relating to performance metrics 1402, such as CPU usage, memory usage, hard disk space usage, a number of input tokens (e.g., system-wide, across one or more models associated with the data generation platform 702), and/or cost incurred. The data structure 1400 corresponding to the system state can include usage values 1404 and maximum values 1406 associated with the respective performance metrics 1402.

In some implementations, the data generation platform 702 determines a threshold metric value (e.g., of the threshold metric values 1408 of FIG. 14) based on a usage value and maximum value for a corresponding performance metric (e.g., of performance metrics 1402). For example, the data generation platform 702 determines a cost incurred up to a given point of time or within a predetermined time period associated with machine learning models of the data generation platform 702. The cost incurred can be stored as a usage value within the system state. For example, the usage value includes an indication of a sum of metric values for previous output generation requests, inputs (e.g., textual or non-textual prompts), or output generation instances associated with the system. The system state can include an indication of an associated maximum, minimum, or otherwise limiting value for the cost incurred or other performance metrics (e.g., an associated maximum value). By storing such information, the data generation platform 702 can determine a threshold metric value associated with generating an output using the selected model based on the prompt.

For example, the data generation platform 702 determines the threshold metric value based on a difference between the usage value and the maximum value. The data generation platform 702 can determine a threshold metric value associated with a cost allowance for processing a prompt based on a difference between a maximum value (e.g., a maximum budget) and a usage value (e.g., a cost incurred). As such, the data generation platform 702 can handle situations where the system's performance metric changes over time.

In some implementations, the data generation platform 702 can determine or predict a threshold metric value based on providing the output generation request and the system state to a threshold evaluation model. For example, the data generation platform 702 can provide the input, the indication of a selected model, and information of the system state to the threshold evaluation model to predict a threshold metric value. To illustrate, the data generation platform 702 can predict a future system state (e.g., a time-series of performance metric values associated with the system) based on the output generation request, the current system state, and the selected model. The data generation platform 702 can estimate an elapsed time for the generation of output using the requested model; based on this elapsed time, the data generation platform 702 can determine a predicted system state throughout the output generation, thereby enabling more accurate estimation of the threshold metric value. The threshold evaluation model can be trained on historical system usage (e.g., performance metric value) information associated with previous output generation requests. As such, the data generation platform 702 enables the determination of threshold metric values on a dynamic, pre-emptive basis, thereby improving the ability of the data generation platform 702 to predict and handle future performance issues.

In some implementations, the system state is generated with respect to a particular user and/or group of users. For example, the data generation platform 702 determines a system state associated with a subset of resources assigned to a given user or group of users. To illustrate, the data generation platform 702 can determine a maximum cost value associated with output generation for a given user or subset of users of the data generation platform 702. For example, the maximum cost value corresponds to a budget (e.g., a finite set of monetary resources) assigned to a particular group of users, as identified by associated user identifiers. Furthermore, the usage value can be associated with this particular group of users (e.g., corresponding to the generation of outputs using LLMs by users of the group). As such, the data generation platform 702 can determine an associated threshold metric value that is specific to the particular associated users. By doing so, data generation platform 702 enables flexible, configurable requirements and limits to system resource usage based on the identity of users submitting prompts.

In some implementations, the data generation platform 702 determines an estimated performance metric value, as discussed in relation to FIG. 10. For example, the data generation platform 702 generates the estimated performance metric value based on a performance metric evaluation model. A performance metric evaluation model can include an artificial intelligence model (e.g., or another suitable machine learning model) that is configured to predict performance metric values associated with generating outputs using machine learning models (e.g., LLMs). For example, the performance metric evaluation model can generate an estimated cost value for processing a prompt using the first LLM to generate the associated output. In some implementations, the performance metric evaluation model is trained using previous prompts and associated performance metric values. The performance metric evaluation model can be specific to a particular machine learning model or LLM. Additionally or alternatively, the performance metric evaluation model accepts an indication of a machine learning model as an input to generate the estimated performance metric value.

In some implementations, the data generation platform 702 evaluates the suitability of a prompt for a given model based on comparing a composite metric value with a threshold composite value. For example, the data generation platform 702 generates a composite performance metric value based on a combination of performance metrics (e.g., the performance metrics 1402 as shown in FIG. 14). To illustrate, the data generation platform 702 can generate a composite performance metric based on multiple performance metrics of the computing system associated with the machine learning models. Based on the metric, the data generation platform 702 can generate an estimated composite metric value corresponding to the composite metric (e.g., by calculating a product of values associated with the respective performance metrics) and compare the estimated composite metric value with an associated threshold metric value. As such, data generation platform 702 enables a more holistic evaluation of the effect of a given output generation request on system resources, thereby improving the accuracy and efficiency of the data generation platform 702 in selecting a suitable model. In some implementations, the data generation platform 702 can assign particular performance metrics a respective weight and calculate a value for the composite metric accordingly. Accordingly, the data generation platform 702 enables the prioritization of relevant performance metrics (e.g., cost) over other metrics (e.g., memory usage) according to system requirements.

Process for Validating Model Inputs and Outputs

Figure 15:
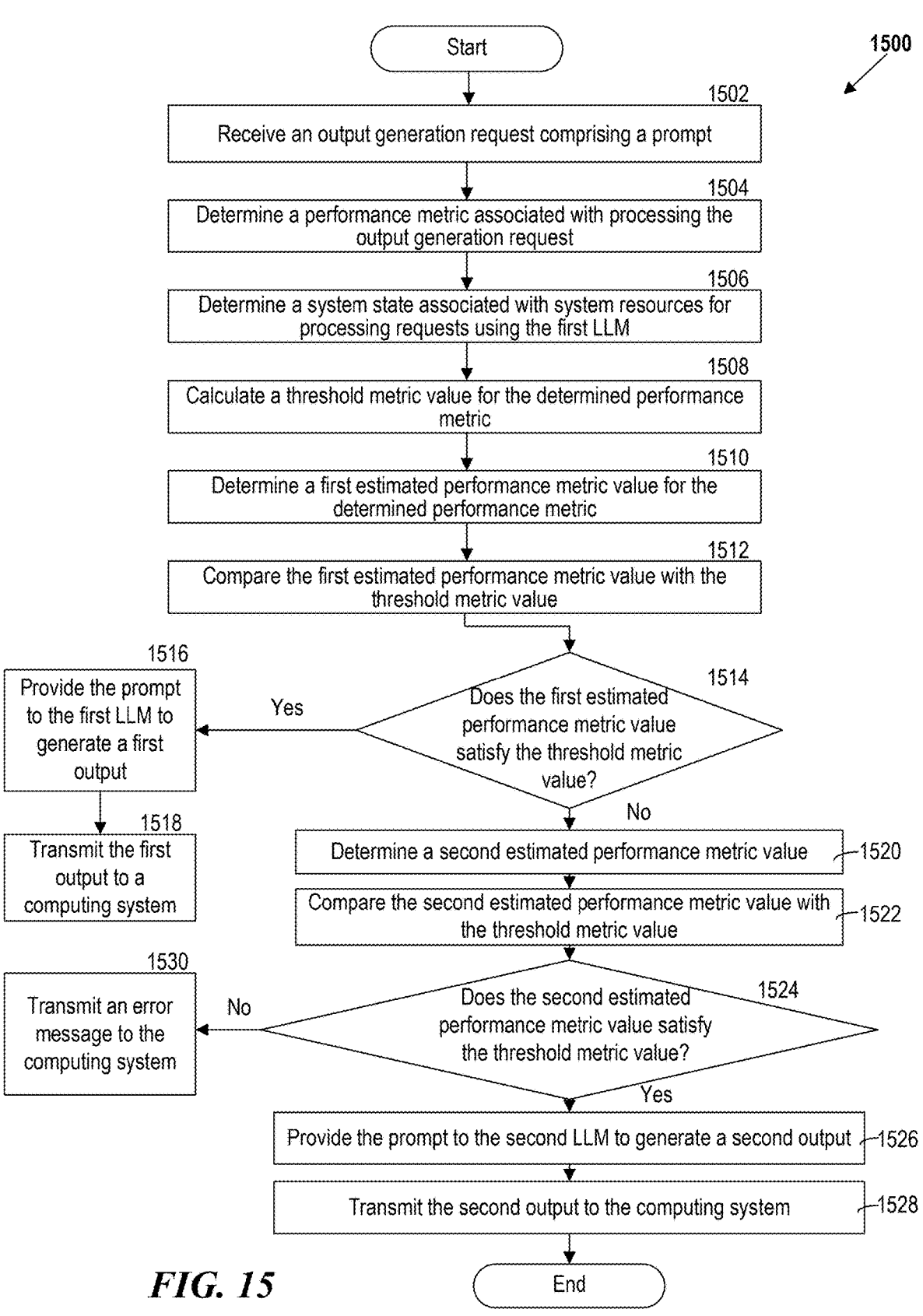
FIG. 15 shows a flow diagram illustrating a process for dynamic selection of models based on evaluation of user prompts, in accordance with some implementations of the present technology.

FIG. 15 shows a flow diagram illustrating a process 1500 for dynamic selection of models based on evaluation of user inputs (e.g., prompts), in accordance with some implementations of the present technology. For example, the process 1500 enables selection of an LLM for generation of an output (e.g., software-related code samples) based on an input (e.g., a text-based prompt) to prevent overuse of system resources (e.g., to ensure that sufficient system resources are available to process the request).

At act 1502, the process 1500 can receive an input for generation of an output using a model. For example, the process 1500 receives, from a user device, an output generation request comprising an input (e.g., prompt) for generation of an output using a first model (e.g., an LLM) of a plurality of models. As an illustrative example, the data generation platform 702 (e.g., through the communication engine 712) receives a prompt indicating a desired output, such as a text-based instruction for the generation of software-related code samples (e.g., associated with a particular function). The output generation request can include an indication of a selected model (e.g., LLM) for processing the prompt. As such, the data generation platform 702 can evaluate the effect of generating an output using the selected model based on the prompt (e.g., or other suitable inputs) on the basis of the content or nature of the request (e.g., based on a user identifier associated with the request).

At act 1504, the process 1500 can determine a performance metric associated with processing the output generation request. For example, the process 1500 determines a performance metric associated with processing the output generation request. As an illustrative example, the data generation platform 702 can determine one or more performance metrics that characterize the behavior of the system (e.g., when providing inputs to a model for generation of an output). Such performance metrics can include CPU utilization, cost (e.g., associated with the operation of the system and/or the associated models), memory usage, storage space, and/or number of input or output tokens associated with LLMs. In some implementations, the data generation platform 702 (e.g., through the performance engine 718) determines multiple performance metrics (e.g., associated with the system state) for evaluation of the effects (e.g., of generating an output based on the prompt) on the system.

At act 1506, the process 1500 can determine a system state associated with system resources. For example, the process 1500 determines a system state associated with system resources for processing requests using the first model of the plurality of models. As an illustrative example, the performance engine 718 dynamically determines a state of the system (e.g., with respect to the determined performance metrics). The system state can include an indication of values associated with performance metrics (e.g., usage values, such as CPU utilization metric values, memory usage values, hard disk space usage values, numbers of input tokens previously submitted to models within the system, and/or values of incurred cost). For example, the data generation platform 702, through communication engine 712 can query a diagnostic tool or program associated with the computing system and/or an associated database to determine values of the performance metrics. In some implementations, the system state includes maximum, minimum, or other limiting values associated with the performance metric values (e.g., a maximum cost/budget, or a maximum available memory value). By receiving information relating to the system state and associated restrictions, the data generation platform 702 can evaluate the received prompt to determine whether the selected model is suitable for generating an associated output.

At act 1508, the process 1500 can calculate a threshold metric value (e.g., associated with the output generation request). For example, the process 1500 calculate, based on the system state, a threshold metric value for the determined performance metric. As an illustrative example, the data generation platform 702 (e.g., through the performance engine 718) determines an indication of computational or monetary resources available for processing the input or prompt (e.g., to generate an associated output). The data generation platform 702 can determine an available budget (e.g., a threshold cost metric) and/or available memory space (e.g., remaining space within a memory device of the system) for processing the request. By doing so, the data generation platform 702 can evaluate the effect of generating an output based on the prompt using the specified model (e.g., LLM) with respect to system requirements or constraints.

In some implementations, the data generation platform 702 (e.g., through performance engine 718) can determine the threshold metric value to include the allowance value. For example, the performance engine 718 determines that the performance metric corresponds to a cost metric. The performance engine 718 can determine a maximum cost value associated with output generation associated with the system. The performance engine 718 can determine, based on the system state, a sum of cost metric values for previous output generation requests associated with the system. The performance engine 718 can determine, based on the maximum cost value and the sum, an allowance value corresponding to the threshold metric value. The performance engine 718 can determine the threshold metric value comprising the allowance value. As an illustrative example, the performance engine 718 determines a remaining budget associated with LLM model operations. By doing so, the performance engine 718 can mitigate cost overruns associated with output text generation, thereby improving the efficiency of the data generation platform 702.

In some implementations, the data generation platform 702 (e.g., through the performance engine 718) can determine the threshold metric value based on a user identifier and corresponding group associated with the output generation request. For example, the data generation platform 702 determines, based on the output generation request, a user identifier associated with a user of the user device. The performance engine 718 can determine, using the user identifier, a first group of users, wherein the first group comprises the use. The performance engine 718 can determine the allowance value associated with the first group of users. As an illustrative example, the performance engine 718 determines an allowance value (e.g., a budget) that is specific to a group of users associated with the user identifier (e.g., a username) of the output generation request. As such, the data generation platform 702 enables tracking of resources assigned or allocated to particular groups of users (e.g., teams), thereby improving the flexibility of allocation of system resources.

In some implementations, the data generation platform 702 (e.g., through the performance engine 718) can determine the threshold metric value based on a usage value for a computational resource. For example, the data generation platform 702 determines that the performance metric corresponds to a usage metric for a computational resource. The performance engine 718 can determine an estimated usage value for the computational resource based on the indication of an estimated computational resource usage by the first model (e.g., LLM) when processing the input (e.g., prompt) with the first model. The performance engine 718 can determine a maximum usage value for the computational resource. The performance engine 718 can determine, based on the system state, a current resource usage value for the computational resource. The performance engine 718 can determine, based on the maximum usage value and the current resource usage value, an allowance value corresponding to the threshold metric value. The performance engine 718 can determine the threshold metric value comprising the allowance value. As an illustrative example, the performance engine 718 can determine a threshold metric value based on a remaining available set of resources that are idle (e.g., processors that are not being used or free memory). As such, the data generation platform 702 enables dynamic evaluation of the state of the system for determination of whether sufficient resources are available for processing the output.

At act 1510, the process 1500 can determine an estimated performance metric value associated with processing the output generation request. For example, the process 1500 determines a first estimated performance metric value for the determined performance metric based on an indication of an estimated resource usage by the first model when processing the input included in the output generation request. As an illustrative example, the data generation platform 702 determines a prediction for resource usage for generating an output using the indicated model (e.g., an LLM associated with the determined performance metric). The data generation platform 702 (e.g., through the performance engine 718) can determine a number of input tokens within the input or prompt and predict a cost and/or a memory usage associated with processing the prompt using the selected model. By doing so, the data generation platform 702 can evaluate the effects of processing the input on system resources for evaluation of the suitability of the model for generating the requested output.

In some implementations, the data generation platform 702 generates a composite performance metric value based on more than one performance metric. For example, the performance engine 718 determines that the performance metric includes a composite metric associated with a plurality of system metrics. The performance engine 718 can determine, based on the system state, a threshold composite metric value. The performance engine 718 can determine a plurality of estimated metric values corresponding to the plurality of system metrics. Each estimated metric value of the plurality of estimated metric values can indicate a respective estimated resource usage associated with processing the output generation request with the first model. The performance engine 718 can determine, using the plurality of estimated metric values, a composite metric value associated with processing the output generation request with the first model. The performance engine 718 can determine the first estimated performance metric value comprising the composite metric value. As an illustrative example, the data generation platform 702 can generate a geometric mean of estimated values associated with various performance metrics (e.g., estimated memory usage, CPU utilization, and/or cost) and determine an associated metric. In some implementations, the data generation platform 702 can generate a weighted geometric mean based on weightings assigned to respective values of the performance metric. By doing so, the data generation platform 702 enables flexible, targeted evaluation of system behavior associated with generating outputs using LLMs.

In some implementations, the data generation platform 702 generates a performance metric value corresponding to a number of input or output tokens. For example, the first estimated performance metric value corresponds to a number of input or output tokens, and wherein the threshold metric value corresponds to a maximum number of tokens. As an illustrative example, the data generation platform 702 determines a number of input tokens (e.g., words or characters) associated with the input or prompt. Additionally or alternatively, the data generation platform 702 determines (e.g., predicts or estimates) a number of output tokens associated with the output in response to the prompt. For example, the data generation platform 702 can estimate a number of output tokens by identifying instructions or words associated with prompt length within the prompt (e.g., an instruction to keep the generated output within a particular limit). By doing so, the data generation platform 702 can compare the number of tokens associated with processing the prompt with an associated threshold number of tokens to determine whether the selected model is suitable for the generation task. As such, the data generation platform 702 can limit wordy or excessive output generation requests, thereby conserving system resources.

In some implementations, the data generation platform 702 generates the estimated performance metric value based on providing the prompt to an evaluation model. For example, the data generation platform 702 provides the input (e.g., the prompt) and an indication of the first model (e.g., LLM) to a performance metric evaluation model to generate the first estimated performance metric value. To illustrate, the data generation platform 702 can provide the input to a machine learning model (e.g., an artificial neural network) to generate an estimate of resources used (e.g., an estimated memory usage or cost) based on historical data associated with output generation. By doing so, the data generation platform 702 improves the accuracy of estimated performance metric value determination, thereby mitigating overuse of system resources.

In some implementations, the data generation platform 702 trains the evaluation model based on previous inputs (e.g., prompts) and associated performance metric values. For example, the data generation platform 702 obtains, from a first database, a plurality of training prompts and respective performance metric values associated with providing respective training prompts to the first LLM. The data generation platform 702 can provide the plurality of training prompts and respective performance metric values to the performance metric evaluation model to train the performance metric evaluation model to generate estimated performance metric values based on prompts. For example, the data generation platform 702 can retrieve previous prompts submitted by users, as well as previous system states when the prompts are submitted to the associated model (e.g., LLM). Based on these previous prompts and system states, the data generation platform 702 can train the performance metric evaluation model to generate estimated performance metrics based on inputs.

At act 1512, the process 1500 can compare the first estimated performance metric value with the threshold metric value. As an illustrative example, the data generation platform 702 can determine whether the first estimated performance metric value is greater than, equal to, and/or less than the threshold metric value. At act 1514, the process 1500 can determine whether the first estimated performance metric value satisfies the threshold metric value. (e.g., by determining that the estimated resource usage value is less than or equal to a threshold metric value). For example, the data generation platform 702 can determine whether an estimated cost value associated with processing the prompt using the first model is less than or equal to an allowance value (e.g., a remaining balance within a budget). By doing so, the data generation platform 702 can ensure that the prompt is processed when suitable system resources are available.

At act 1516, the process 1500 can provide the input (e.g., prompt) to the first model in response to determining that the first estimated performance metric value satisfies the threshold metric value. For example, in response to determining that the first estimated performance metric value satisfies the threshold metric value, the process 1500 provides the prompt to the first model to generate a first output by processing the input (e.g., prompt) included in the output generation request. As an illustrative example, the data generation platform 702 can transmit the prompt (e.g., through the communication engine 712 and/or via an associated API) to the first LLM for generation of an associated output. To illustrate, the data generation platform 702 can generate a vector representation of the prompt (e.g., through word2vec or another suitable algorithm) and generate a vector representation of the output via the first LLM. By doing so, the data generation platform 702 can process the user's output generation request with available system resources (e.g., monetary resources or computational resources).

At act 1518, the process 1500 can generate the output for display on a device associated with the user. For example, the process 1500 transmits the first output to a computing system enabling access to the first output by the user device. As an illustrative example, the data generation platform 702 (e.g., through the communication engine 712) can transmit the output from the first LLM to a computing system (e.g., a server) from which the user can access the generated output (e.g., through an API call and/or via a user interface). By doing so, the data generation platform 702 enables generation of outputs (e.g., natural language outputs) using models specified by the user when system resources are available to process associated prompts.

At act 1520, the process 1500 can determine a second estimated performance metric value associated with a second model (e.g., LLM) in response to determining that the first estimated performance metric value does not satisfy the threshold metric value. For example, in response to determining that the first estimated performance metric value does not satisfy the threshold metric value, the process 1500 determines a second estimated performance metric value for the determined performance metric based on an indication of an estimated resource usage by a second model of the plurality of models when processing the prompt included in the output generation request. As an illustrative example, the data generation platform 702 can determine a second estimate for a cost associated with processing the output with the second model and determine whether this cost estimate is consistent with the threshold cost value (e.g., determine whether the cost is less than the budget available to the user for the output generation request).

At act 1522, the process 1500 can compare the second estimated performance metric value with the threshold metric value. For example, at act 1524, the process 1500 can determine whether the second estimated performance metric value satisfies the threshold metric value. As an illustrative example, the data generation platform 702 can determine whether the cost metric value associated with processing the input (e.g., prompt) with the second model is greater than, less than, and/or equal to the threshold metric value (e.g., associated with an allowance or budget). By doing so, the data generation platform 702 can ensure that sufficient system resources are available for processing the prompt using the second model, thereby enabling redirection of output generation requests to an appropriate model when the selected model is unsuitable due to insufficient resource availability.

At act 1526, the process 1500 can generate a second output by providing the prompt to the second model in response to determining that the second estimated performance metric value satisfies the threshold metric value. For example, the process 1500 provides the prompt to the second model to generate a second output by processing the input (e.g., prompt) included in the output generation request. As an illustrative example, the data generation platform 702 (e.g., through the communication engine 712) can generate vector representations of the prompt and transmit these (e.g., via an API call) to a device associated with the second model for generation of the associated output. By doing so, the data generation platform 702 enables processing of the output generation request using a model (e.g., the second LLM) that satisfies system resource limitations or constraints, thereby improving the resilience and efficiency of the data generation platform 702.

In some implementations, the process 1500 can determine the second model based on a selection of the model by the user. For example, in response to determining that the first estimated performance metric value does not satisfy the threshold metric value, the data generation platform 702 transmits a model (e.g., LLM) selection request to the user device. In response to transmitting the model selection request, the data generation platform 702 obtains, from the user device, a selection of the second model. The data generation platform 702 can provide the input (e.g., prompt) to the second model associated with the selection. As an illustrative example, the data generation platform 702 can generate a message for the user requesting selection of another LLM for generation of an output in response to the prompt. In response to the message, the data generation platform 702 can receive instructions from the user (e.g., via a command or function) for redirection of the prompt to another suitable model that satisfies performance requirements for the system.

In some implementations, the process 1500 can determine the second model based on a selection of the model on a GUI (e.g., from a list of models with performance metrics that satisfy the performance requirements). For example, the data generation platform 702, in response to determining that the first estimated performance metric value does not satisfy the threshold metric value, generates, for display on a user interface of the user device, a request for user instructions, wherein the request for user instructions comprises a recommendation for processing the output generation request with the second model of the plurality of models. In response to generating the request for user instructions, the data generation platform 702 can receive a user instruction comprising an indication of the second model. In response to receiving the user instruction, the data generation platform 702 can provide the prompt to the second model. To illustrate, the data generation platform 702 can generate indications of one or more recommended LLMs with estimated performance metric values (e.g., estimated cost values) that are compatible with the associated threshold performance metric (e.g., a threshold cost metric). By doing so, the data generation platform 702 can present options for LLMs (e.g., that satisfy system performance constraints) for processing the user's prompt, conferring the user with increased control over output generation.

At act 1528, the process 1500 can generate the output for display on a device associated with the user. For example, the process 1500 transmits the second output to the computing system enabling access to the second output by the user device. As an illustrative example, the data generation platform 702 (e.g., through communication engine 712) transmits the second output to a computing system that enables access to the output by the user (e.g., through an associated API or GUI).

At act 1530, the process 1500 can transmit an error message to the computing system in response to determining that the second estimated performance metric value does not satisfy the threshold metric value. As an illustrative example, the data generation platform 702 (e.g., through the communication engine 712) can generate a message that indicates that the input (e.g., prompt) is unsuitable for provision the second model due to insufficient resources. Additionally or alternatively, the data generation platform 702 can determine a third model (e.g., LLM) with satisfactory performance characteristics (e.g., with a third estimated performance metric value that satisfies the threshold metric value). By doing so, the data generation platform 702 enables generation of an output based on the prompt via an LLM such that system resources are conserved or controlled.

In some implementations, the process 1500 generates a recommendation for an LLM by providing the output generation request (e.g., the associated prompt) to a selection model. For example, in response to determining that the first estimated performance metric value does not satisfy the threshold metric value, the data generation platform 702 generates, for display on a user interface of the user device, a request for user instructions. The request for user instructions can include a recommendation for processing the output generation request with the second model of the plurality of models. In response to generating the request for user instructions, the data generation platform 702 can receive a user instruction comprising an indication of the second model. In response to receiving the user instruction, the data generation platform 702 can provide the input (e.g., prompt) to the second model. As an illustrative example, the data generation platform 702 can evaluate the prompt for selection of a model that is compatible with resource requirements and/or a task associated with the output generation request. For example, the data generation platform 702 can determine an attribute associated with the prompt (e.g., that the prompt is requesting the generation of a code sample) and reroute the prompt to a model that is configured to generate software-related outputs. By doing so, the data generation platform 702 can recommend models that are well-suited to the user's requested task, thereby improving the utility of the disclosed data generation platform.

Dynamic Output Validation for the Data Generation Platform

Figure 16:
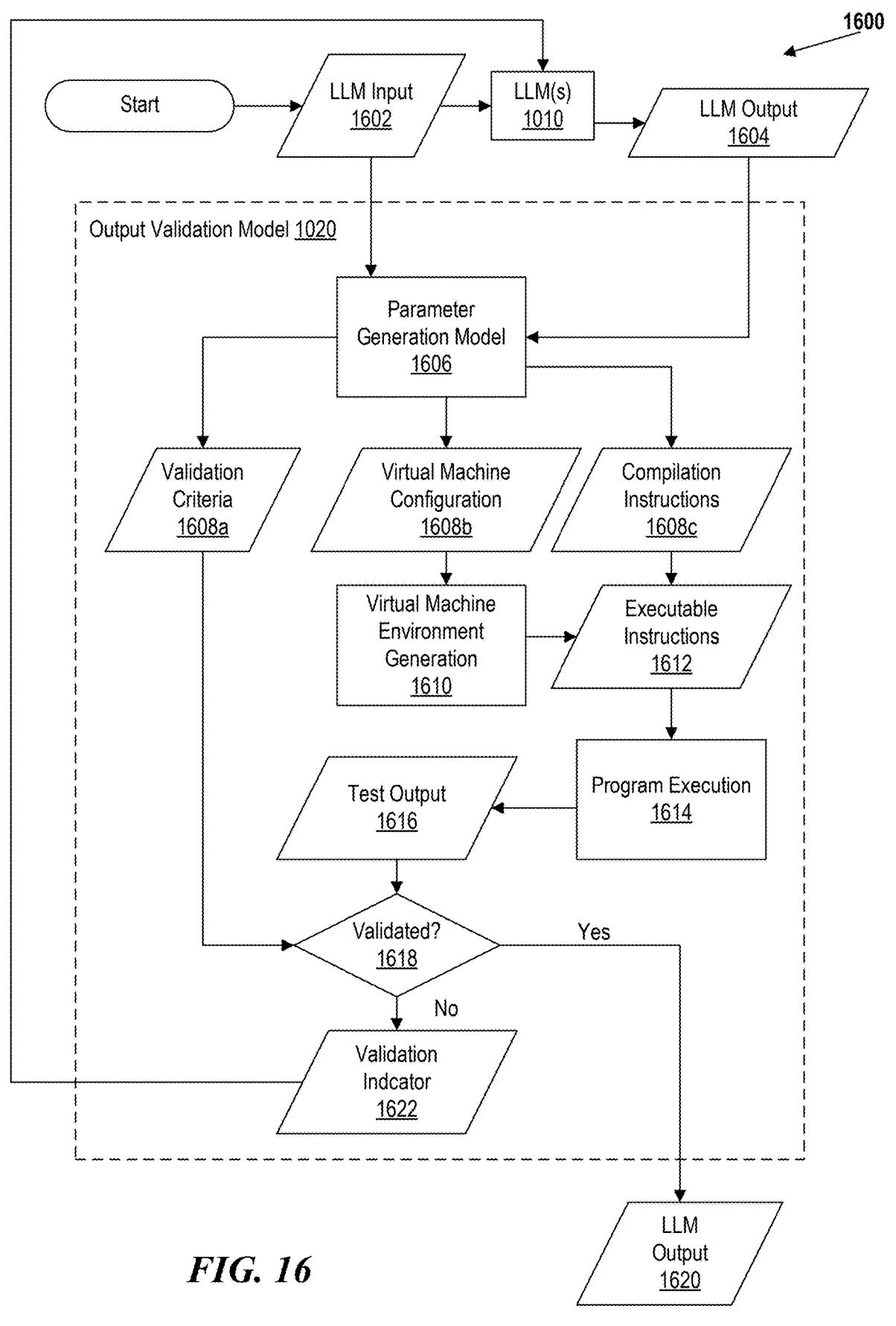
FIG. 16 shows a schematic illustrating a process for validating model outputs in an isolated environment, in accordance with some implementations of the present technology.

FIG. 16 shows a schematic illustrating a process 1600 for validating model outputs in an isolated environment, in accordance with some implementations of the present technology. The process 1600 enables the data generation platform 702 to evaluate and/or validate outputs from one or more machine learning models associated with the platform. For example, the data generation platform 702 can evaluate the safety, accuracy, and/or effects of code samples generated by an LLM in response to a user's prompt.

For example, the data generation platform 702 can receive (e.g., through the communication engine 712) an input (e.g., a prompt for an LLM, such as the LLM input 1602) for generation of software-related information by an associated machine learning model. For example, the input includes a prompt for generation of a code sample using the LLM(s) 1010 of FIG. 10. In some implementations, the input includes suitable data, including an image, video, text string, or audio recording (e.g., a voice recording). By providing the prompt (or other suitable input) to a model (e.g., one or more of LLM(s) 1010, or another suitable machine learning model), the generative model engine 720 can generate an associated output, such as LLM output 1604 shown in FIG. 16, in response to the user's output generation request.

The output from a machine learning model can include a code sample. In some implementations, a code sample includes software-related information, such as character strings indicating code snippets in one or more specified programming languages. The code sample can be embedded within the model output including other text (e.g., comments, explanations, or other such information). For example, a user associated with the output generation request can request generation of code samples for use in a particular application and/or for deployment on a specified system. To illustrate, the code sample generated by a model of the data generation platform 702 can include a portion of code in a particular language that adds a functionality to an existing application (e.g., for modification of the existing application's source code to include the generated code). The code sample can include one or more function definitions, variable definitions, algorithms, processes, or other suitable information. Additionally or alternatively, the code sample includes binary/executable files and/or other software-related information or data. By generating code sample, the data generation platform 702 enables improvements to software development efficiency by reducing the need for manual writing of code. For example, the data generation platform 702 generates application code, system-level code, pseudocode, coding instructions, and/or guidance for a model (e.g., an LLM) to generate, enhance, or modify existing code.

The output validation model 1020, as shown in FIG. 10, can validate the output generated by one or more machine learning models (e.g., the LLM output 1604). For example, the output validation model 1020 receives the LLM output 1604 and the associated input (e.g., the LLM input 1602) and provides such data to a parameter generation model 1606 for generation of parameters associated with output validation. Such parameters can include validation criteria 1808a, a virtual machine configuration 1808b, and/or compilation instructions 1808c.

A parameter generation model can include a model configured to generate parameters (e.g., for a validation test). The parameter generation model 1606 can include a machine learning model (e.g., as described previously) configured to receive an input (e.g., the LLM input 1602 and/or other information associated with the output generation request, such as a user identifier), and/or a model output (e.g., the LLM output 1604 and/or other information generated by machine learning models). For example, the parameter generation model 1606 receives a representation of the user's request to generate code associated with deployment of a software application, as well as the code sample generated by an LLM in response to the user's request. Based on such information, the data generation platform 702 can generate validation test parameters that enable validation of the generated code sample (e.g., within an isolated environment corresponding to a virtual machine). The validation test parameters can include one or more of validation criteria 1808a, a virtual machine configuration 1808b, and/or compilation instructions 1808c.

The validation test parameters can include a virtual machine configuration. FIG. 17 shows a data structure 1700 depicting a virtual machine configuration (e.g., the virtual machine configuration 1808b), in accordance with some implementations of the present technology. The virtual machine configuration can include a characterization of an isolated testing environment for compiling, executing, and/or evaluating generated code samples. For example, the parameter generation model 1606 can generate a virtual machine configuration, including an indication of a hardware configuration 1710, a software configuration 1730, and/or a communication configuration 1750 for the testing environment (e.g., a virtual machine environment).

The hardware configuration 1710 can include a characterization of hardware components (e.g., as associated with a virtual machine and/or a run-time environment). For example, a hardware configuration includes an indication of a system architecture, such as a CPU architecture (e.g., x86 and/or ARM) or a GPU architecture (e.g., Single Instruction Single Data (SISD), Single Instruction Multiple Data (SIMD), Multiple Instruction Single Data (MISD), and/or other suitable architectures), an indication of a storage type (e.g., an SSD and/or an HDD), an indication of a storage space (e.g., a size associated with the storage in bytes), and/or an indication of a memory type and/or space (e.g., associated with run-time or random-access memory). In some implementations, the hardware configuration includes the specification of peripherals and/or other devices associated with a computing device. The parameter generation model can generate the hardware configuration depending on the LLM input 1602 and/or the LLM output 1604 (e.g., the user's prompt and/or the generated code sample) based on a determination of hardware requirements associated with execution of the associated application. For example, the parameter generation model 1606 can determine that the code sample includes a request to transmit information to a physical display and can generate the hardware configuration to include an indication of a suitable display peripheral. By generating an indication of a hardware configuration associated with a validation test, the data generation platform 702 enables the specification of properties of a simulated computing device for testing generated code, thereby improving the accuracy and sensitivity of code validation.

The software configuration 1730 can include a characterization of software components (e.g., applications, operating systems, and/or other such components) associated with a virtual machine and/or run-time environment. For example, as shown in FIG. 17, the software configuration 1730 includes an indication of an operating system and/or version, and definition of environment variables (e.g., including a characterization of a home directory path, a display identifier, and/or a system language/locale). In some implementations, the software configuration 1730 includes an indication of libraries to be linked to the compiled executable instructions and/or other dependencies, such as other applications. The parameter generation model can generate the software configuration depending on the LLM input 1602 and/or the LLM output 1604 (e.g., the user's prompt and/or the generated code sample) based on a determination of software requirements associated with execution of the associated application. For example, the parameter generation model 1606 can determine that the code sample includes an indication of a particular software library and can generate the software configuration to include the software library. By specifying a software configuration for the validation test, the data generation platform 702 enables testing of generated code samples in an environment that includes any associated requirements for execution of the associated software application.

The communication configuration 1750 can include a characterization of communication links. For example, the communication configuration 1750 includes information relating to communication interfaces, peripherals, associated protocols, port configurations, data transmission rates, and/or security settings. To illustrate, the communication configuration 1750, as shown in FIG. 17, can include information relating to a standard associated with communication interfaces (e.g., wired or wireless network interfaces and/or interfaces with peripheral devices, such as computer mice, keyboards, and/or displays). The communication configuration 1750 can include an indication of a wireless network type and/or associated security standards, such as encryption standards. Additionally or alternatively, the communication configuration 1750 includes an indication of ports available for transmission of data (e.g., including information relating to associated communication protocols, including Hypertext Transfer Protocol (HTTP), Transmission Control Protocol/Internet Protocol (TCP/IP), and/or File Transfer Protocol (FTP) information). For example, the parameter generation model 1606 can determine that the code sample includes a network request (e.g., to download information via HTTP), and can generate the communication configuration to include a mechanism for accessing the internet. By generating information relating to communication configurations associated with a testing environment for generated code samples, the data generation platform 702 can accurately simulate execution of the associated application.

The data generation platform 702, at the operation 1610 shown in FIG. 16, can generate a virtual machine environment that is consistent with the generated virtual machine configuration 1808*b*. A virtual machine environment can include a subsystem associated with an environment (e.g., a virtual environment) in which computer programs can run, such as a run-time environment. The virtual machine environment can reside on one or more devices (e.g., in a cloud architecture) and can include containerized and/or non-containerized applications. For example, the environment can specify, define, and/or characterize memory management, environment variables, mechanisms for passing parameters between procedures, interfaces with an operating system, and/or other suitable conditions for computer program execution. For example, the virtual machine environment includes a virtual machine (e.g., an emulation or virtualization of a computer system) based on a particular computer architecture (e.g., as defined by the generated software and/or hardware configurations and/or associated communication configuration).

In some implementations, the parameter generation model 1606 can generate validation test parameters can include compilation instructions (e.g., associated with the code sample). The compilation instructions 1808*c* can include information, commands, and/or other suitable data associated with code compilation. For example, compilation instructions 1808*c* include information relating to how to generate an executable program based on a given code sample. In some implementations, the compilation instructions include an indication of a scripting language (e.g., a computer programming language) associated with the code sample. By generating such information, the parameter generation model 1606 provides information to aid in generation of an executable program (e.g., an executable binary and/or instructions) based on human-readable code. For example, the data generation platform 702 can retrieve, from a database of compilers, a compilation routine (e.g., a compiler) associated with a particular scripting language. In some implementations, the compilation instructions 1808*c* can include an identifier and/or address associated with a compiler for the given code sample (e.g., as associated with the corresponding scripting language). Furthermore, the compilation instructions 1808*c* can include flags, markers, and/or other customizations relating to the associated virtual machine configuration (e.g., as described below). For example, the compilation instructions 1808*c* include indications of compiler flags consistent with the virtual machine configuration generated by the parameter generation model 1606.

Additionally or alternatively, the compilation instructions 1808*c* includes an indication of a source code for the suitable application for which the user requests modification. For example, based on the prompt provided to the LLM by the user (e.g., LLM input 1602), the data generation platform 702 determines a target application and/or associated source code associated with the output generation request. Accordingly, the parameter generation model can generate an indication of how to modify the source code using the generated code sample, as well as instructions to compile the modified source code. As such, by generating compilation instructions, the data generation platform 702 enables flexible, modular modification and/or deployment of applications based on model-generated code samples.

Based on the compilation instructions and the code sample, the data generation platform 702 can generate an executable program within the configured virtual machine environment. For example, the executable program (e.g., the executable instructions 1612 for a software routine) includes a binary file and/or machine-readable instructions enabling execution of a given application or software routine. The data generation platform 702 can generate the executable program within the generated virtual machine environment (e.g., associated with a computing device). To illustrate, the data generation platform 702 can retrieve an address associated with a compilation routine (e.g., via a compiler database associated with the virtual machine environment). For example, the compiler database can include an index of compiler addresses associated with corresponding programming languages. The data generation platform 702 can provide the code sample and/or associated source code to a program associated with the compilation routine to generate the executable instructions (e.g., a binary file), thereby program execution at operation 1614 of FIG. 16. In some implementations, the data generation platform 702 can execute the program associated with code (e.g., a code sample or associated source code for an application) without compiling the code, as in the case of an interpreted scripting language. For example, the compilation instructions can indicate an interpreter address for execution of the code associated with the scripting language.

Process for Validating Model Outputs in a Virtual Environment

FIG. 18 shows a flow diagram illustrating a process 1800 for dynamic evaluation of machine model outputs in an isolated environment, in accordance with some implementations of the present technology. For example, the process 1800 enables evaluation of software-related code samples (e.g., code snippets) generated by LLMs for security breaches, intended system behavior, or software bugs/errors based on input-dependent validation tests within an isolated environment.

At act 1802, process 1800 can receive an output generation request that includes an input (e.g., a prompt for generation of text-based output). For example, the data generation platform 702 receives, from a user device, an output generation request including an input for generation of an output using a first large-language model (LLM). As an illustrative example, the data generation platform 702 can receive a text-based prompt indicating generation of a code snippet with a specified functionality and in a particular programming language (e.g., including a function for performing a particular calculation). As such, the data generation platform 702 enables the generation of software-related information, including textual code, according to user specifications.

At act 1804, process 1800 can provide the output to the requested model for generation of an output (e.g., a text-based output). For example, the data generation platform 702 provides the input to the first model to generate the output. As an illustrative example, the data generation platform 702 can provide the user prompt to an LLM that is configured to generate software-related code samples (e.g., one or more portions of source code) in response to user inputs. In some implementations, the output includes portions that are software code and other portions that are descriptions, comments, or other non-code data. Thus, the data generation platform 702 can obtain a model output that includes output (e.g., including a code sample) in response to the output generation request.

At act 1806, process 1800 can determine that the output includes software-related data, such as code. For example, the data generation platform 702 determines that the output includes a first code sample for a software routine. As an illustrative example, the data generation platform 702 can identify one or more portions of output generated from an LLM that correspond to code or other software-related information. For example, the data generation platform 702 extracts data from the LLM that corresponds to code. By doing so, the data generation platform 702 can further evaluate, test, and/or validate the functioning, security, and privacy associated with the execution of the code, as described below.

At act 1808, process 1800 can generate validation test parameters that characterize a test for validating the generated code sample. For example, in response to determining that the output includes the first code sample, the data generation platform 702 provides the input, an indication of the first model, and the first code sample to a parameter generation model to generate validation test parameters. The validation test parameters can include compilation instructions, a virtual machine configuration, and validation criteria. As an illustrative example, the data generation platform 702 can generate test parameters that characterize the nature, strictness, and/or criteria associated with testing the generated code samples for security, privacy and/or errors. For example, the data generation platform 702 determines the nature of the isolated environment (e.g., the virtual machine) in which to generate or compile an executable program associated with the code sample, based on the nature of the code sample and/or the associated output generation request. Additionally or alternatively, the data generation platform 702 identifies a procedure for compiling the code sample (e.g., by updating associated source code and executing a compilation routine). As such, the data generation platform 702 can generate flexible output testing parameters in a prompt-specific and/or application-specific manner.

At act 1810, process 1800 can configure a virtual machine environment according to the generated virtual machine configuration. For example, the data generation platform 702 configures, based on the virtual machine configuration, a virtual machine environment. As an illustrative example, the data generation platform 702 can identify and/or generate a virtual machine with an environment that includes parameters and/or properties as defined within the virtual machine configuration. For example, the data generation platform 702 can generate the virtual machine to simulate any network connections, hardware configurations, or software features as specified within the validation test parameters. By doing so, the data generation platform 702 can prepare an environment (e.g., an isolated environment) in which to test generated code in a safe, flexible manner.

In some implementations, the data generation platform 702 configures the virtual machine environment according to a communication configuration. For example, the data generation platform 702 determines that the virtual machine configuration includes an indication of a communication configuration indicating one or more communication interfaces. The data generation platform 702 can generate the virtual machine environment including a simulation of the one or more communication interfaces. As an illustrative example, the data generation platform 702 configures the virtual machine environment to include simulations of connections, such as WAN, LAN, and/or peripheral connections. By doing so, the data generation platform 702 can test any attempted transmissions associated with the generated code, thereby enabling the mitigation of security breaches or the unintended exposure of private information.

In some implementations, the data generation platform 702 configures the virtual machine environment according to a hardware configuration. For example, the data generation platform 702 determines that the virtual machine configuration includes an indication of a hardware configuration indicating a system architecture. The data generation platform 702 can generate the virtual machine environment including a simulation of the system architecture. As an illustrative example, the data generation platform 702 can simulate a hardware architecture (e.g., including emulation of central processing units (CPUs), graphics processing units (GPUs), and/or other associated hardware devices) within the virtual machine environment, thereby enabling comprehensive testing of system behavior due to the execution of generated code.

At act 1812, process 1800 can compile the first code sample to generate executable instructions for further testing. For example, the data generation platform 702 compiles, within the virtual machine environment and using the compilation instructions, the first code sample to generate a set of executable instructions for the software routine. As an illustrative example, the data generation platform 702 generate an executable version of a software routine associated with the code sample (e.g., an executable binary file) using the compilation instructions associated with the generated validation test parameters. For example, the data generation platform 702, using the compilation instructions, configures the executable binary file to be compatible with the simulated hardware architecture and/or software consistent with the virtual machine configuration. By doing so, the data generation platform 702 can prepare the generated code to be tested within the isolated environment (e.g., the virtual machine).

In some implementations, the data generation platform 702 configures a compilation routine based on identification of an associated scripting language. For example, the data generation platform 702 determines that the compilation instructions include an identifier of a scripting language. The data generation platform 702 can determine, from a compiler database, a compilation routine associated with the scripting language. The data generation platform 702 can configure, based on the virtual machine configuration, the compilation routine for operability within the virtual machine environment. The data generation platform 702 can generate, within the virtual machine environment and using the configured compilation routine, the set of executable instructions for the software routine. As an illustrative example, the data generation platform 702 can identify a programming language associated with the generated code and search for or identify an associated compiler. For example, the data generation platform 702 extracts an address associated with the compiler within a compiler database to determine a compiler (e.g., or an associated compilation routine) that is compatible with the compilation instructions, thereby enabling compilation of the code sample and generation of the associated executable instructions.

At act 1814, process 1800 can execute the executable instructions to generate a test output. For example, the data generation platform 702 executes, within the virtual machine environment, the set of executable instructions for the software routine to generate a test output. As an illustrative example, the data generation platform 702 can run, execute, or process the compiled instructions. In some implementations, the data generation platform 702, via the virtual machine configuration, can log (e.g., monitor) actions or effects of the running software routine. For example, the data generation platform 702 can detect communications associated with the simulated communication interfaces of the virtual machine, and/or determine run-times associated with the program. As such, the data generation platform 702 enables evaluation of the system behavior in relation to the code sample generated by the model in response to the output generation request.

At act 1816, process 1800 can determine whether the test output satisfies the validation criteria. For example, the data generation platform 702 determines a validation indicator specifying whether the test output satisfies the validation criteria. As an illustrative example, the data generation platform 702 can extract one or more criteria associated with the generated validation criteria of the validation test parameters. For example, the data generation platform 702 can extract a criterion specifying that memory usage is to remain within a particular range of values. The data generation platform 702 can monitor the test output (e.g., including readings of memory usage over time) to determine whether the criterion is satisfied throughout the execution of the executable program instructions. By doing so, the data generation platform 702 enables validation of the code generated via the associated models by evaluating the associated system behavior.

In some implementations, the data generation platform 702 validates communications associated with the virtual machine environment for anomalies. For example, the data generation platform 702 determines that the validation criteria includes an anomaly criterion indicating that an anomalous communication is forbidden. The data generation platform 702 can evaluate the test output including communications associated with the one or more communication interfaces. Based on determining that the communications include the anomalous communication, the data generation platform 702 can determine that the test output does not satisfy the validation criteria. The data generation platform 702 can generate the validation indicator including an indication that the test output does not satisfy the validation criteria. As an illustrative example, the data generation platform 702 can determine an attempt to initiate an unexpected connection (e.g., a WAN connection when only a LAN connection is allowed, according to validation criteria). By doing so, the data generation platform 702 can ensure that, following software deployment, sensitive information is not shared with unauthorized devices (e.g., beyond a particular LAN), thereby improving system security.

In some implementations, the data generation platform 702 determines a measure of similarity between the test output and an expected output to determine whether the test output satisfies the validation criteria. For example, the data generation platform 702 determines, based on the validation criteria, an expected test output for the software routine. The data generation platform 702 can generate a first vector representation for the expected test output and a second vector representation for the test output. The data generation platform 702 can generate a similarity metric value including a measure of a similarity metric between the first vector representation and the second vector representation. The data generation platform 702 can determine, based on the output generation request, a threshold value associated with the similarity metric. The data generation platform 702 can comparing the similarity metric value with the threshold value. Based on determining that the similarity metric value satisfies the threshold value, the data generation platform 702 can determine that the test output satisfies the validation criteria. The data generation platform 702 can generate the validation indicator specifying that the test output satisfies the validation criteria. As an illustrative example, the data generation platform 702 can determine an expected output (e.g., an expected log file) based on the validation criteria and/or other associated validation test parameters). To illustrate, the expected output can describe expected or predicted actions taken in response to executing the compiled code sample, such as memory usage, connections, and/or generation of other requested outputs (e.g., data generated by the executable instructions). The data generation platform 702 can compare the expected output with the actual test output to determine a similarity metric value (e.g., by comparing vector representations of the respective outputs). Based on determining the similarity metric value, the data generation platform 702 can determine if the test output differs from the expected output by a threshold value and, as such, can flag or detect unexpected behavior. As such, the data generation platform 702 enables improved anomalous behavior detection for an associated system.

In some implementations, the data generation platform 702 can determine the threshold value based on a user risk level associated with the output generation request. For example, the data generation platform 702 determines a user identifier associated with the output generation request. The data generation platform 702 can determine, based on a user database, a risk level for a user associated with the user identifier. The risk level can indicate a low, medium, or high risk associated with user activity for the user. In response to determining that the risk level indicates the medium or high risk associated with the user activity, the data generation platform 702 can determine a first value for the threshold value. In response to determining that the risk level indicates the low risk associated with the user activity, the data generation platform 702 can determine a second value for the threshold value, wherein the second value is greater than the first value. As an illustrative example, the data generation platform 702 can determine a strictness associated with evaluating the differences between an expected output and the test output on the basis of user credentials and/or a risk level associated with the user associated with the output generation request. For example, a user with less coding experience (e.g., with a number of years of experience fewer than a threshold number) can be assigned a high or medium risk level. Additionally or alternatively, a user with more coding experience (e.g., with a number of years of experience greater than the threshold number) can be assigned a low risk level. By tuning the threshold value associated with the similarity metric according to user credentials and/or user risk, the data generation platform 702 can improve mitigation of security breaches, errors, or bugs in a user-specific, targeted manner, thereby improving the efficiency of output evaluation by focusing system resources on users most likely to commit errors in software development.

In some implementations, the data generation platform 702 can determine whether the test output includes sensitive information (e.g., from the sensitive token database). For example, the data generation platform 702 determines that the validation criteria includes a privacy criterion indicating that sensitive information is forbidden in the test output. Based on determining that the validation criteria includes the privacy criterion, the data generation platform 702 can determine whether the test output includes a sensitive token of a sensitive token database. The data generation platform 702 can generate the validation indicator including an indication of whether the test output includes the sensitive token of the sensitive token database. As an illustrative example, the data generation platform 702 can determine that the test output includes sensitive and/or private information, such as PII, secrets, or other such information, based on determining that a token (e.g., a word, phrase, or sentence) of the test output is included within a sensitive token database. By doing so, the data generation platform 702 can prevent disclosure and/or exposure of sensitive or private information, thereby improving the safety of the system to which the code is to be deployed.

At act 1818, process 1800 can transmit the output from the first model in order to provide access to the output (e.g., the generated code sample) for the user. For example, in response to determining that the test output satisfies the validation criteria, the data generation platform 702 transmits the output to a server system enabling access to the output by the user device. As an illustrative example, the data generation platform 702 can determine that the test output satisfies validation criteria generated by the parameter generation model. For example, the data generation platform 702 determines that the test output indicates that the virtual machine remained within memory usage requirements specified by the validation criteria and did not attempt to communicate with forbidden devices (e.g., through forbidden communication channels). By doing so, the data generation platform 702 can ensure the security of the system prior to providing the generated code sample to the user requesting the code sample, in response to the output generation request.

At act 1820, process 1800 can generate a modified output when the test output does not satisfy the validation criteria. For example, in response to determining that the test output does not satisfy the validation criteria, the data generation platform 702 generates a modified output including a second code sample different from the first code sample. As an illustrative example, the data generation platform 702 can determine that the virtual machine, when executing the executable instructions associated with the code sample, does not satisfy memory usage requirements and/or attempts to communicate via forbidden channels. By doing so, the data generation platform 702 can modify the code to resolve any detected deficiencies in the validation test (e.g., based on an indication of a validation error). By doing so, the data generation platform 702 can resolve any bugs, errors, and/or security issues associated with the code sample generated in response to the output generation request.

In some implementations, the data generation platform 702 can generate the modified output by providing an indication of a validation error (e.g., associated with the validation indicator) to an LLM. For example, the data generation platform 702 determines, based on the validation indicator, an indication of a validation error associated with the test output. The indication of the validation error can include an indication of a criterion of the validation criteria that is not satisfied by the test output. The data generation platform 702 can provide the indication of the validation error, the first code sample, and the input to the first LLM to generate the modified output including the second code sample. As an illustrative example, the data generation platform 702 can generate a summary of any deficiencies associated with the validation test failure (e.g., an indication of particular criteria that was not satisfied by the test output) and provide such information to the LLM, along with the first code sample, to modify the code sample to resolve issues causing the validation test failure. For example, the data generation platform 702 modifies the code sample to prevent communication via a forbidden communication channel and/or to a forbidden communication device. By doing so, the data generation platform 702 can fix generated code in a targeted manner, improving the efficiency of software development.

At act 1822, process 1800 can transmit the modified output in order to provide access to the modified output for the user. For example, the data generation platform 702 transmits the modified output to the server system to enable access to the modified output by the user device. As an illustrative example, the data generation platform 702 can provide the modified output (e.g., including a modified code sample) to the user in response to the output generation request. As such, the data generation platform 702 can provide generated code to a user following validation and resolution of any validation test discrepancies, thereby improving the quality and security of the generated code for use by the user.

In some implementations, the data generation platform 702 can transmit the modified output to the user device in response to validating the modified output. For example, the data generation platform 702 compiles, within the virtual machine environment and using the compilation instructions, the second code sample to generate a second set of executable instructions. The data generation platform 702 can execute, within the virtual machine environment, the second set of executable instructions to generate a second test output. The data generation platform 702 can determine whether the second test output satisfies the validation criteria. In response to determining that the second test output satisfies the validation criteria, the data generation platform 702 can transmit the modified output to the server system to enable access to the modified output by the user device. As an illustrative example, the data generation platform 702 can ensure that the modified output (and/or the associated code) is consistent with the validation criteria prior to transmission to the user, thereby preventing any additional errors or security breaches introduced as a result of the modification.

Dynamic Resource-Sensitive Model Software and Hardware Selection

Figure 19:
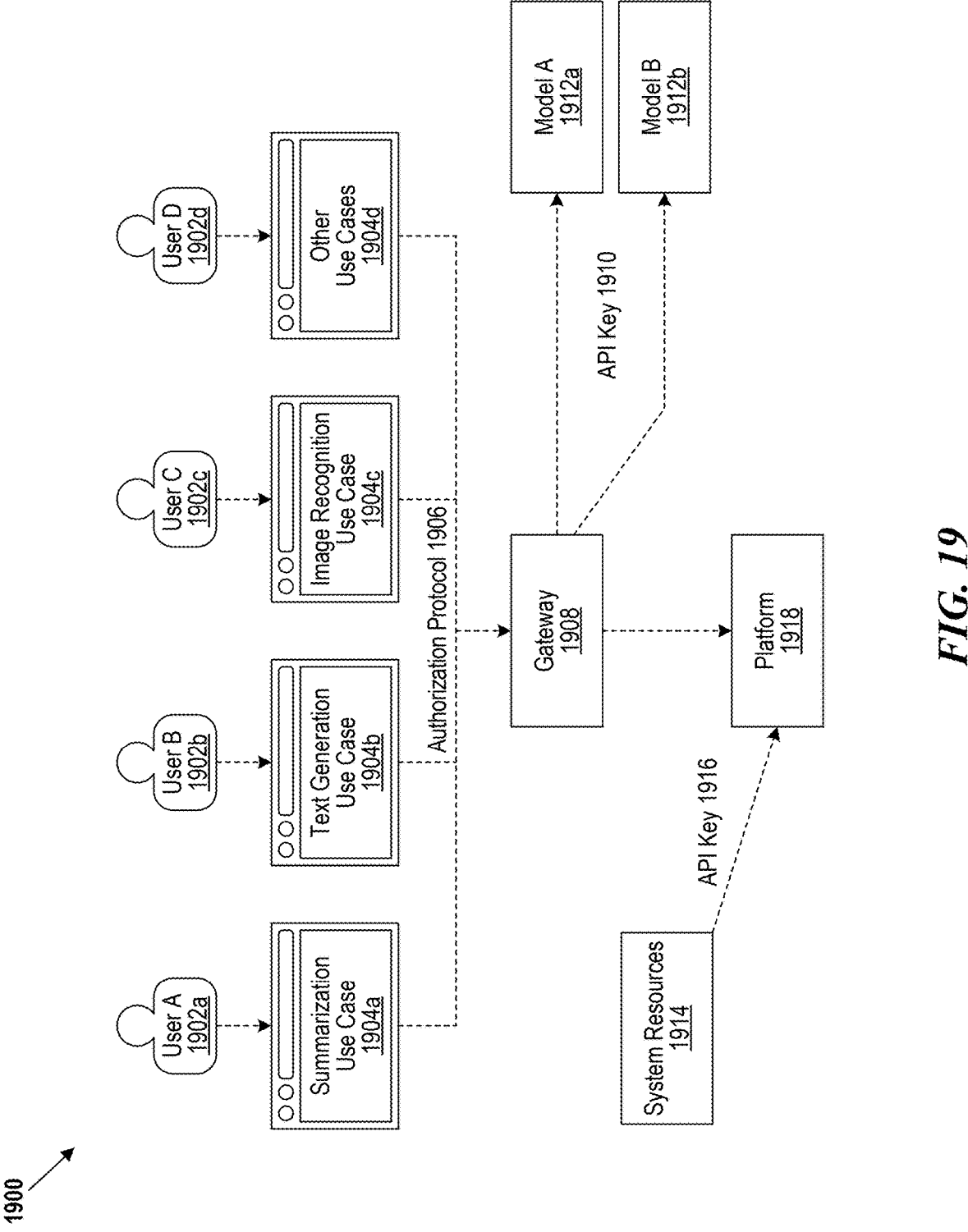
FIG. 19 is an illustrative diagram illustrating an example environment of a platform for dynamically selecting models and infrastructure to process a request with the selected models, in accordance with some implementations of the present technology.

FIG. 19 is an illustrative diagram illustrating an example environment 1900 of a platform 1918 for dynamically selecting models and infrastructure to process a request with the selected models, in accordance with some implementations of the present technology. Environment 1900 includes users 1902*a-d*, use cases 1904*a-d*, authorization protocol 1906, gateway 1908, API key 1910, 1916, models 1912*a-b*, system resources 1914, and platform 1918. Platform 1918 is implemented using components of example devices 800 and computing devices 902 illustrated and described in more detail with reference to FIG. 8 and FIG. 9, respectively. Platform 1918 can be the same as or similar to data generation platform 702 with reference to FIG. 7. Likewise, implementations of example environment 1900 can include different and/or additional components or can be connected in different ways.

Users 1902*a-d* can each represent different individuals or entities who interact with the platform by submitting inputs (e.g., input inquiry, prompt, query) in an output generation request to be processed subsequently by the platform 1918 to select appropriate models and resources. Each user 1902*a-d* can have distinct requirements and use cases, such as summarization use case 1904*a*, text generation use case 1904*b*, image recognition use case 1904*c*, and/or other use cases 1904*d*. For example, the summarization use case 1904*a* can include generating a concise summary of a given text input. The user 1902*a* submits a text document or a large body of text, and the platform 1918 processes the text document to produce a shorter version that captures the representative points and information of the text document. Additionally, the text generation use case 1904*b* can include generating new text based on a given prompt or input. The user 1902*b* provides a starting sentence, topic, or context, and the platform generates coherent and contextually relevant text. For instance, a user can provide a prompt like "Once upon a time in a faraway land," and the platform generates a continuation of the story. Further, the image recognition use case 1904*c* can include analyzing and identifying objects, features, or patterns within an image. The user 1902*c* submits an image, and the platform processes the image to recognize and label the contents. For example, a user can upload a photo of a crowded street, and the platform identifies and labels objects such as cars, pedestrians, traffic lights, and buildings.

The authorization protocol 1906 ensures that only authorized users and devices can access the platform 1918 by managing authentication and authorization processes, verifying user identities, and granting appropriate access rights based on predefined policies. The authorization protocol 1906 can include one or more of, for example, multi-factor authentication, OAuth tokens, or other security measures to ensure access control. In some implementations, the authorization protocol can also include biometric verification or hardware-based security modules for improved security. Examples of authorization protocol 1906 and methods of implementing authorization protocol 1906 are discussed with reference to FIGS. 20 and 21.

The gateway 1908 is an entry point for output generation requests submitted by users 1902*a-d*, routing the output generation requests to the platform 1918. The gateway 1908 can perform load balancing (i.e., distributing requests across multiple platform instances to improve efficiency of resource use and prevent bottlenecks), data transformations (i.e., converting and normalizing input data for compatibility with the platform), and/or protocol translations (e.g., converting HTTP requests to gRPC) to support the interactions between users 1902*a-d* and the platform 1918. In some implementations, the gateway 1908 is a microservices-based architecture that allows for scalable and modular handling of requests. For example, when user 1902*a* submits a text summarization request, the gateway 1908 balances the load by directing the request to an available instance (e.g., platform 1918), transforms the data format if needed, and/or translates the protocol to ensure compatibility before transmitting the request to the platform 1918. The platform 1918 processes the request, and the gateway 1908 returns the summarized text to the user.

In some implementations, when a user submits a request, the gateway 1908 first intercepts the request and checks for the presence of a valid API key 1910. The API key 1910, which serves as a unique identifier, is verified against the authorization protocol 1906. API key 1910 is used to authenticate (e.g., via authorization protocol 1906) and authorize API requests to ensure that only valid requests from authorized users or systems are processed by the platform. Once authenticated, the authorization protocol 1906 can check the associated permissions and roles linked to the API key 1910 to determine if the user has the necessary access rights to perform the requested action. If the API key 1910 is valid and the user is authorized, the gateway 1908 routes the request to the appropriate components within the platform 1918. This interaction ensures that only authorized users can access the platform's resources, maintaining the security and integrity of the system. In some implementations, the authorization protocol 1906 can also enforce additional security measures, such as rate limiting and logging, to further protect the platform from unauthorized access and abuse. In some implementations, API key 1910 can be supplemented with JWT (JSON Web Tokens) for stateless authentication and improved security.

Models 1912*a-b* are the different models (e.g., AI models, machine learning models, LLMs) accessible by the platform 1918. The models 1912*a-b* can have different capabilities and performance properties or attributes. The platform 1918 dynamically selects the most appropriate model(s) within models 1912*a-b* based on the output generation request of the user 1902*a-d* that specifies the use case 1904*a-d*. Methods of dynamically selecting the most appropriate model(s) is discussed in further detail with reference to FIG. 20. The models 1912*a-b* can include, for example, deep learning models, decision trees, or ensemble methods, depending on the use case 1904*a-d*. In some implementations, the platform can use a model registry to manage and version control the models 1912*a-b* to ensure that the most up-to-date and accurate versions of models 1912*a-b* are used for processing the output generation request.

Similarly to API key 1910, API key 1916 can be used to verify the system resources 1914 accessible by the users 1902*a-d*. System resources 1914 include the computational and storage resources used to process output generation request, encompassing CPU, GPU, memory, and/or other software, hardware, and/or network components that the platform allocates dynamically. The platform can use container orchestration tools such as KUBERNETES to manage the system resources 1914. In some implementations, the platform could leverage cloud-based infrastructure for elastic scaling and cost efficiency.

FIG. 20 is a flow diagram illustrating a process 2000 for the dynamic selection of models and infrastructure to process the request with the selected models based on evaluation of user prompts, in accordance with some implementations of the present technology. In some implementations, the process 2000 is performed by components of example devices 800 and computing devices 902 illustrated and described in more detail with reference to FIG. 8 and FIG.

9, respectively. Likewise, implementations can include different and/or additional steps or can perform the steps in different orders.

In operation 2002, the system receives, from a computing device, an output generation request including an input (e.g., a prompt, query, input query, request) for generation of an output using one or more models (e.g., AI models) of a plurality of models. In some implementations, at least one AI model in the plurality of AI models is a Large Language Model (LLM). The request can be received, for example, via an API endpoint exposed by a gateway (e.g., gateway 1908), which can be the entry point for incoming output generation request. The output generation request can include various parameters such as the type of output desired (e.g., text, image, or data), specific instructions or constraints, and/or metadata about the requestor.

In some implementations, the output generation request includes a predefined query context (e.g., metadata about the requestor) corresponding to a user of the computing device. The predefined query context is a vector representation of one or more expected values for the set of output attributes of the output generation request. The query context can include various types of metadata, such as the user's preferences, historical interaction data, or specific constraints and requirements for the output. For example, if the requestor is a user seeking a text summary, the query context can include information about the preferred summary length, the level of detail required, and any specific sections of the text that should be prioritized.

The vector representation of the query context is typically generated using techniques such as word embeddings, sentence embeddings, or other forms of vectorization that capture the semantic meaning and relationships of the metadata. Text vectorization transforms textual data into a numerical format. The pre-defined query context can be pre-processed, which can include tokenization, normalization, and/or stop word removal. Tokenization is the process of breaking down text into smaller units called tokens. These tokens can be words, phrases, or even individual characters. For instance, the sentence "The quick brown fox jumps over the lazy dog" can be tokenized into individual words like "The", "quick", "brown", "fox", "jumps", "over", "the", "lazy", and "dog". Normalization converts text into a consistent format, making the text easier to process. This can include converting all characters to lowercase, removing punctuation, expanding contractions (e.g., "don't" to "do not"), and handling special characters. Normalization ensures uniformity in the text, reducing variations that could lead to inaccuracies in analysis. For example, normalizing "Don't" and "don't" can result in both being converted to "do not". Stop word removal is the process of filtering out common words that carry little semantic value and are often considered irrelevant for text analysis. These words include "the", "is", "in", "and", etc. Removing stop words helps in focusing on the more meaningful parts of the text. For example, in the sentence "The quick brown fox jumps over the lazy dog", removing stop words would result in "quick", "brown", "fox", "jumps", "lazy", and "dog".

This vector is used to inform and guide the AI models during the output generation process. For instance, an LLM can adjust its text generation parameters to produce a summary that aligns with the user's historical or recorded preferences for length and detail. The use of a predefined query context allows the system to provide more personalized and contextually relevant outputs, enhancing the overall user experience. Additionally, the query context can be dynamically updated based on the user's interactions and feedback, allowing the system to continuously learn and improve its performance.

In operation 2004, using the prompt of the output generation request, the system generates expected values for a set of output attributes (e.g., output properties, features) of the output generation request. The generated expected values for the set of output attributes of the output generation request can indicate: (1) a type of the output generated from the prompt (e.g., text generation, summarization, image recognition, length of output, format, tone) and (2) a threshold response time of the generation of the output (e.g., low latency, high latency). Natural language processing (NLP) techniques, such as tokenization, part-of-speech tagging, and named entity recognition, can be used to identify the semantic structure and intent of the prompt. Based on this analysis, the system generates expected values for the output attributes.

The type of output refers to the specific format or nature of the generated content. For instance, the system can determine whether the output should be a text summary, a detailed report, an image, or a data visualization. The determination is based on the prompt's content and any predefined query context provided in the request. The system can use classification algorithms or predefined rules to categorize the prompt and assign the appropriate output type. For example, a prompt asking for a summary of a document can result in the system generating a concise text summary, while a prompt requesting an analysis of sales data can lead to the creation of a graphical report.

The threshold response time is an attribute that specifies the maximum allowable time for generating the output. The threshold response time ensures that the system meets performance requirements and provides timely responses to user requests. The system can calculate the threshold response time based on factors such as the complexity of the prompt, the computational resources available, and any user-specified constraints. For instance, a simple text generation task can have a shorter threshold response time compared to a complex image recognition task that uses extensive processing. The threshold response time can be dynamically adjusted based on a current load or resource availability of the system. For example, the system continuously monitors metrics such as CPU and GPU utilization, memory usage, network bandwidth, and active requests. When high load or limited resources are detected, the system increases the threshold response time for new requests to balance the load and prevent delays. Conversely, during low demand periods, the system decreases the threshold response time to provide faster responses. The system can prioritize requests based on the importance, assigning shorter response times to high-priority requests and longer times to lower-priority ones.

In operation 2006, for each particular AI model in the plurality of AI models, the system determines capabilities of the particular AI model. The capabilities can include, for example, (1) values of a set of estimated performance metrics for processing requests using the particular AI model (e.g., the abilities of the models on the platform), and/or (2) values of a set of system resource metrics indicating an estimated resource usage of available system resources for processing the requests using the particular AI model. The available system resources can include hardware resources, software resources, and/or network resources accessible by the computing device to process the output generation request using the particular AI model. Hardware resources can include resources beyond physical hardware, such as virtual machines (VMs). A VM is a software-based emulation of a physical computer that runs an operating system and applications just like a physical computer. Multiple VMs are able to run on a single physical machine, sharing the physical machine's resources such as CPU, memory, and storage. Each VM operates independently and can run different operating systems and applications, and are thus commonly used for tasks such as testing, development, and running multiple applications on a single hardware platform.

The values of the set of estimated performance metrics for each particular AI model in the plurality of AI models can include, for example, response time, accuracy, and/or latency. For example, the system can analyze the model's accuracy in generating text summaries, its response time for image recognition tasks, or its throughput in handling multiple concurrent requests.

The values of the set of system resource metrics for each particular AI model in the plurality of AI models can include, for example, Central Processing Unit (CPU) usage, Graphical Processing Unit (GPU) usage, memory usage, cost, power consumption, and/or network bandwidth. The system assesses the resource consumption patterns of each AI model, considering factors like computational intensity, memory footprint, and data transfer requirements. For instance, a deep learning model for image recognition can have high GPU and memory usage, while an NLP model can use significant CPU and network bandwidth for handling large text datasets.

To determine the capabilities of each AI model, the system can examine the model's architecture (e.g., the number of layers in a neural network), configuration (e.g., the types of operations the model performs), and dependencies (e.g., dependency on specific libraries or frameworks) to estimate the model's resource requirements and performance characteristics (e.g., computational intensity, memory footprint, and potential bottlenecks). In some implementations, the system can execute the model with representative data and capturing metrics such as processing time, accuracy, throughput, CPU and GPU utilization, memory consumption, and network bandwidth usage.

In some implementations, the system obtains a set of operation boundaries (e.g., guidelines, regulatory guidelines) of the plurality of AI models. In some implementations, the system translates guidelines into actionable test cases for evaluating AI model compliance. By parsing and interpreting guidelines (e.g., regulatory documents), the system identifies relevant compliance requirements and operational boundaries that must be complied with plurality of AI models. The system constructs a set of test cases associated with each guideline that covers various scenarios derived from the regulatory requirements. These test cases can include prompts, expected outcomes, and/or expected explanations. For each particular AI model in the plurality of AI models, the system evaluates the particular AI model against the set of test cases to determine compliance of the particular AI model with the set of operation boundaries. The system can generate one or more compliance indicators based on comparisons between expected and actual outcomes and explanations. For example, if the particular AI model's response meets the expected outcome and explanation, the particular AI model receives a positive compliance indicator. If there are discrepancies, the system can flag these as areas requiring further attention or modification. In some implementations, the system can automatically adjust to the parameters of the particular AI model to ensure alignment with regulatory guidelines. By validating each particular AI model, this results in more efficient resource usage so the validation test cases only have to be run once by the platform, rather than every time a user attempts to access a particular AI model.

In operation 2008, the system dynamically selects a subset of AI models from the plurality of AI models by comparing the generated expected values for the set of output attributes of the output generation request with the determined capabilities of the plurality of AI models. This comparison can be performed by assigning a degree to which each model's capabilities align with/satisfy the expected values. For instance, if the request requires a high-accuracy text summary with a short response time, the system assigns a higher degree of alignment/satisfaction to models that have demonstrated high accuracy and low latency in similar tasks in their determined capabilities.

In some implementations, the subset of models is dynamically selected responsive to determining the capabilities of each particular model in the plurality of models. The system can compare the determined capabilities a first model of the plurality of models with the determined capabilities of a second model of the plurality of models. The system can use a scoring mechanism that assigns a compatibility score to each AI model based on how well its capabilities match the expected values. The scoring mechanism can use weighted criteria to prioritize certain attributes over others, depending on the specific requirements of the request. For example, in a real-time application, response time can be weighted more heavily than accuracy, whereas in a medical diagnosis task, accuracy can be the primary criterion. The system aggregates the scores to rank the AI models, identifying those that best meet the overall requirements of the request. The system can normalize the performance metrics and expected values to a common scale to allow different metrics can be compared and aggregated. The system applies weights to each metric based on the importance of the corresponding attribute. The weights can be predefined based on the type of request or dynamically adjusted based on user preferences or contextual factors. For instance, a weight of 0.7 can be assigned to accuracy and 0.3 can be assigned to latency for a medical diagnosis task, reflecting the higher priority of accuracy.

Once the weights are applied, the system calculates a weighted sum for each AI model, representing its overall compatibility score. The score is a composite measure that reflects how well the model's capabilities align with the expected values across all relevant attributes. The system aggregates the scores to rank the AI models, identifying those that best meet the overall requirements of the request. The models with the highest compatibility scores are selected as the subset of AI models for processing the output generation request. In some implementations, the system prioritizes each AI model in the plurality of AI models based on historical performance data of each AI model in the plurality of AI models. The system can store the historical performance data of each AI model in a database accessible by the system. The system updates the historical performance data of one or more AI models in the plurality of AI models after the output generation request is processed.

In some implementations, the system sequentially evaluates each model's capabilities and compares them to the expected values, until a model is found that satisfies the requirements of the output generation request. The system determines the capabilities of a first model in the plurality of models. The system compares the generated expected values for the set of output attributes of the output generation request with the determined capabilities of the first model. Responsive to the determined capabilities of the first model satisfying the generated expected values for the set of output attributes of the output generation request, the system provides the input to the first model to generate the output by processing the input included in the output generation request using the selected subset of available system resources. Responsive to the determined capabilities of the first model not satisfying the generated expected values for the set of output attributes of the output generation request, the system can determine the capabilities of a second model in the plurality of models. Responsive to the determined capabilities of the second model satisfying the generated expected values for the set of output attributes of the output generation request, the system can provide the input to the second model to generate the output by processing the input included in the output generation request using the selected subset of available system resources. The approach ensures that the system quickly identifies a suitable model without the need for exhaustive evaluation of all available models. By stopping the search as soon as a model that meets the expected values is found, the system can efficiently allocate resources and minimize processing time.

In operation 2010, the system dynamically selects a subset of available system resources to process the prompt included in the output generation request by comparing the values of the set of system resource metrics of the dynamically selected subset of AI models with the determined capabilities of the dynamically selected subset of AI models. The system can query resource management modules to obtain real-time data on resource usage across the computing infrastructure. The system assesses the availability of hardware resources, such as the number of free CPU cores, available GPU memory, and storage capacity. The system can additionally or alternatively consider software dependencies, ensuring that the required libraries and frameworks are installed and compatible with the selected models. Additionally, the system evaluates network resources, such as available bandwidth and latency, to ensure that data can be transferred efficiently between components. To perform the comparison, the system can take into account various factors, such as resource constraints, priority levels, and potential contention with other tasks. The system can assign weights (e.g., accessed via an API key) to different resource types based on the resource's respective importance for the specific models and the output generation request. For example, GPU resources can be weighted more heavily for a model that relies on parallel processing, while network bandwidth can be prioritized for a model that requires frequent data transfers.

The dynamically selected subset of available system resources can include a set of shared hardware and a set of dedicated hardware. Shared hardware refers to resources that are concurrently used by multiple tasks or processes, such as general-purpose CPUs, shared GPU clusters, and common storage systems. Dedicated hardware, on the other hand, refers to resources that are exclusively allocated to a specific task or process, such as dedicated GPU instances, specialized accelerators (e.g., TPUs), and isolated memory pools. In some implementations, the system initializes processing the input query included in the output generation request using the set of shared hardware for a predetermined time period. Upon expiration of the predetermined time period, the system continues to process the input query included in the output generation request using the set of dedicated hardware. The transition allows the most resource-intensive stages of the processing are handled by dedicated resources, which can provide higher performance, lower latency, and more predictable execution times.

In some implementations, the system initializes processing the input query included in the output generation request using the set of dedicated hardware for a predetermined time period. Upon expiration of the predetermined time period, the system continues to process the input query included in the output generation request using the set of shared hardware. The transition helps better use resources by offloading less performance-based stages of the processing to shared resources, freeing up dedicated hardware for other high-priority tasks.

In operation 2012, the system provides the prompt to the selected subset of AI models to generate the output by processing the prompt included in the output generation request using the selected subset of available system resources. The routing process can be managed by a task scheduler that coordinates the execution of the models across the allocated system resources. The scheduler ensures that the input data is distributed to the appropriate models, taking into account factors such as data locality, resource availability, and load balancing. For example, if multiple models are running on different GPU instances, the scheduler ensures that the input data is transferred to the correct GPU memory to minimize data transfer latency and maximize processing efficiency. In some implementations, responsive to the generated output, the system automatically transmits, to the computing device, the output within the threshold response time. In some implementations, processing the input included in the output generation request using the dynamically selected subset of available system resources consumes less electrical power than processing the input included in the output generation request using a different subset of available system resources within the set of available system resources.

The output can be a final output. In some implementations, the system provides the prompt to the dynamically selected subset of AI models in parallel. The system can aggregate model-specific outputs from each AI model of the dynamically selected subset of AI models to generate the final output. In some implementations, the system distributes the input prompt across multiple AI models simultaneously, allowing each model to process the data independently and concurrently. The system can partition the input prompt into segments or sub-tasks that can be processed in parallel. For instance, in a text summarization task, the input document can be divided into sections, with each section being processed by a different model. In an image recognition task, different regions of an image can be analyzed by separate models. Once the input prompt is partitioned, the system routes each segment to the corresponding AI model in the dynamically selected subset. Once each AI model has processed the model's segment of the input prompt, the system aggregates the model-specific outputs to generate the final output. For instance, in a text summarization task, the system can merge the summaries generated by each model into a single summary. In an image recognition task, the system can combine the detected objects and features from each model into a single analysis of the input image.

In some implementations, the system provides the prompt to the dynamically selected subset of AI models in a sequence. The system can input a model-specific output from a first AI model of the dynamically selected subset of AI models into a second AI model of the dynamically selected subset of AI models in the sequence. For example, the system can provide the initial prompt to the first AI model in the sequence. The model processes the input data according to its specific capabilities and generates an intermediate output. For example, in an NLP task, the first model can perform tokenization and part-of-speech tagging on the input text. In an image processing task, the first model can perform initial feature extraction or object detection. Once the first model has generated its output, the system takes the model-specific output and inputs the model-specific output into the second AI model in the sequence. The second model processes the intermediate output, further refining or transforming the data. For instance, in the NLP task, the second model can perform named entity recognition or sentiment analysis on the tagged text. In the image processing task, the second model can perform more detailed analysis, such as identifying specific objects or classifying detected features. The sequential processing continues, with each model in the sequence receiving the output from the previous model and generating its own intermediate output. Once the final model in the sequence has processed its input, the system generates the final output.

In some implementations, the system generates a confidence score for a model-specific output generated by each AI model in the selected subset of AI models. The system can aggregate the model-specific outputs using the generated confidence scores. The system selects the model-specific output with a highest confidence score for transmission to the computing device. For example, in an NLP task, a model can calculate its confidence score based on the probability distribution of the generated text, the coherence of the sentences, and the alignment with known linguistic patterns. In an image recognition task, a model can calculate its confidence score based on the clarity of the detected objects, the consistency of the classification results, and the alignment with training data.

The system can receive a set of user feedback on the generated output. The feedback can be collected through various channels, such as user ratings, comments, error reports, or direct interaction with the output. The feedback data can be evaluated by the system to identify patterns, trends, and specific areas for improvement using NLP techniques and sentiment analysis to interpret and categorize the feedback. For example, the system can parse the textual feedback to extract information such as user satisfaction levels, specific issues encountered, and/or suggestions for improvement. The system can use machine learning algorithms, such as support vector machines (SVM) or neural networks, to classify the feedback into different categories, such as accuracy, relevance, performance, and usability. For example, feedback indicating that the output was inaccurate or irrelevant can be categorized under "accuracy issues," while feedback highlighting slow response times can be categorized under "performance issues."

Using the processed feedback, the system can adjust the dynamically selected subset of AI models and/or the dynamically selected subset of available system resources. For the AI models, the system can update the model selection criteria (e.g., assigning a higher weight to criticized areas such as accuracy or latency), retrain or fine-tune the models, or incorporate new models that better address the identified issues. For the system resources, the system can reallocate resources based on the feedback to improve performance and efficiency. For example, if the feedback indicates that the processing time is too slow, the system can allocate more CPU or GPU resources to the task, adjust the data pipelines, or implement more efficient algorithms. Conversely, if the feedback indicates that certain resources are being underutilized, the system can reallocate those resources to other tasks or reduce the overall resource allocation to improve cost efficiency. In some implementations, the system can use a reward-based mechanism where positive feedback leads to reinforcement of the current model and resource configurations, while negative feedback triggers further adjustments.

In some implementations, responsive to the generated output, the system generates for display at the computing device, a layout indicating the output. The layout can include a first representation of each model in the dynamically selected subset of models, a second representation of the dynamically selected subset of available system resources, and/or a third representation of the output. Further examples and methods of displaying the output are discussed with reference to FIG. 22.

Figure 21:
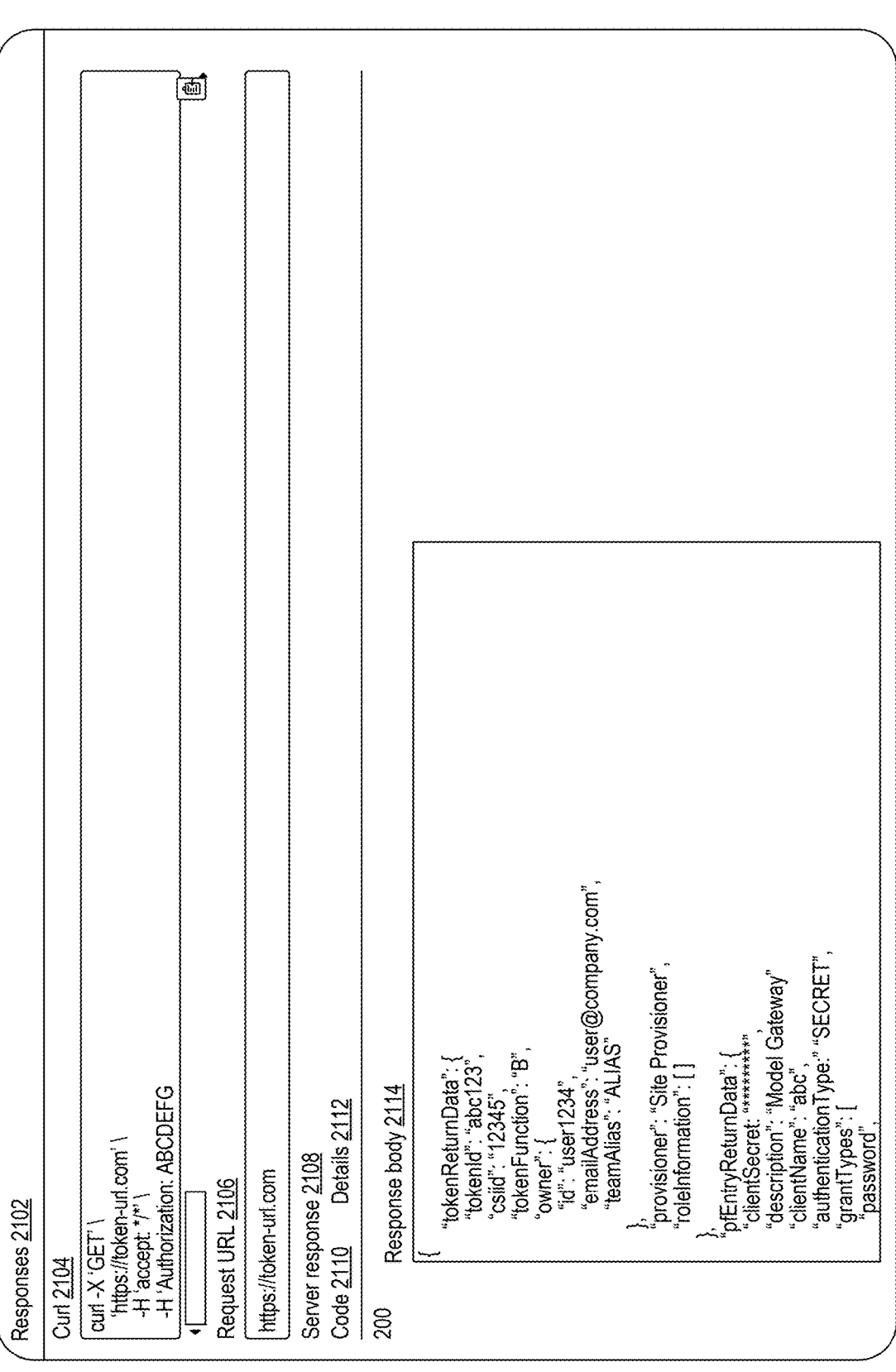
FIG. 21 is an example user interface for user authentication, in accordance with some implementations of the present technology.

FIG. 21 is an example user interface 2100 for user authentication, in accordance with some implementations of the present technology. User interface 2100 includes responses 2102, authentication tool 2104, request 2106, server response 2108, code 2110, details 2112, and response body 2114. User interface 2100 is implemented using components of example devices 800 and computing devices 902 illustrated and described in more detail with reference to FIG. 8 and FIG. 9, respectively. Implementations of example user interface 2100 can include different and/or additional components or can be connected in different ways.

The user interface 2100 allows users to input their credentials, which are processed and validated by the system to grant or deny access based on the authentication results. Responses 2102 can display the feedback or messages displayed to the user during the authentication process, including prompts for additional information, error messages if the input is incorrect, or confirmation messages once the authentication is successful. The authentication tool 2104 can be used to verify the user's identity, which can include various methods such as password entry, biometric scans (e.g., fingerprint or facial recognition), or two-factor authentication. The authentication tool 2104 processes the input provided by the user and checks the input against stored credentials to determine if access should be granted.

The request 2106 refers to the initial input or query made by the user to access the system, typically including the user's credentials, such as a username and password, or other identifying information. In some implementations, the request 2106 can also include additional context, such as the device type or location, to provide more comprehensive security checks. For example, when a user enters their credentials into a login form, the client (e.g., web browser or mobile app) constructs a Request URL with the entered credentials, and sends the request to the server using the constructed URL. The platform receives the request, extracts the credentials, and validates them. The platform generates a response 2108 indicating whether the authentication was successful or not, and sends the response 2108 back to the client, which processes and displays the result to the user.

The system receives the request 2106 passes the information to the authentication tool 2104 for validation. After the authentication tool 2104 processes the user's request 2106, the server generates a server response 2108, indicating whether the authentication was successful or if there were any issues that need to be addressed. The response 2108 is communicated back to the user through the user interface, providing them with the necessary information to proceed. In some implementations, the server response 2108 can include error codes or troubleshooting steps to help users resolve any issues encountered during authentication.

Details 2112 can include the additional information or metadata associated with the authentication process, including the time and date of the authentication attempt, the IP address of the user, and other relevant data that can be used for logging and auditing purposes. Details 2112 provide a record of authentication activities and can be useful for security analysis and troubleshooting. The response body 2114 is the main code 2110 of the server's response to the user's authentication request, including the outcome of the authentication process, such as a success message, an error message, or instructions for further action. The response body 2114 is displayed to the user through the interface, providing them with an indication of the status of their authentication attempt.

Figure 22:
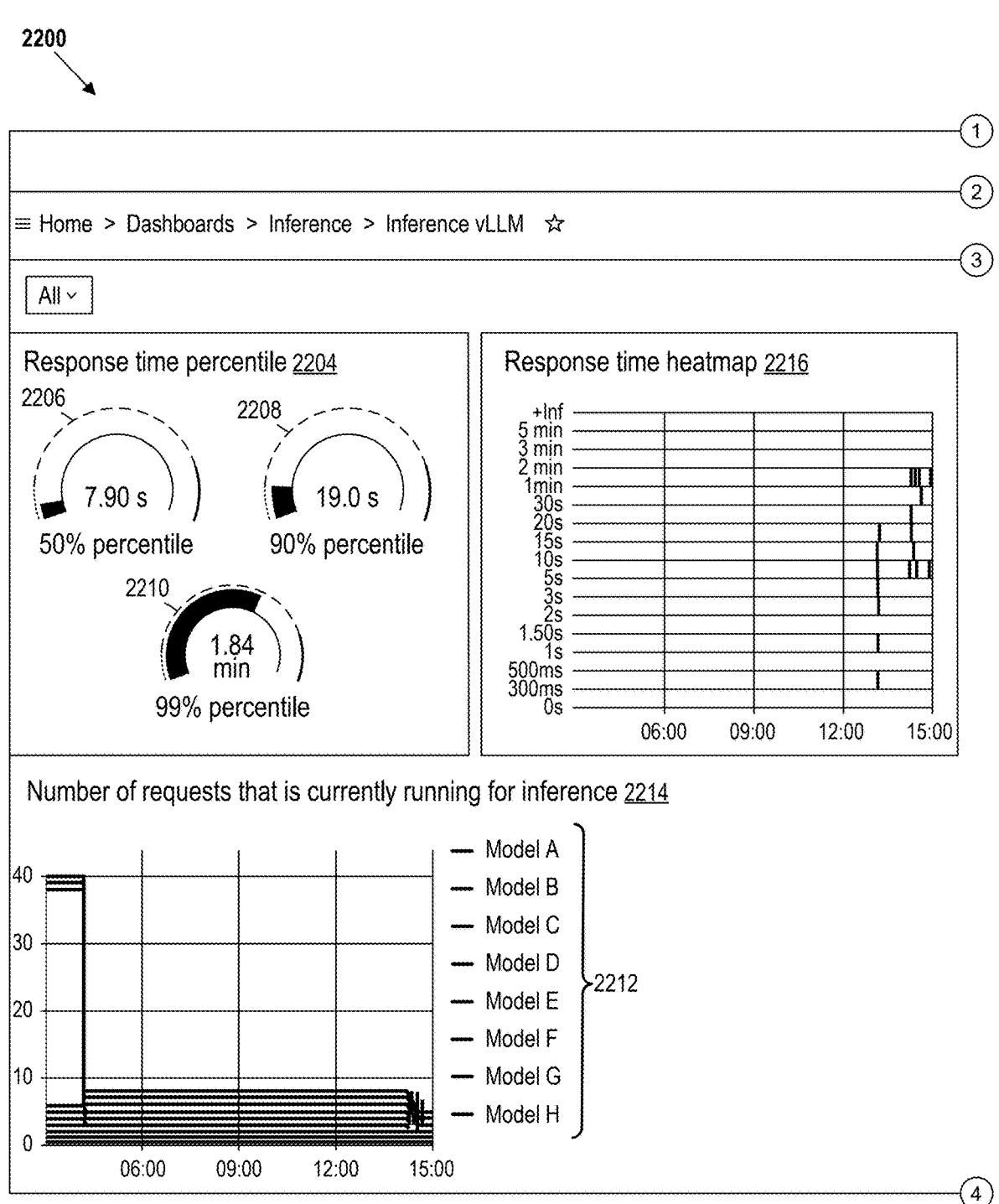
FIG. 22 is an example user interface for monitoring user activity, in accordance with some implementations of the present technology.
Figure 22:
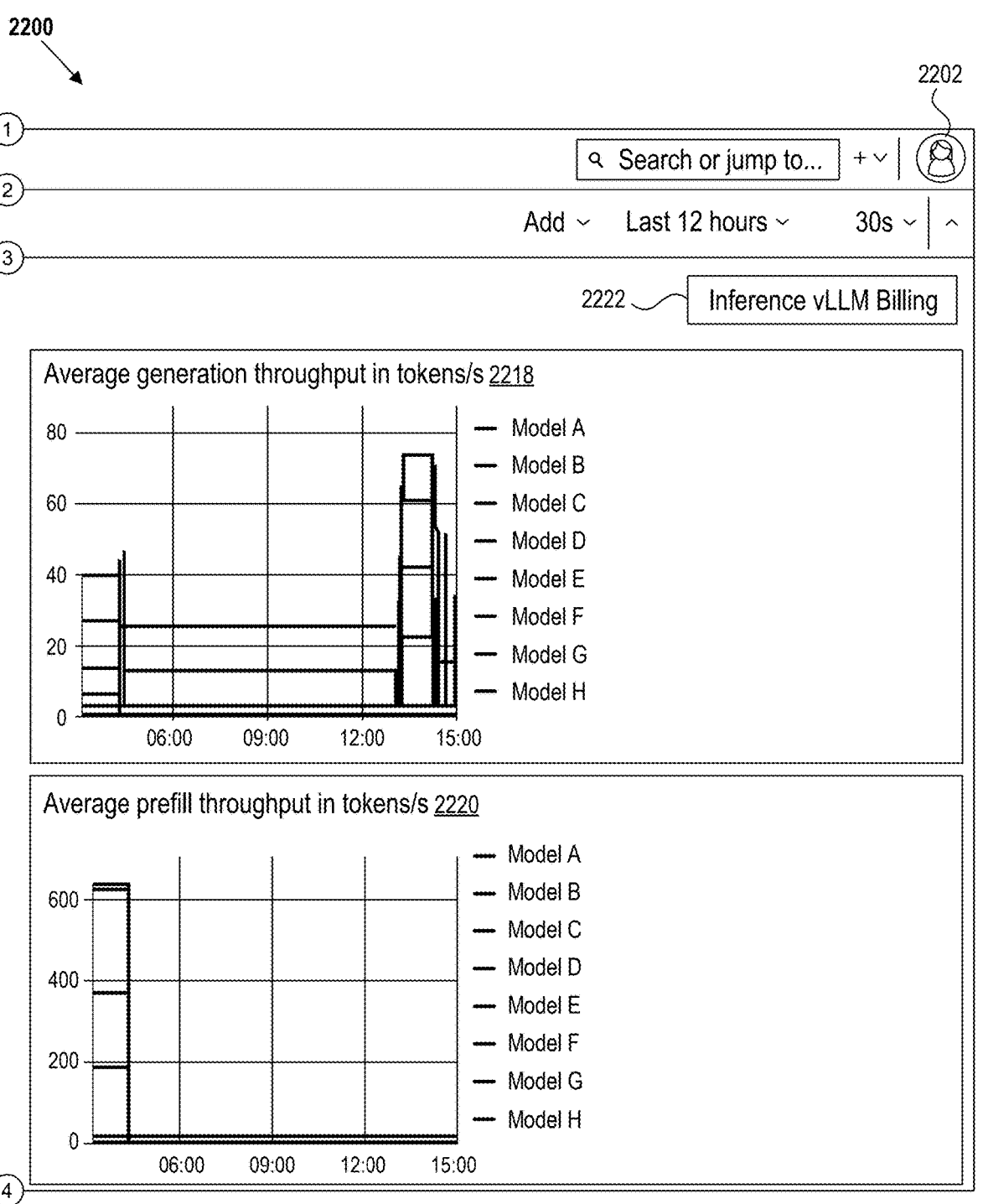

FIG. 22 is an example user interface 2200 for monitoring user activity, in accordance with some implementations of the present technology. User interface 2200 includes user 2202, response time percentile 2204, percentile graphs 2206, 2208, 2210, models 2212, request load 2214, latency representation 2216, generation throughput representation 2218, prefill throughput representation 2220, and cost representation 2222. User interface 2200 is implemented using components of example devices 800 and computing devices 902 illustrated and described in more detail with reference to FIG. 8 and FIG. 9, respectively. User 2202 can be the same as or similar to users 1902*a-d* with reference to FIG. 19. Implementations of example user interface 2200 can include different and/or additional components or can be connected in different ways.

The user interface 2200 allows users or administrators to monitor and manage the platform performance. The user 2202 refers to the individual or entity interacting with the system. The user 2202 can have a particular role and set of permissions within the system, and the output generation requests of the user 2202 can be tracked to ensure efficient resource allocation and model selection. In some implementations, the user 2202 can include automated agents or services that interact with the system on behalf of human users.

The response time percentile 2204 represents the distribution of response times for requests processed by the system. The response time percentile 2204 can be used to indicate the performance and latency of the system. The response time percentile 2204 can be displayed in a particular percentile format, such as the 50th, 90th, and 99th percentiles, indicating the response times below which a certain percentage of requests fall. In some implementations, additional percentiles or custom percentile ranges can be included to provide more granular insights into system performance. Percentile graphs 2206, 2208, 2210 visually represent the response time percentiles over a specified period. For example, in FIG. 21, percentile graph 2206 indicates the 50th percentile (e.g., 7.90 seconds), percentile graph 2208 indicates the 90th percentile (e.g., 19.0 seconds), and percentile graph 2210 indicates the 99th percentile (e.g., 1.84 seconds). Percentile graphs 2206, 2208, 2210 help users or administrators quickly identify trends and anomalies in system performance. In some implementations, the percentile graphs 2206, 2208, 2210 can be interactive, allowing users to zoom in on specific time ranges or filter data based on different criteria.

Models 2212 refer to the various machine learning models available within the system. Models 2212 can include a wide range of models, such as those for text generation, image recognition, and summarization, as depicted in FIG. 19. Each model has specific capabilities and resource requirements. In some implementations, models 2212 can also include custom or user-defined models loaded into the platform.

Request load 2214 indicates the number of requests currently being processed by the system. For example, high request loads can trigger the dynamic selection of additional models or system resources to maintain performance. In some implementations, request load 2214 can also include historical data to help predict future workloads. Latency representation 2216 visualizes the latency of requests processed by the system and helps users identify delays and bottlenecks in the system. For example, the latency representation 2216 can be displayed as a heatmap, bar chart, or line graph. In some implementations, latency representation 2216 can include breakdowns by model (e.g., Models A through H) or resource type to provide more detailed insights.

Generation throughput representation 2218 represents the average throughput of the system in terms of tokens generated per second and indicates the efficiency of the models in generating outputs. In some implementations, the generation throughput representation 2218 can be broken down by individual models or aggregated across all models to provide a comprehensive view of system performance. Prefill throughput representation 2220 indicates the average throughput of the system in terms of tokens prefilled per second. Prefill throughput representation 2220 helps users understand the efficiency of the system in preparing inputs for model processing. In some implementations, the prefill throughput representation 2220 can be displayed alongside generation throughput to provide a complete picture of system performance. Cost representation 2222 indicates the cost associated with processing requests within the system and helps users manage and adjust their resource usage to lower expenses. Cost representation 2222 can include metrics such as the cost per request, total cost over a specified period, and cost breakdown by model or resource type. In some implementations, cost representation 2222 can also include projections and recommendations generated by the platform using methods discussed in FIG. 20.

FIG. 23 is an example user interface 2300 for illustrating an example use case providing configurations for the selection of models or the selection of available system resources, in accordance with some implementations of the present technology. User interface 2300 includes keys 2302 and values 2304. User interface 2300 is implemented using components of example devices 800 and computing devices 902 illustrated and described in more detail with reference to FIG. 8 and FIG. 9, respectively. Implementations of example user interface 2300 can include different and/or additional components or can be connected in different ways.

The keys 2302 in the user interface 2300 refers to the identifiers or labels used to specify particular configurations or parameters within the system. The keys 2302 can represent various aspects of the model selection process, such as model types, resource allocation parameters, or specific criteria for model performance. In some implementations, keys 2302 can include identifiers for different machine learning models, such as "Model A," "Model B," or "Model C," each corresponding to a specific algorithm or architecture tailored for particular tasks. In some implementations, keys 2302 can represent resource constraints, such as "CPU Limit," "Memory Allocation," or "GPU Usage," allowing users to define the computational resources allocated to each model. Additionally, keys 2302 can include performance metrics, such as "Accuracy Threshold," "Latency Requirement," or "Throughput Target," enabling users to set specific performance criteria that the selected models must meet.

The values 2304 in the user interface 2300 refers to the specific settings or parameters associated with each key. The values 2304 define the constraints applied to the models or system resources. In some implementations, values 2304 can include numerical settings, such as "CPU Limit: 4 cores," "Memory Allocation: 16 GB," or "Accuracy Threshold: 95%," providing precise control over the system's behavior. In other implementations, values 2304 can include categorical options, such as "Model Type: Convolutional Neural Network," "Resource Allocation: High Priority," or "Performance Mode: Low Latency," allowing users to select predefined configurations based on their needs. Additionally, values 2304 can include dynamic settings, such as "Auto-Scale: Enabled," "Resource Pool: Shared," or "Performance Tuning: Adaptive," enabling the system to adjust configurations in real-time based on current workloads and performance metrics.

In some implementations, the user interface 2300 can include additional components, such as drop-down menus, sliders, or checkboxes, to facilitate the selection and adjustment of keys and values. For example, a drop-down menu can provide a list of available models, while sliders can allow users to adjust resource allocations dynamically. Checkboxes can enable or disable specific features, such as auto-scaling or performance tuning, providing users with granular control over the system's behavior.

In other implementations, the user interface 2300 can be integrated with monitoring and analytics tools, allowing users to visualize the impact of their configurations in real-time (e.g., the user interface 2200 in FIG. 22). For instance, graphical representations of resource usage, model performance, and system latency can be displayed alongside the configuration options, enabling users to make informed decisions based on current system states and performance metrics.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. One or more non-transitory, computer-readable storage medium comprising instructions recorded thereon, wherein the instructions, when executed by at least one data processor of a system, cause the system to:

receive, in response to a request to generate an output using large language models (LLMs), a plurality of session-specific data elements including prior interaction data, system environment parameters, and computational context values, wherein the plurality of session-specific data elements is updated based on each request and each response;

determine a hierarchy of operational constraints for routing the request to an LLM, the hierarchy of operational constraints comprising a first subset of constraints that comprises privacy and data handling protocols and a second subset of constraints that comprises processing latency thresholds, model response requirements, and resource allocation limitations;

dynamically update weights, using the plurality of session-specific data elements, for a multi-variable optimization;

execute the multi-variable optimization, using the dynamically updated weights, across a plurality of candidate LLMs, wherein each of the plurality of candidate LLMs satisfies the first subset of constraints and optimizes the second subset of constraints such that any further improvement of one constraint in the second subset causes degradation of at least one other constraint in the second subset;

select, based on the multi-variable optimization, at least one candidate LLM for the request;

route the request to the at least one candidate LLM to cause the at least one candidate LLM to generate the output for the request; and in response to receiving system performance feedback comprising measured runtime performance of the at least one candidate LLM, the system performance feedback relating to at least one constraint in the second subset, automatically select a different LLM from among the plurality of candidate LLMs to improve the at least one constraint, resulting in the degradation of at least one other constraint in the second subset, wherein each constraint in the second subset has a different respective performance metric and a different respective threshold, and wherein the system performance feedback indicates that a respective performance metric for the at least one constraint has deviated beyond a respective threshold for the at least one constraint.

2. The one or more non-transitory, computer-readable storage medium of claim 1, wherein the instructions for automatically selecting a different LLM further cause the system to:

retrieve an updated plurality of session-specific data elements;

dynamically update the weights, using the updated plurality of session-specific data elements, for the multi-variable optimization;

increase a weight associated with an objective within the multi-variable optimization corresponding to the at least one constraint in the second subset;

re-execute the multi-variable optimization using the increased weight and the updated plurality of session-specific data elements to generate an updated candidate set of LLMs; and select, as the different LLM, a candidate LLM from the plurality of candidate LLMs that provides improved performance for the at least one constraint of the second subset and satisfies the first subset of constraints.

3. The one or more non-transitory, computer-readable storage medium of claim 1, wherein the instructions for dynamically updating the weights for the multi-variable optimization further cause the system to:

monitor the prior interaction data, the system environment parameters, and the computational context values for the request;

determine revised weights for the multi-variable optimization based on changes in the prior interaction data, the system environment parameters, or the computational context values for the request; and apply the revised weights in performing the multi-variable optimization to adjust a relative importance of each objective associated with the second subset of constraints.

4. The one or more non-transitory, computer-readable storage medium of claim 1, wherein the instructions for selecting, based on the multi-variable optimization, the at least one candidate LLM to process the request further cause the system to:

compare, for each of the plurality of candidate LLMs that satisfy the first subset of constraints, results of the multi-variable optimization with the dynamically updated weights; and select the at least one candidate LLM that most closely satisfies the second subset of constraints in accordance with the dynamically updated weights.

5. The one or more non-transitory, computer-readable storage medium of claim 1, wherein the instructions for receiving the plurality of session-specific data elements further cause the system to, prior to executing the multi-variable optimization, filter the plurality of session-specific data elements to exclude data elements that do not satisfy the privacy and data handling protocols of the first subset of constraints, such that only compliant session-specific data elements are used for dynamically updating the weights for the multi-variable optimization.

6. The one or more non-transitory, computer-readable storage medium of claim 1, wherein the instructions further cause the system, prior to routing the request to the at least one candidate LLM, to:

determine a context complexity score derived from the plurality of session-specific data elements; and apply a complexity threshold for selecting the at least one candidate LLM based on the context complexity score.

7. A method comprising:

receiving, in response to a request to generate an output using a set of AI models, a plurality of session-specific data elements including prior interaction data, system environment parameters, and computational context values;

determining a first subset of constraints and a second subset of constraints for routing the request to an AI model of the set of AI models, the first subset of constraints comprising privacy and data handling protocols and the second subset of constraints comprising processing latency thresholds, model response requirements, and resource allocation limitations;

updating weights, using the plurality of session-specific data elements, for a multi-variable optimization;

executing the multi-variable optimization, using the updated weights, across a plurality of candidate AI models of the set of AI models, wherein each of the plurality of candidate AI models satisfies the first subset of constraints and optimizes the second subset of constraints;

selecting, based on the multi-variable optimization, at least one candidate AI model for the request;

routing the request to the at least one candidate AI model to cause the at least one candidate AI model to generate the output for the request;

in response to receiving system performance feedback relating to at least one constraint in the second subset, automatically selecting a different AI model from among the plurality of candidate AI models to improve the at least one constraint, wherein each constraint in the second subset has a different respective performance metric and a different respective threshold, and wherein the system performance feedback indicates that a respective performance metric for the at least one constraint has deviated beyond a respective threshold for the at least one constraint.

8. The method of claim 7, further comprising, in response to receiving system performance feedback relating to at least one constraint in the second subset, automatically selecting a different AI model from among the plurality of candidate AI models to improve the at least one constraint.

9. The method of claim 8, wherein automatically selecting a different AI model further comprises:

retrieving an updated plurality of session-specific data elements;

dynamically updating the weights, using the updated plurality of session-specific data elements, for the multi-variable optimization;

increasing a weight associated with an objective within the multi-variable optimization corresponding to the at least one constraint in the second subset;

re-executing the multi-variable optimization using the increased weight and the updated plurality of session-specific data elements to generate an updated candidate set of AI models; and selecting, as the different AI model, a candidate AI model from the plurality of candidate AI models that provides improved performance for the at least one constraint of the second subset and satisfies the first subset of constraints.

10. The method of claim 7, wherein dynamically updating the weights for the multi-variable optimization further comprises:

monitoring the prior interaction data, the system environment parameters, and the computational context values for the request;

determining revised weights for the multi-variable optimization based on changes in the prior interaction data, the system environment parameters, or the computational context values for the request; and applying the revised weights in performing the multi-variable optimization to adjust a relative importance of each objective associated with the second subset of constraints.

11. The method of claim 7, wherein selecting, based on the multi-variable optimization, the at least one candidate AI model to process the request further comprises:

comparing, for each of the plurality of candidate AI models that satisfy the first subset of constraints, results of the multi-variable optimization with the updated weights; and selecting the at least one candidate AI model that most closely satisfies the second subset of constraints in accordance with the updated weights.

12. The method of claim 7, wherein receiving the plurality of session-specific data elements further comprises, prior to executing the multi-variable optimization, filtering the plurality of session-specific data elements to exclude data elements that do not satisfy the privacy and data handling protocols of the first subset of constraints, such that only compliant session-specific data elements are used for dynamically updating the weights for the multi-variable optimization.

13. The method of claim 7, further comprising, prior to routing the request to the at least one candidate AI model:

determining a context complexity score derived from the plurality of session-specific data elements; and applying a complexity threshold for selecting the at least one candidate AI model based on the context complexity score.

14. A system comprising:

a storage device; and one or more processors communicatively coupled to the storage device storing instructions thereon, that cause the one or more processors to:

receive, in response to a request to generate an output using a set of AI models, a plurality of session-specific data elements including prior interaction data, system environment parameters, and computational context values;

determine a first subset of constraints and a second subset of constraints for routing the request to an AI model of the set of AI models, the first subset of constraints comprising privacy and data handling protocols and the second subset of constraints comprising processing latency thresholds, model response requirements, and resource allocation limitations;

update weights, using the plurality of session-specific data elements, for a multi-variable optimization;

execute the multi-variable optimization, using the updated weights, across a plurality of candidate AI models of the set of AI models, wherein each of the plurality of candidate AI models satisfies the first subset of constraints and optimizes the second subset of constraints;

select, based on the multi-variable optimization, at least one candidate AI model for the request;

route the request to the at least one candidate AI model to cause the at least one candidate AI model to generate the output for the request;

in response to receiving system performance feedback relating to at least one constraint in the second subset, automatically select a different AI model from among the plurality of candidate AI models to improve the at least one constraint, wherein each constraint in the second subset has a different respective performance metric and a different respective threshold, and wherein the system performance feedback indicates that a performance metric for the at least one constraint has deviated beyond a respective threshold for the at least one constraint.

15. The system of claim 14, wherein the instructions further cause the one or more processors to, in response to receiving system performance feedback relating to at least one constraint in the second subset, automatically select a different AI model from among the plurality of candidate AI models to improve the at least one constraint.

16. The system of claim 15, wherein the instructions for automatically selecting a different AI model further cause the one or more processors to:

retrieve an updated plurality of session-specific data elements;

dynamically update the weights, using the updated plurality of session-specific data elements, for the multi-variable optimization;

increase a weight associated with an objective within the multi-variable optimization corresponding to the at least one constraint in the second subset;

re-execute the multi-variable optimization using the increased weight and the updated plurality of session-specific data elements to generate an updated candidate set of AI models; and select, as the different AI model, a candidate AI model from the plurality of candidate AI models that provides improved performance for the at least one constraint of the second subset and satisfies the first subset of constraints.

17. The system of claim 14, wherein the instructions for dynamically updating the weights for the multi-variable optimization further cause the one or more processors to:

monitor the prior interaction data, the system environment parameters, and the computational context values for the request;

determine revised weights for the multi-variable optimization based on changes in the prior interaction data, the system environment parameters, or the computational context values for the request; and apply the revised weights in performing the multi-variable optimization to adjust a relative importance of each objective associated with the second subset of constraints.

18. The system of claim 14, wherein the instructions for selecting, based on the multi-variable optimization, the at least one candidate AI model to process the request further cause the one or more processors to:

compare, for each of the plurality of candidate AI models that satisfy the first subset of constraints, results of the multi-variable optimization with the updated weights; and select the at least one candidate AI model that most closely satisfies the second subset of constraints in accordance with the updated weights.

19. The system of claim 14, wherein the instructions for receiving the plurality of session-specific data elements further cause the one or more processors, prior to executing the multi-variable optimization, to filter the plurality of session-specific data elements to exclude data elements that do not satisfy the privacy and data handling protocols of the first subset of constraints, such that only compliant session-specific data elements are used for dynamically updating the weights for the multi-variable optimization.

20. The system of claim 14, wherein the instructions further cause the one or more processors, prior to routing the request to the at least one candidate AI model, to:

determine a context complexity score derived from the plurality of session-specific data elements; and apply a complexity threshold for selecting the at least one candidate AI model based on the context complexity score.

* * * * *